(12) United States Patent
Cohen et al.

(10) Patent No.: US 8,549,198 B2
(45) Date of Patent: Oct. 1, 2013

(54) COMMUNICATION PROTOCOL

(75) Inventors: Daniel C. Cohen, Newtonville, MA (US); David A. Colucci, Stoneham, MA (US); Mark R. Melanson, Chelmsford, MA (US); James S. Spitaels, Shrewsbury, MA (US); Vishwas Mohaniraj Deokar, Acton, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 1080 days.

(21) Appl. No.: 12/412,827

(22) Filed: Mar. 27, 2009

(65) Prior Publication Data

US 2010/0250805 A1  Sep. 30, 2010

(51) Int. Cl.
- *G06F 13/00* (2006.01)
- *G06F 3/00* (2006.01)
- *G06F 13/42* (2006.01)
- *H04L 9/32* (2006.01)

(52) U.S. Cl.
USPC ............. 710/110; 710/3; 710/106; 713/168

(58) Field of Classification Search
USPC ................. 710/3, 11, 36, 51, 300, 104–106, 710/110; 711/1–2; 713/168, 169–171
See application file for complete search history.

(56) References Cited

U.S. PATENT DOCUMENTS

| | | | |
|---|---|---|---|
| 4,506,324 A | 3/1985 | Healy | |
| 5,142,528 A | 8/1992 | Kobayashi et al. | |
| 5,323,149 A * | 6/1994 | Hoult et al. | 340/10.2 |
| 5,361,260 A * | 11/1994 | Mito | 370/452 |
| 5,513,334 A | 4/1996 | Alexander | |
| 5,577,210 A | 11/1996 | Abdous et al. | |

(Continued)

FOREIGN PATENT DOCUMENTS

| | | |
|---|---|---|
| EP | 596694 | 5/1994 |
| EP | 1124351 A2 * | 8/2001 |
| EP | 2 287 689 A1 | 2/2011 |

OTHER PUBLICATIONS

"Server and Network Power Solutions". American Power Conversion. 2001. pp. 1-20.*

(Continued)

*Primary Examiner* — Thomas J Cleary
(74) *Attorney, Agent, or Firm* — Lando & Anastasi, LLP

(57) ABSTRACT

One aspect relates to a communication protocol for communicating between one or more entities, such as devices, hosts or any other system capable of communicating over a network. Another aspect relates to a system architecture that permits more than one slave system (e.g., a slave device) to be connected to a master system (e.g., a master device) in a communication system implementing a master/slave protocol. In one aspect, a pass-through device is provided that facilitates communication and authentication to one or more downstream slave devices. Yet another aspect relates to a star-based configuration of slave devices coupled to the master, and protocols for communicating and authenticating slave devices. Another aspect relates to a protocol that allows communication between entities without a priori knowledge of the communication protocol. In such a protocol, for example, information describing a data structure of the communication protocol is transferred between communicating entities. Further, an authentication protocol is provided for providing bidirectional authentication between communicating entities. In one specific example, the entities include a master device and a slave device coupled by a serial link. In another specific example, the communication protocol may be used for performing unbalanced transmission between communicating entities.

41 Claims, 33 Drawing Sheets

(56) References Cited

U.S. PATENT DOCUMENTS

| | | | |
|---|---|---|---|
| 5,675,811 A * | 10/1997 | Broedner et al. | 713/323 |
| 5,745,699 A | 4/1998 | Lynn et al. | |
| 5,787,298 A * | 7/1998 | Broedner et al. | 713/323 |
| 5,826,027 A | 10/1998 | Pedersen et al. | |
| 5,968,136 A | 10/1999 | Saulpaugh et al. | |
| 6,088,796 A | 7/2000 | Cianfrocca et al. | |
| 6,148,404 A | 11/2000 | Yatsukawa | |
| 6,389,496 B1 * | 5/2002 | Matsuda | 710/316 |
| 6,424,119 B1 | 7/2002 | Nelson | |
| 6,445,088 B1 | 9/2002 | Spitaels | |
| 6,463,474 B1 | 10/2002 | Fuh et al. | |
| 6,639,383 B2 | 10/2003 | Hoff et al. | |
| 6,775,715 B2 | 8/2004 | Spitaels | |
| 6,865,685 B2 | 3/2005 | Hammond | |
| 7,003,676 B1 | 2/2006 | Weber et al. | |
| 7,054,332 B2 | 5/2006 | Favichia et al. | |
| 7,082,541 B2 | 7/2006 | Hammond | |
| 7,111,050 B2 | 9/2006 | McAdams | |
| 7,114,098 B2 | 9/2006 | Hammond | |
| 7,148,796 B2 | 12/2006 | Joy | |
| 7,796,589 B2 | 9/2010 | Cohen et al. | |
| 8,102,799 B2 | 1/2012 | Alexander et al. | |
| 2002/0091757 A1 | 7/2002 | Cuomo et al. | |
| 2002/0140819 A1 | 10/2002 | Waehner et al. | |
| 2003/0126442 A1 | 7/2003 | Glew et al. | |
| 2003/0133574 A1 | 7/2003 | Caronni et al. | |
| 2003/0184794 A1 | 10/2003 | Stringham et al. | |
| 2004/0019816 A1 * | 1/2004 | Smith et al. | 713/400 |
| 2004/0088541 A1 | 5/2004 | Messerges et al. | |
| 2005/0050344 A1 | 3/2005 | Hull et al. | |
| 2005/0071444 A1 | 3/2005 | Motoyama | |
| 2005/0071568 A1 | 3/2005 | Yamamoto et al. | |
| 2005/0157660 A1 | 7/2005 | Mandato et al. | |
| 2006/0271720 A1 * | 11/2006 | James et al. | 710/306 |
| 2007/0025347 A1 | 2/2007 | Cohen et al. | |
| 2007/0028104 A1 | 2/2007 | Cohen et al. | |
| 2007/0064718 A1 | 3/2007 | Ekl et al. | |
| 2007/0189207 A1 | 8/2007 | Sammour et al. | |
| 2008/0025216 A1 | 1/2008 | Singh et al. | |
| 2008/0031177 A1 | 2/2008 | Lee et al. | |
| 2008/0112492 A1 * | 5/2008 | MacDonald et al. | 375/259 |
| 2009/0144471 A1 * | 6/2009 | Lin | 710/110 |
| 2009/0185682 A1 * | 7/2009 | Kellerman et al. | 380/201 |
| 2009/0240788 A1 * | 9/2009 | Cadigan et al. | 709/220 |
| 2009/0287815 A1 | 11/2009 | Robbins et al. | |
| 2010/0124189 A1 | 5/2010 | Guguen et al. | |
| 2010/0274945 A1 | 10/2010 | Westrick, Jr. et al. | |
| 2011/0054644 A1 | 3/2011 | Baek et al. | |

OTHER PUBLICATIONS

J. Postel, "Transmission Control Protocol", RFC 793, Sep. 1981.
J.Postel, "The TCP Maximum Segment Size and Related Topics", RFC 879, Nov. 1983.
J. Zeig et al., "TCP Alternate Checksum Options", RFC 1146, Mar. 1990.
T. Dierks et al., "The TLS Protocol", RFC 2246, Jan. 1999.
Intel Corporation, Preboot Execution Environment (PXE) Specification, Version 2.1, Sep. 1999.
R. Recio et al., "An RDMA Protocol Specification", Oct. 2002.
A. Romanow and S. Bailey, "An Overview of RDMA over IP", Proceedings of the First International Workshop on Protocols for Fast Long-Distance Networks (PFLDnet 2003), Feb. 2003.
Hutto, P.W.; Slow Memory: Weakening Consistence to Enhance Concurrency Indistributed Shared Memories: IEEE; Publication Date: May 28-Jun. 1, 1990; pp. 302-309.
Moyer et al. "A Protocol for Wide-Area Secure Networked Applicance Communication". IEEE Communications Magazine. Oct. 2001.

* cited by examiner

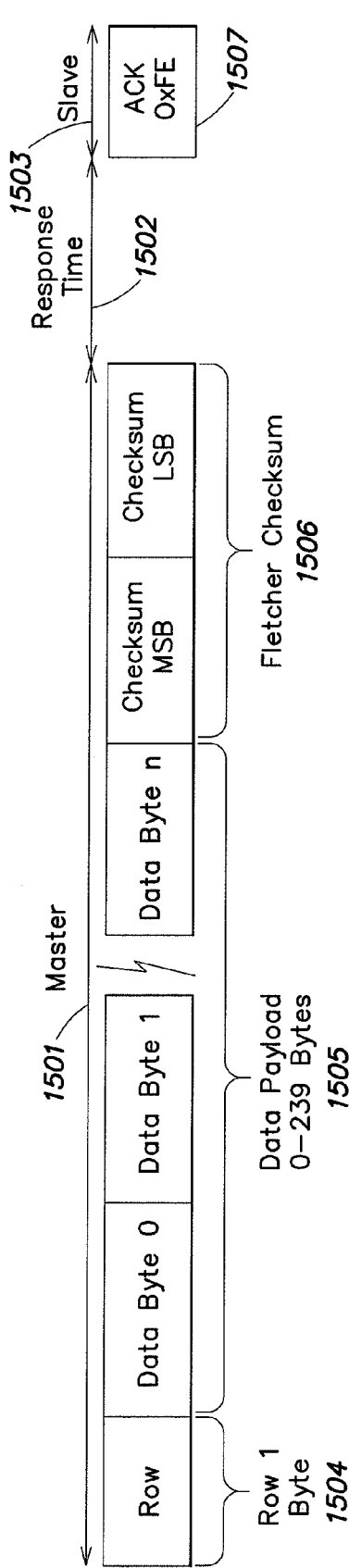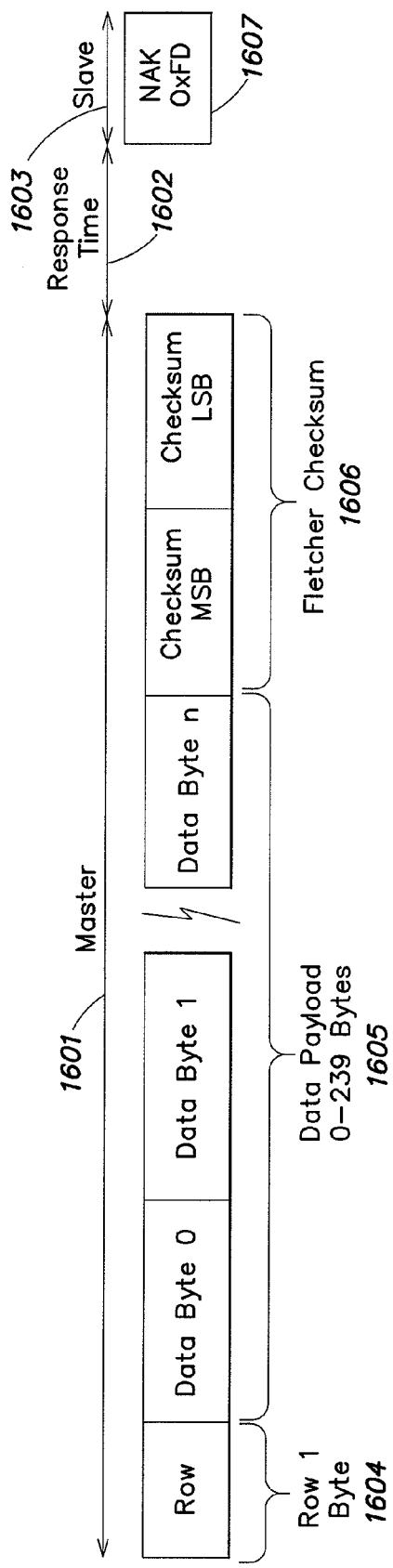
FIG. 15
FIG. 16

| Row | Byte 0 | Byte 1 | Byte 2 | Byte 3 | Byte 4 | Byte 5 | Byte 6 | Byte 7 |
|---|---|---|---|---|---|---|---|---|
| | | | | Data | | | | |
| 0 | 0x0000 | 0x0001 | 0x0002 | 0x0003 | 0x0004 | 0x0005 | 0x0006 | 0x0007 |
| 1 | 0x0008 | 0x0009 | 0x000A | | | | | |
| 2 | | | | | | | | |

FIG. 18

| Offset | Description | Notes |
|---|---|---|
| 0x00 | Micro-Link Version | Identifies the version of the protocol being used |
| 0x01 | Row Length | The transmission packet size for communications to this device |
| 0x02 | Number of Rows | The number of rows contained in the memory map |
| 0x03 | Unique Model Number (MSB) | A unique identifier for each model. |
| 0x04 | Unique Model Number (LSB) | |
| 0x05 | Unique data table configuration | Identifies the version of the configuration of the Micro-Link memory |
| 0x06 | MicroLink Protocols Implemented | Bit 0 – MicroLink Open Protocol<br>Bit 1 – Microlink Proxy Protocol<br>Bit 2 – MicroLink Private Protocol<br>Bit 3 – Microlink Self Describing Record is appended after header (Proxy Header is included before the self describing record)<br>Bit 4 – Microlink Bootload Protocol |
| 0x07 | Future Use | |

FIG. 20

COMMUNICATION PROTOCOL

FIELD OF THE INVENTION

The invention relates generally to communications, and more specifically to a communication protocol for communicating between network entities.

BACKGROUND OF THE RELATED ART

There are many different types of protocols for communicating between network entities, such as computer systems coupled to a communications network. Such networks may be, for example, point-to-point networks, shared networks such as busses, or any other media or network configuration type. To communicate, two entities (e.g., computer systems, devices, hardware, and/or software) need to use and support the same or similar communication protocol. As communicating entities change and grow in features and complexity, there is an ever-present need to support additional protocols between them to accommodate changes of the communicating devices, user interfaces and of the communication media between them.

Advances in technology have brought a proliferation of devices which can read and gather data from many different sources. Devices can remotely monitor parameters including temperature, traffic, weather, bridge stress, power problems, water leaks, alarm conditions, stock quotes, and others. These devices generally exist as stand-alone sensors or as small elements within a larger system.

Similar advances in technology have produced a myriad of choices to present data gathered by such devices to users. Users can read gathered data on computer terminal screens, handheld computers, wireless telephones, portable sound players, luminescent orbs, highway signs and others. These devices all have attributes that lend themselves uniquely to one or more, but not all communication methods for sending and/or receiving data. Some communication methods involve some type of communication medium, including wireless, wired busses, wired point-to-point, optical, optical cable, and others. Such communication methods also involve some data transmission method or modulation referred to in the art as a communication protocol. Protocols used to send data across such media are even more plentiful. Examples include the well-known communication protocols such as Ethernet, RS232, RS485, USB, Wi-Fi, and IrDA protocols, among others. There are many different communication methods involving different media and protocols, depending on the application.

According to one aspect of the present invention, it is appreciated that in many applications where many devices gather and send data to a much smaller group of listeners or users of data, there is a need to make the data gatherer smaller, less complex, to reduce overall system cost, while on the user's end there is a need to retain or increase the computing power in order to process and display the received data in a way that increases overall system usefulness.

Higher-level protocols typically used to transmit data, such as HTTP are common used in today's network and computing environments to transmit data. The advantage to using these methods for groups of many devices is that low-cost widely available software can read data in a common format and the data is made available to anyone with a personal computer or other widely available compatible hardware. However, one disadvantage of these higher-level protocols is that they require significant microprocessor resources, which increase the cost of the many devices deployed to gather data.

Current state of the art systems have subsystems gathering data, which either present their data to users in higher level protocols or present data to an intermediary system (proxy) using an extremely low level method (such as an analog signal). The disadvantages of the former subsystems are that they are expensive, having to support a higher-level protocol and they may become outdated as the high-level means and methods connecting them to their users changes. Also, because there may be real-time data acquisition and/or control requirements, there may not be enough processor bandwidth to support such high-level protocols. The disadvantages of the low level subsystems are that the information is subject to external interference and low performance rendering such systems useful for no more than simple sensors located close to the user of data or its proxy.

SUMMARY

In today's networked and connected world it is becoming more important that all forms of communications from a device be able to present consistent data between interfaces. It is appreciated that devices (or systems) such as Uninterruptible Power Supply (UPS) devices historically have had significant problems in presenting the same data on multiple interfaces and generating common log files among devices that monitor such UPS devices. Conventional devices such as UPSs use a serial-based point-to-point protocol (e.g., a question/response-based ASCII protocol such as the well-known UPS-link protocol), which, if used with multiple devices, has a significant data delay between the multiple devices causing log files on those devices to be different. Although there are improved forms of these types of protocols, there are several problems in that these scaled-down protocols do not allow for multiple devices to communicate over the same connection. Also, it is appreciated that there is a problem with log file data being different among multiple monitoring devices.

According to one aspect of the present invention, a protocol is provided that permits multiple devices to communicate is a serial-based protocol. To this end, devices are provided more than one serial-based interface and are permitted to operate in a "pass-through" mode wherein data received on one of the interfaces is repeated to another interface. This permits, for example, multiple devices to be "chained" together from a single device. This feature may be useful, for instance, in the case that multiple devices monitor another device (e.g., a UPS device), and it is desired that the multiple devices see and share the same data produced by the monitored device. Also, by permitting chaining, the monitored device needs only a single serial interface to permit monitoring by multiple devices.

According to another embodiment, synchronization issues with other types of protocols are avoided as a "pass-through" device is configured to pass through data received from downstream devices with minimal processing (and thus, minimal delay). According to one embodiment, data sent by a downstream device is received by a slave in a pass-through mode, and that data is passed through to the master, where the data is acted on. The master responds, and downstream slave devices may "see" the result of the passed-through data. According to one embodiment, a slave device operating in a "pass-through" mode need not understand or interpret data received from downstream slave devices.

Further, in another embodiment, the multiple devices may be permitted to execute commands on the monitored device, and it may be useful to coordinate, among the controlling devices, what commands are to be executed on the controlled device (e.g., the UPS device). To this end, a serial-based protocol may be provided that includes one or more of these capabilities.

According to one embodiment, devices may be chained together in a string of serially-linked devices, and intermediate devices in the chain may be configured to communicate in a pass-through mode. In another embodiment, one or more devices may be configured to communicate in a star-based topology where multiple devices are coupled to a single device, and a coordination protocol permits the multiple devices to see and share the same information. In yet another embodiment, the star and chain topologies may be combined to permit, for instance, multiple devices to be serially-linked from an interface of the star topology. Such capabilities are useful for permitting multiple configurations of connected monitoring devices to be connected to a single monitored device (e.g., a UPS device).

Another aspect relates to an authentication method that permits multiple devices to use a common communication medium. For instance, in the case of a secure bus topology where multiple devices share the same medium, an authentication method would generally be required that authenticates each device prior to having access to the medium. According to one embodiment, methods are provided to perform device authentication of devices in chained or star configurations as discussed above as they are added or subtracted from the network.

For instance, in a chained configuration, devices that are configured as pass-through devices do not permit downstream communications from other devices to a master device (e.g., a monitored UPS device) until these devices are authenticated with the master device. Further, in another implementation, once a device configured as a pass-through device is authenticated by a master device, the pass-through device may permit downstream devices to communicate with the master device. In a star-based configuration, a master may permit devices connected to the master among a plurality of serial ports to authenticate on each serial link to the master prior to communication to occur on each of the serial ports.

In yet another aspect, a low-level communication protocol is provided that allows more than two serially-linked devices to communicate without the need for addressing within messages. In conventional serial-based protocols, addressing is generally not required as the protocol is generally a point-to-point protocol. However, in more complex protocols, addressing is required to communicate among more than two devices. According to one embodiment, a serial-based protocol can be used for communication between multiple slave devices and a master in a coordinated manner.

According to one aspect of the present invention, a method for communicating between a plurality of devices is provided. The method comprises acts of receiving, by a master device through at least one serial communication link coupling the master device to a plurality of slave devices, a message from at least one of the plurality of slave devices, communicating, from the master device to the plurality of slave devices coupled to the master device through the at least one serial communication link, an unaddressed message including data to be communicated to the plurality of slave devices responsive to the received message, and determining that all of the plurality of slave devices have received the unaddressed message. According to one embodiment of the present invention, the method further comprises an act of authenticating, by the master device, the plurality of slave devices coupled to the master device through at least one serial communication link. According to another embodiment of the invention, the method further comprises an act of retrieving, responsive to receiving the message from at least one of the plurality of slave devices, a row of memory from a memory of the master device. According to another embodiment of the invention, the act of communicating further comprises an act of communicating, from the master device to the plurality of slave devices coupled to the master device on the at least one serial communication link, the unaddressed message containing the retrieved row of memory to the plurality of slave devices. According to another embodiment of the invention, at least one of the plurality of slave devices is coupled to the master device via a first serial communication link, and the at least one authenticated slave device is further coupled to at least one other slave device via a second serial communication link, and wherein the act of communicating further comprises receiving the unaddressed message at the at least one slave device and transmitting the received unaddressed message on the second serial communication link.

According to one embodiment of the present invention, the act of determining that all of the slave devices have received the communicated unaddressed message comprises sending, by each of the plurality of slave devices coupled to the master device through the at least one serial communication link, an acknowledgement message along the at least one serial communication link toward the master device responsive to receiving the communicated unaddressed message. According to another embodiment of the invention, the at least one of the plurality of slave devices is adapted to operate in a pass-through mode. According to another embodiment of the invention, the method further comprises an act of prohibiting communications by the at least one other slave device if the at least one other slave device is not authenticated to the master device. According to another embodiment of the invention, the act of determining that all of the plurality of slave devices have received the unaddressed message includes an act of determining if at least one slave device of the plurality of slave devices does not receive the unaddressed message. According to another embodiment of the invention, the method further comprises an act of resending the unaddressed message if it is determined that at least one slave device of the plurality of slave devices does not receive the unaddressed message. According to another embodiment of the invention, the method further comprises an act of determining that the at least one slave device of the plurality of slave devices has not received the message based on receiving a negative acknowledgement message from any of the plurality of slave devices.

According to one embodiment of the present invention, the method further comprises an act of prohibiting an update of data stored by the master device by any of the plurality of slave devices until it is determined that all of the plurality of slave devices have received the communicated message. According to another embodiment of the invention, the plurality of slave devices are coupled to respective serial ports of the master device, and wherein the method further comprises communicating the message to each of the plurality of slave devices coupled to the respective serial ports. According to another embodiment of the invention, the method further comprises an act of re-authenticating the plurality of authenticated slave devices with the master device if at least one of the plurality of authenticated slave devices stops communicating with the master device. According to another embodiment of the invention, the at least one of the plurality of authenticated slave devices performs at least one of the group comprising sends a command that stops communication with the master device, fails to operate, and experiences a timeout in communicating information to the master device.

According to one embodiment of the present invention, the method further comprises acts of receiving a negative acknowledgement message sent by the at least one slave device to at least one other slave device coupling the at least one slave device to the master device and interpreting the received negative acknowledgement message as a request to join the plurality of slave devices in communicating with the master device. According to another embodiment of the invention, the method further comprises an act of registering the plurality of slave devices with the master device. According to another embodiment of the invention, the method further comprises an act of authenticating, by the master device, the plurality of registered slave devices coupled to the master device. According to another embodiment of the invention, the method further comprises an act of re-authenticating the plurality of registered slave devices with the master device if at least one of the plurality of authenticated slave devices stops communicating with the master device. According to another embodiment of the invention, the plurality of slave devices are adapted to perform monitoring and control operations on the slave device through the through at least one serial communication link.

According to one embodiment of the present invention, the unaddressed messages are undirected messages transmitted by the master device on the at least one serial link. According to another embodiment of the invention, the method further comprises communicating, by at least one of the plurality of slave devices, to the master device, a message initiating communication between the at least one slave device and the master device, communicating, by the master device, information stored in a public memory area of the master device, the public memory area identifying a data structure of a communication protocol used to communicate with the master device, and communicating, by the at least one slave device, a message to the master device using the information identifying the data structure. According to another embodiment of the invention, the information identifying the data structure includes version information relating to the communication protocol used to communicate with the master device, and wherein the master device identifies a communication protocol type used to communicate with the master device based on the version information. According to another embodiment of the invention, the message initiating communication between the at least one slave device and the master device is an acknowledgement message, and the at least one slave device is adapted to send a plurality of acknowledgement messages to the master device.

According to one embodiment of the present invention, the message initiating communication between the at least one slave device is a negative acknowledgement message sent by the at least one slave device. According to another embodiment of the invention, the master device is at least one of an Uninterruptible Power Supply (UPS) and a UPS component. According to another embodiment of the invention, at least one of the plurality of slave devices is a manager of the at least one of the UPS and UPS component. According to another embodiment of the invention, at least one of the plurality of slave devices is a general purpose computer system. According to another embodiment of the invention, the method further comprises sending the message by the at least one slave device to at least one other slave device coupling the at least one slave device to the master device. According to another embodiment of the invention, the method further comprises sending, by the at least one slave device, one or more acknowledgement messages to the at least one other slave device to maintain a connection.

According to one aspect of the present invention, a method for communicating between a plurality of devices is provided. The method comprises acts of receiving, by a slave device through at least one serial communication link coupling the slave device to one or more downstream slave devices, a message from at least one of the one or more slave devices, communicating, from the one or more downstream slave devices to the master device through at least one serial communication link coupling the slave device to the master device, the received message from the at least one of the one of more slave devices, receiving, through the at least one serial communication link coupling the slave device to the master device, an unaddressed message including data to be communicated to the slave device and one or more downstream slave devices responsive to the received message, and communicating the received unaddressed message to the one or more downstream slave devices. According to one embodiment of the present invention, the method further comprises an act of receiving an acknowledgement message from the one or more downstream slave devices, and replacing the received acknowledgement message with an acknowledgement message generated by the slave device. According to another embodiment of the invention, the method further comprises receiving a command from the one or more downstream slave devices, determining whether the slave device has a command to send to the master device, determining which one of either command should be sent to the master device, and sending the determined command to the master device.

According to one embodiment of the present invention, the method further comprises an act of communicating, in a normal transfer mode, data bytes received in a multibyte message from the one or more downstream slave devices to the master device through the at least one serial communication link coupling the slave device to the master device without preprocessing the data bytes received. According to one embodiment of the present invention, the method further comprises an act of sending, prior to a normal communication mode, a request to authenticate the slave device to the master device, and, after the slave device is authenticated, communicating authentication information from the one or more downstream slave devices to the master device through the at least one serial communication link coupling the slave device to the master device.

According to one aspect of the present invention, a slave device is provided, comprising a processor, a first serial interface adapted to couple the slave device to one or more downstream slave devices, wherein the first serial interface is adapted to receive a message from at least one of the one or more downstream slave devices, and a second serial interface adapted to couple the slave device to a master device, wherein the second serial interface is adapted to communicate the received message to the master device, and is adapted to receive from the master device, an unaddressed message including data to be communicated to the slave device and one or more downstream slave devices responsive to the received message, and wherein the second serial interface is adapted to communicate the received unaddressed message to the one or more downstream slave devices. According to one embodiment of the present invention, the first serial interface is adapted to receive an acknowledgement message from the one or more downstream slave devices, and wherein the processor replaces the received acknowledgement message with an acknowledgement message generated by the slave device, and wherein the second serial interface is adapted to communicate the acknowledgement message generated by the slave device to the master device. According to another embodiment of the invention, the first serial interface is adapted to receive a command message from the one or more downstream slave devices, and wherein the processor is adapted to determine whether the slave device has a command to send to the master device and determine which one of either command should be sent to the master device, and wherein the second serial interface is adapted to send the determined command to the master device.

According to one embodiment of the present invention, the first serial interface is adapted to receive data bytes in a multibyte message from the one or more downstream slave devices, wherein the first serial interface is adapted to transfer the multibyte message to the second serial interface without preprocessing the data bytes received, and wherein the second serial interface is adapted to communicate the multibyte message to the master device. According to another embodiment of the invention, the second serial interface is adapted to send, prior to a normal communication mode, a request to authenticate the slave device to the master device, and wherein the first serial interface is adapted to receive, after the slave device is authenticated, an authentication request information from the one or more downstream slave devices, and wherein the second serial interface is adapted to communicate the received authentication request to the master device. According to another embodiment of the invention, the first serial interface is adapted to receive an acknowledgement message from the one or more downstream slave devices, and wherein the second serial interface is adapted to send an acknowledgement message from the slave device instead of the received acknowledgement message to the master device.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings,

FIG. 15 is a block diagram of a master message format according to another embodiment of the present invention;

FIG. 16 is a block diagram of a master message format according to another embodiment of the present invention;

FIG. 18 is a table showing an example memory map according to one embodiment of the present invention;

FIG. 20 is a table showing an example header format according to one embodiment of the present invention;

DETAILED DESCRIPTION

Figure 1A:
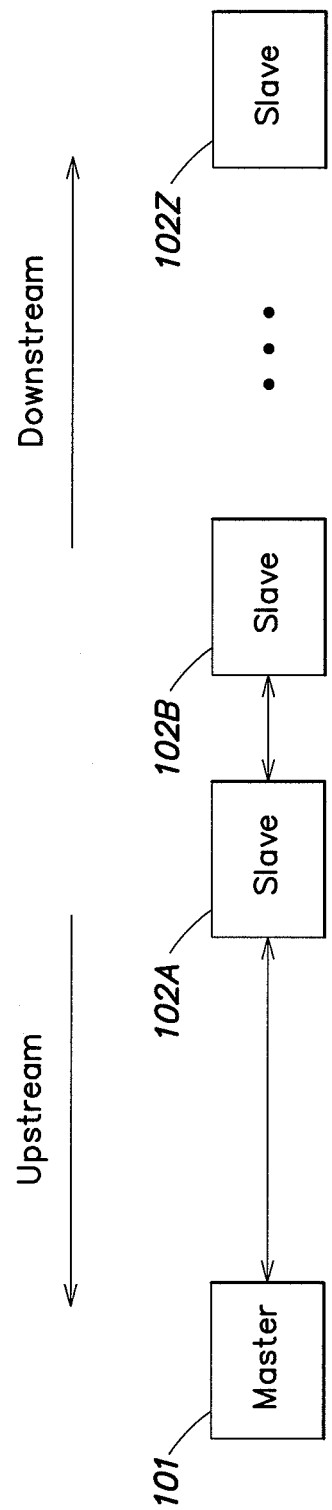
FIGS. 1A-1C show block diagrams of several embodiments of communication systems consistent with various aspects of the present invention.

One aspect of the present invention relates to a communication protocol for communicating between one or more entities, such as devices, hosts or any other system capable of communicating over a network. According to one aspect of the present invention, it is appreciated that a protocol is desired for use in communicating information from many entities such as devices (e.g., a UPS) to a small number of users of data. According to specific aspects of the present invention, it is appreciated that there is a need for a communication subsystem that subsystem types that can operate in an application having the following attributes:

In the particular application, there are many entities that gather data and control simple functions (e.g., devices that manage a power or cooling device). Such entities send data to a much smaller group of entities that process, manage and display this data to users or other systems.

The simple data gatherers generate most of data, and most consumers of data have relatively small amounts of data to send back to the data generators. For example, in a typical control system, there are multiple inputs and a small number of outputs.

Consumers of data generally prefer to use the same rules to communicate to multiple different sources of data, such as a web browser application loading web pages from different websites, or a building management interface that monitors a status of different types of systems in its domain such as HVAC, water and electrical distribution subsystems.

A subsystem architecture ideal for this application may have the following features and advantages:

Where data is generated, a lower-cost device can be used to conduct the control functions, and send relevant data, using a simpler protocol, to other devices that can handle higher-level end-user communication protocols.

Changes to the higher-level protocols, or the addition of new user-interfaces that employ new protocols do not require changing the many low-cost control processors' operating instructions and/or hardware.

Information transmitted to and from the data sources reliably and securely support moderate control, management and monitoring of those remote subsystems.

According to one aspect of the present invention, a protocol is provided that allows communication between multiple entities using a low-level protocol. In one configuration, slave devices are able to be connected to a master device using a serial link. A pass-through slave device is provided having at least two serial links, one of which is connected to a master device and another which is connected to a downstream slave device. In another embodiment, the system may be capable of chaining additional slave devices downstream from the master, and a protocol is provided that permits communication by all chained devices to the master in a coordinated manner. According to one aspect of such a protocol, devices on the chain, once authenticated, are permitted to observe, control and share information stored in the master device. As discussed, this may be useful for multiple devices to manage a single master device.

According to another aspect, an authentication method is provided that permits a slave in a pass-through mode, once authenticated, to communicate serial communications to other devices. In such a configuration, downstream slave devices authenticate to the master, and once authenticated, are permitted to communicate with the master or pass on communications from other downstream devices.

Another aspect of the present invention relates to another configuration between a master and multiple slave devices using a star configuration. In such a configuration, a master device is configured with more than one serial link, and those serial links are coupled to more than one slave device. A protocol is provided that permits coordinated control and observation of the master device. In one aspect, communication between devices is coordinated without the need for device addressing which using a serial-based protocol.

According to another aspect of the present invention, it is appreciated that it is difficult to use conventional low-level serial communications among more that one device. In systems with more than two devices, more complex protocols are generally used, but there is more overhead required to coordinate communication among multiple devices. According to one embodiment, a serial-based communication method is extended to multiple devices, without the necessity and overhead of addressed communications. In particular, a serial protocol is used among multiple devices wherein devices need not maintain unique addresses, and messages are not required to be addressed or otherwise directed towards a particular destination device. Further, it is appreciated that conventional serial protocols that natively do not include addressing need not have addressing to permit communication among more than two devices.

Further, according to yet another aspect of the present invention, a protocol is provided that allows communication between entities without a priori knowledge of data content and format being transmitted using the protocol. In such a protocol, for example, information describing a data structure of the communication protocol is transferred between communicating entities. This type of operation contrasts to conventional systems that need to know the protocols, commands and data structures of the devices with which they communicate before they begin to communicate.

In one example system according to one embodiment of the present invention, the data structure of a communication protocol is stored in a memory of a receiving entity, and the stored data structure is updated based on information received from a sending entity. According to one embodiment, the data structure is stored in both the sending and receiving entities. In a specific example, elements of the data structure may be modified by either entity.

In one embodiment, the data structure is described within a header of the received information. According to one example, the received information includes header information and device data. Such device data may include, for example, entity configuration and status data.

In a specific example, the header information includes version information that indicates a version of the data structure. The header information may also include dimension information indicating a dimension (e.g., a size) of a memory area of the transmitting entity.

In one embodiment, the receiving entity is referred to as a "slave" (or slave device) because the slave learns the protocol used by a transmitting entity referred to as the "master" (or master device). In particular, the slave may update its use of the protocol to match the use of the protocol of the master. Also, the receiving entity is referred to as a "slave" as the protocol is designed generally for data to flow from the master entity to the slave entity. In one example, the slave accesses a shared memory of the master to determine a data structure used by the master. According to one embodiment, the slave is capable of storing the data structure used by the master in a memory associated with the slave. The slave may then access the master using the received data structure information. For instance, the master may access other data stored in the master using previously-received data structure information. The data structure may define, as discussed, the version of the protocol and dimension information.

The dimension information may include, for example, a number of rows and a length of data within rows contained in the memory. In one example, the length of each row may correspond to a transmission packet size of data packets being sent. In one embodiment, a transmission packet size used to communicate information between two entities (e.g., the slave and the master) may be determined by the length information stored in the memory of the master. In one embodiment of the present invention, a slave may automatically determine the transmission packet size used to communicate to the master. In one example, at the start of communication between the master and slave, the slave communicates a message to the master and waits a timeout period for a response from the master. The master is adapted to send the data structure information including the transmission packet size to the slave upon receipt of the message. In one example, the message is a message having a fixed length. In another example, the message is a negative acknowledge message, and the master is adapted to send the data structure information upon receipt of a predetermined number of negative acknowledgement messages.

Because the slave can dynamically adapt itself to a number of different master types and versions, the slave is more adaptable to master devices and is more useful as a result. Such a feature may be beneficial, for example, in a management system that manages one or more devices (e.g., master devices). Further, the slave may be part of a proxy system that is capable of communicating with one or more systems, such as a management system. Also, because such a slave need not store multiple protocols to support multiple master types, the slave may be simplified and less costly as a result. More particularly, the cost for creating slave devices may be reduced, as the slave may be adapted to different master devices rather than being specially-manufactured for a single or limited number of master device types.

In one embodiment, a protocol is provided that permits slaves to learn available "features" of a master. If a particular slave supports a particular set of features, and a master supports one of those features, then the slave may be able to support that one master feature. In one example, a slave may be provided that supports features 1-10, and that slave can be used with a master that supports features 1-7 without reprogramming the slave. To support a master that supports features 1-11, a slave would need only to add support for feature 11. In one embodiment, a slave may be capable of determining features supported by a master by inspecting a description of supported data elements provided by the master (e.g., in a descriptor stored within a message communicated from the master).

In one specific embodiment, one entity (such as the master) changes its stored version of the data structure more frequently than the other entity. For instance, in a monitoring and/or control system, a device may be adapted to update its copy of the data structure more frequently than systems that monitor the device. For instance, the device may be an uninterruptible Power Supply (UPS), a UPS component, environmental control system (e.g., an air conditioning system or component), or other type of monitoring and/or control device.

The slave may be, for example, a manager of the master (e.g., a device being monitored and/or controlled). In one example, the slave is implemented on a general-purpose computer system such as, for example, a personal computer (PC). For instance, the slave may be part of a PC used to manage the master, such as a monitoring and/or control device. As discussed, the slave may also be part of a system (e.g., a proxy) that acts as a relay that communicates data to/from other systems. To this end, entities communicating with a master may be directly connected to the master (e.g., via a serial link) or may be coupled through one or more intermediate systems and/or networks.

The shared memory of the master may include other information used by the slave to access the master. For example, the dimension information may also include an identifier that indicates a version of a data table format of information stored in memory of the master. A slave may use such an identifier to determine the format of data stored in memory of the master, any slave may therefore learn the format and usage of the master data as a result.

According to one aspect of the present invention, a protocol is provided that supports an unequal (or unbalanced) transfer of data between communicating entities. That is, the amount of data sent by one entity exceeds the amount sent by another entity. In one specific implementation, the protocol may provide the ability to communicate a majority of data from a master to a slave in a reliable manner. In one implementation, the slave is able to send data to the master, but at a reduced data rate as compared to the transmission rate of the master. According to one aspect of the present invention, it is realized that in particular applications such as monitoring of devices, a majority of data is sent by the devices being observed, and therefore, it may be beneficial to optimize a communication protocol maximize such a transmission scenario.

According to another aspect of the present invention, a protocol is provided that permits an entity to relay transmitted information without needing to understand or interpret the transmitted information. The information may be relayed, for example, to another entity such as a client system (e.g., by the proxy system as described above). In one example, the entity may be located on another network, and the intermediate entity (e.g., the proxy) transfers the information between different networks. In the example described above, a slave may be capable of determining communication parameters used for communicating to a master system.

In one aspect of the present invention, the slave system may be capable of relaying requests to the master from other entities. In one example, the slave need not interpret any data transferred between the master and other entity, but may translate requests received from another entity to the communication format required by the master. There may be defined a minimum set of information necessary for the slave system to communicate with the master, and to adapt its communication to permit other entities to access the master through the slave. Because a slave according to one embodiment is capable of communicating with a number of master systems having varying communication capabilities, and the slave is capable of translating requests to other entities, such a slave system may be useful in managing multiple system types. Such a management capability may be beneficial in a UPS having one or more managed components.

In one embodiment, the proxy is capable of supporting access and relating information to/from a master entity by more than one entity. For instance, a proxy having a slave capability may also be coupled to more than one other system (e.g., computer systems (e.g., clients) coupled to a communication network) for the purpose of managing the master entity from more than one system. To this end, the proxy may be capable of receiving multiple requests from different systems, and translate those requests to requests that may be executed on the master.

Also as discussed further below, the slave of the proxy is capable of performing an authentication function so that an authorized slave may communicate with a master. In the situation where multiple entities attempt to access a single master, the proxy may be adapted to support authentications of each of the accessing systems. In such a case, according to one embodiment of the present invention, the proxy system performs a check to determine whether the accessing systems have permission to perform one or more accesses (e.g., one or more read functions, write functions, control functions, etc.) to the master entity. If authenticated, the proxy communicates the access request to the master entity. If not, the access request is denied.

According to one embodiment of the present invention, an improved communication protocol is provided for effecting low-overhead or "lightweight" communication between entities, such as hardware controllers. Such a protocol may be used to communicate information between network entities such as, for example, an Uninterruptible Power Supply (UPS) and/or a UPS component and a host computer system. However, it should be appreciated that such a protocol may be implemented in other types of systems, including, but not limited to, air conditioning systems, home automation systems, field monitoring systems, or other system applications having monitoring and control functions.

In one embodiment, the protocol allows access to a device (e.g., a UPS) by a communicating system (e.g., a computer). Such access may be required, for example, to ensure there is no unauthorized access or control of the device. For instance, an unauthorized personal computer may access a UPS device to shut down or reconfigure the UPS system. In one example, access is performed by way of a bidirectional locking feature. In one embodiment, such a feature allows, for example, a device (e.g., a UPS) to communicate only with authorized software (e.g., an application executing on a host computer), and the software to communicate with an authorized device (e.g., an authorized UPS). In another embodiment, a proxy system may be used to access a device (e.g., a UPS or UPS component). In one example, a management system associated with the UPS is used to communicate information from other systems to the device. The management system may act as a proxy for the purpose of performing management functions or obtaining information from one or more managed devices (e.g., a UPS or UPS component).

Such access may be permitted based upon a bidirectional locking key stored at both the device and the communicating system. In the UPS example above, when the UPS is in a locked mode (e.g., a communicating system that accesses the UPS does not have the proper key), the UPS only allows data to be written to a publicly accessible section of the memory. For instance, the UPS may only allow a communicating system to access public areas of a memory device of the UPS (e.g., an EEPROM, RAM, etc.). Other data write operations to non-public areas of the memory are not permitted. In this manner, operations using configuration and operating parameters may not be performed without a correct key. In one example, the key may be determined using publicly-accessible information stored in one or more public areas of a master device. In yet another embodiment, multiple levels of authentication may be provided that permit certain data elements to be accessed and/or updated by a slave device. For instance, in a "factory" mode of authentication, information such as serial number, manufacture date, etc. may be changed, but in a "user" mode (e.g., a typical slave mode), such information may have a different level of access (e.g., read-only).

In another embodiment of the invention, a method is provided for relaying the access information by an intermediate entity without the need to understand or unlock the transmitted information. That is, an entity, referred to herein as a proxy, is permitted to relay the transmitted information without necessarily understanding the protocol. According to one embodiment, information describing the format of data in the transmitted information is contained within the transmitted information itself. According to another embodiment, a proxy is required to authenticate and unlock the transmitted information to other devices, to provide additional security. In another embodiment, a slave device that participates with other slave devices in communicating with the master device, may "see" communications with the master, be adapted to repeat data communicated by/to other slave devices, yet need not interpret their communications.

Example System

Figure 1B:
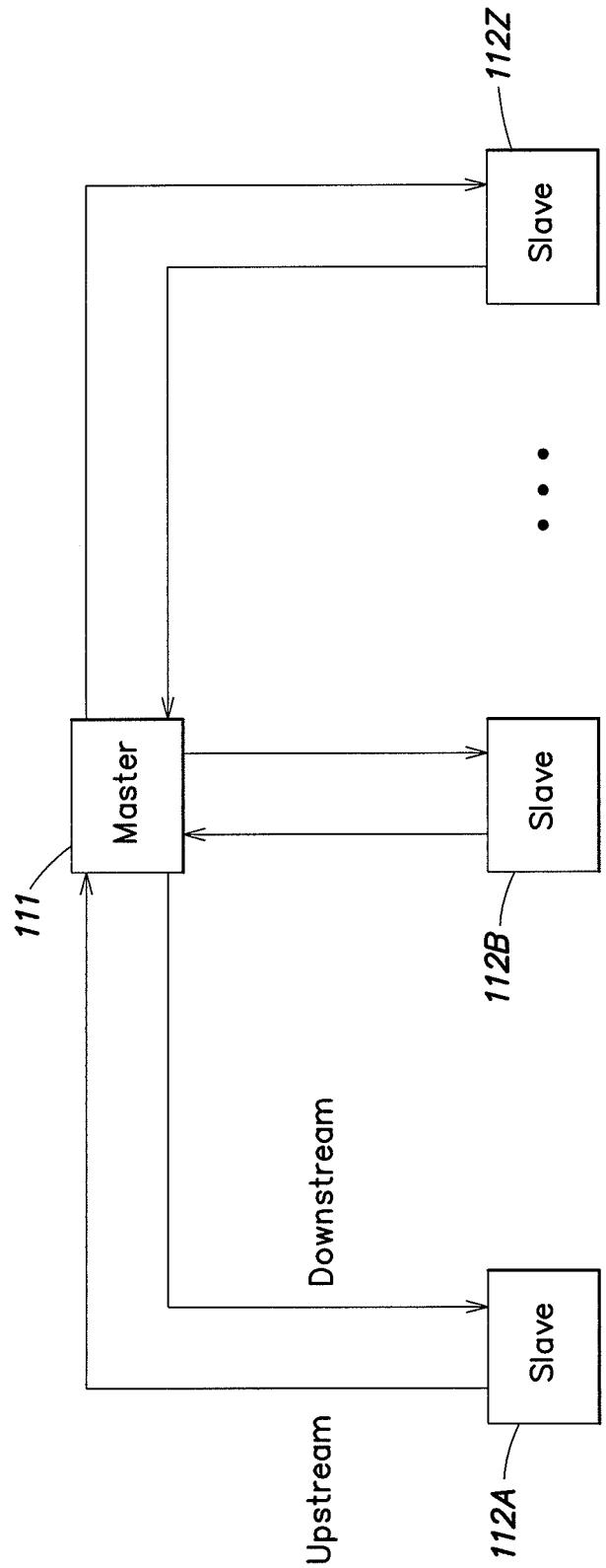
Figure 1C:
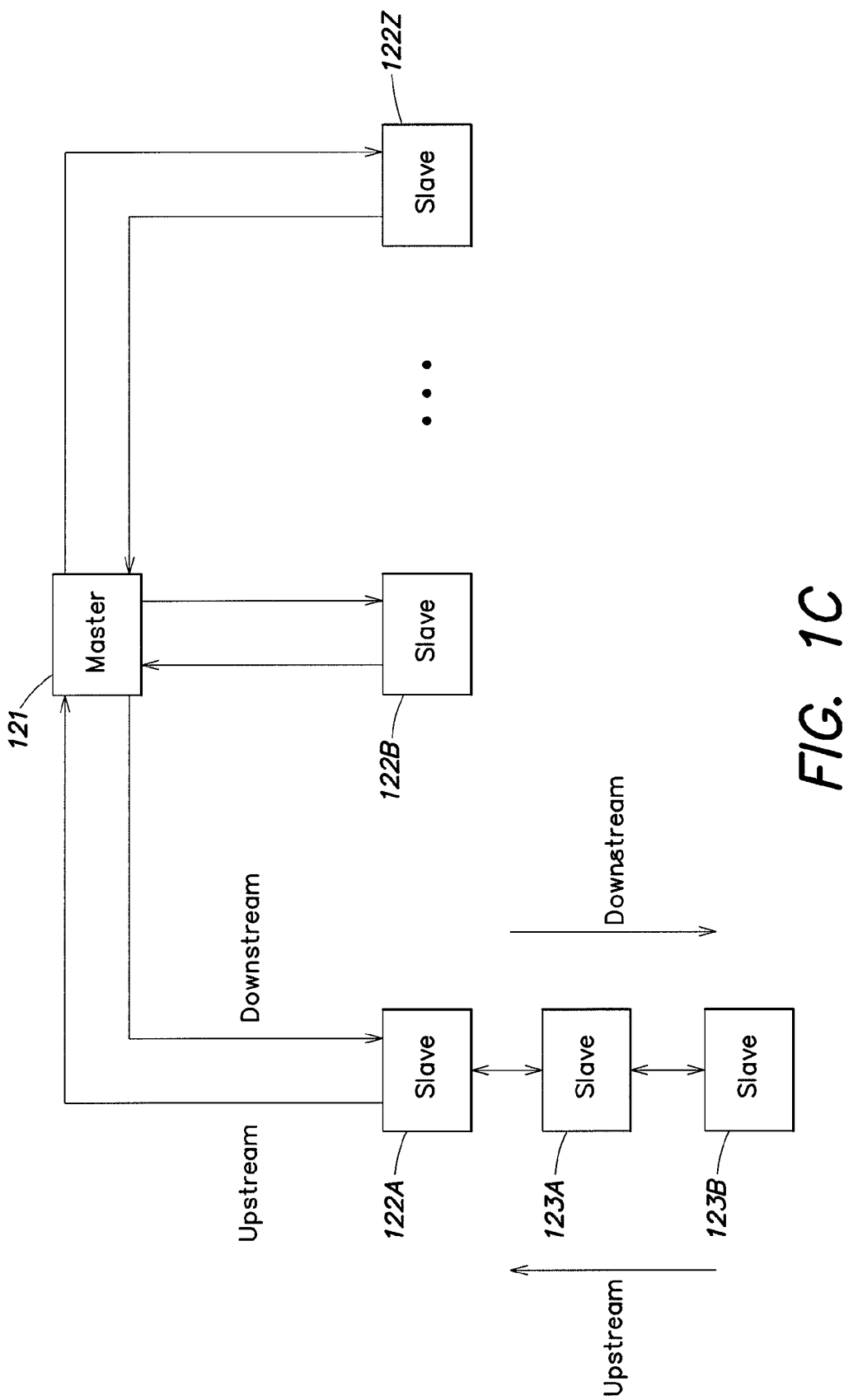

FIGS. 1A-1C show various configurations of communication systems that implement various aspects consistent with principles of the present invention. In particular, FIG. 1A shows a master device 101 coupled to one or more slave devices 102A-102Z in a serial-chain configuration. In this configuration, master 101 includes at least one serial link which is directly coupled to a slave 102A. Slave 102A includes at least one other serial link to which at least one other slave is attached.

According to one embodiment of the present invention, a slave device (e.g., slave device 102A) is configured to operate in a pass-through mode whereby data transmitted by downstream slave devices is passed to the master by the slave operating in a pass-through mode. Further, data produced by the master is passed through the chain and observed by authenticated devices that are attached to the chain. In this way, the same set of data from the master can be observed by all devices on the chain. According to one embodiment, pass-through devices do not repeat information downstream until that particular pass-through device authenticates with the master. In another embodiment, once a pass-through device has authenticated with the master device, the pass-through device allows downstream devices to join the conversation with the master device. For example, a downstream slave with attempt to authenticate with the master device once the pass-through device is authenticated. In this manner, a pass-through device authenticates first, then "opens the door", allowing a next slave device to authenticate with the master. This process is repeated of "opening" downstream pass-through slaves until the end slave device authenticates with the master device.

FIG. 1B shows an alternate configuration that also permits multiple slave devices (e.g., slave devices 112A-112Z) to communicate with a master (e.g., master device 111). In this configuration, master device 111 is provided more than one serial port which may be coupled to more than one corresponding slave device in a star configuration. In this configuration, information communicated to one slave device is repeated to other slave devices by the master. In this way, each slave device receives the same information from the master. For instance, when a change in data is communicated from a slave to the master device, this change in information is repeated to other slave devices.

Further, an authentication method is provided wherein each slave device authenticates with the master device in order to have access to the data stored in the master. As discussed further below, one aspect of the present invention relates to a protocol that operates on a common memory map that is stored in registers of the master device.

In a further configuration as shown in FIG. 1C, both the star-based and serial chain-based configurations may be used together in the same configuration, permitting multiple devices to monitor and control the master device. For instance, as shown in FIG. 1C, slaves 122A-122Z are directly coupled to a master device 121 via serial communication links. Further, in this example configuration, slave 122A includes at least one additional serial link that is coupled to a downstream slave 123A in a serial chain configuration. As shown, slave 123A is serially-connected to a further slave 123B which is located at the end of the chain, off of one of the branches of the star configuration. Because both of these configurations are supported, more flexible configurations for connecting to a master device are possible.

Figure 2A:
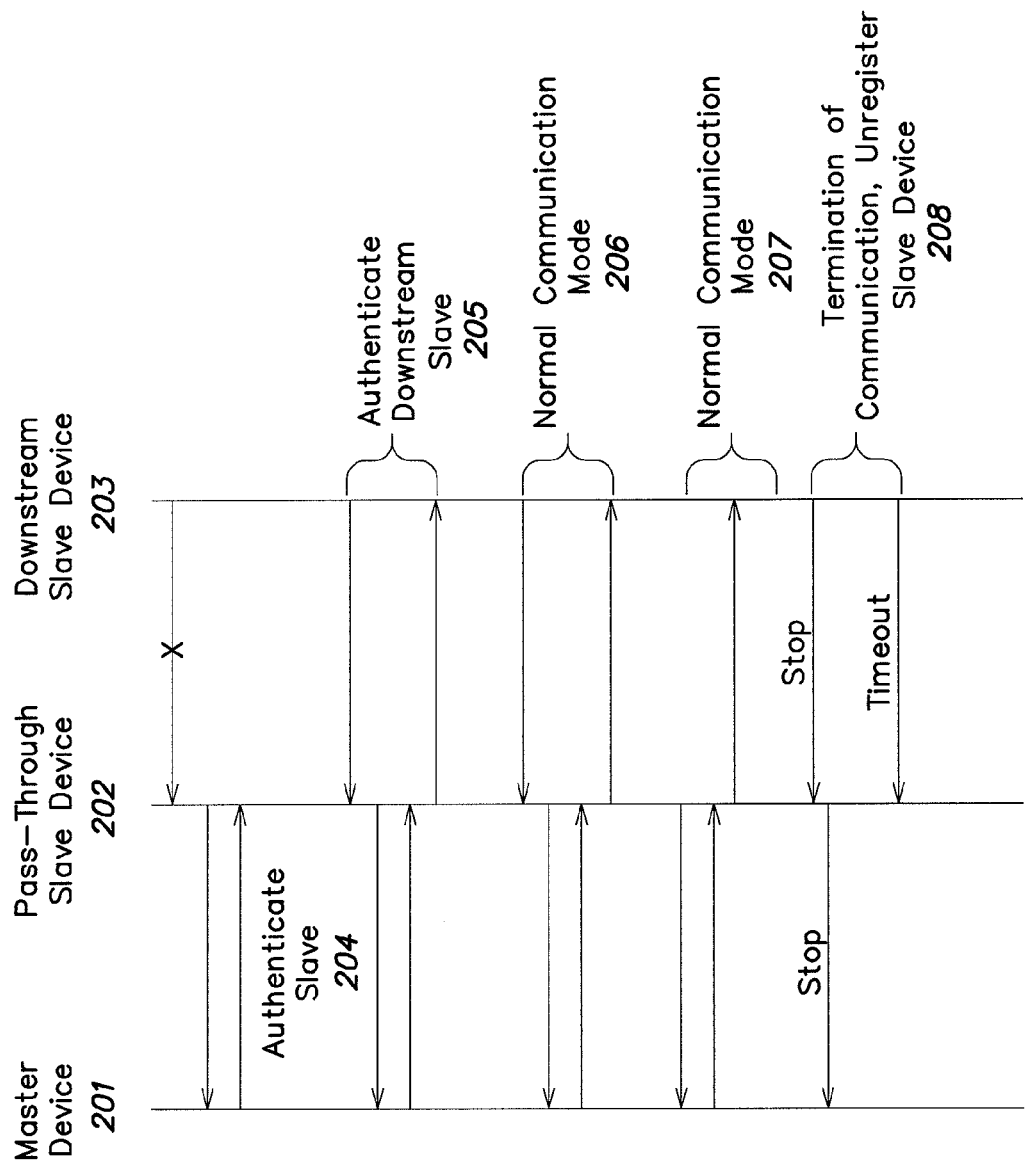
FIGS. 2A-2C show processes for conducting communications according to one embodiment of the present invention.

FIG. 2A shows one example of a communication process according to one embodiment of the present invention. For instance, as shown in FIG. 2A, a master device (e.g., master device 201) may communicate to one or more downstream slave devices (e.g., downstream slave device 203) through one or more pass-through devices (e.g., pass-through device 202). Such a process may occur, for example, using a serial chain configuration as shown in FIG. 1A. In one embodiment, communication may begin with the downstream slave device requesting to communicate with the master. In one embodiment, if a downstream slave requests communications to a master device that is not authenticated with the master, that communication is blocked by the pass through device (e.g., device 202).

The pass-through slave device is permitted to authenticate with the master device (e.g., at 204), and once authenticated, the pass-through slave may be permitted to pass information to other downstream slave devices under certain conditions (e.g., once they have authenticated with the master device). For instance, after a pass-through device to which a downstream slave device is directly connected has authenticated with the master device, the downstream slave device may then authenticate with the master device (e.g., at 205). In one embodiment, the authentication may involve a bidirectional authentication between a slave and a master device as discussed further below.

Once authenticated, the downstream slave (e.g., downstream slave device 203) may communicate with a master device (e.g., master device 201) in a normal communication mode (e.g., mode 206). Normal communication may involve, for example, the downstream slave device requesting data from the master (e.g., a request to read a portion of a memory map, register, or other data), transmit commands to be executed on the master, and/or to control the use of the protocol (e.g., stop communications). In one embodiment, when data is communicated from a downstream slave, the pass-through slave device passes such data bytes upstream toward the master device. The master device generally responds to the data (e.g., by verifying that a command has been executed, returning a memory map portion of the data, etc.) and that response is received by the pass-through device and transferred to one or more downstream slave devices away from the master device. In one embodiment, additional pass-through devices may be positioned between the master device and a downstream slave device at an end of a serial chain of devices. In this case, each slave device repeats data received either toward the master or end slave device as appropriate.

Further, in another normal communication mode, an upstream slave device (e.g., pass-through device 202) may send its own data (e.g., commands, requests for data, etc.) to the master device 201 (e.g., as shown by normal communication mode 207). Because this data is sent unidirectionally toward the master device, downstream slave devices may be unaware of the communication by upstream slave devices. According to one embodiment, downstream slave devices are kept current by transmitting the response from the master to the upstream slave request to any downstream slave devices. In this way, the "view" of the current state of the master device is consistent among multiple slave devices.

Further, according to other embodiments, the normal communication mode along the serial chain may be interrupted, such as in the case where a device is removed from the chain, a slave device halts communication or otherwise fails. According to one embodiment, when a change in configuration occurs, each device along the chain may be required to re-authenticate with the master device. Termination of communication (e.g., element 208) may occur when any slave device issues a command that halts the protocol (e.g., a "STOP" command) or the communication exceeds a timeout or otherwise fails. In one embodiment, the failed device(s) are unregistered from the master device, and need to reauthenticated to resume normal communications.

In yet another operation mode, when a downstream slave device times out, issues a STOP command, or otherwise fails, the slave device to which the downstream slave device is directly connected continues communication with the master device. In such a mode, any remaining slave device may not need to re-authenticate themselves with the master device. In such a case, for example, the last remaining slave may be responsible for detecting the loss of the downstream slave device and continuing communication with the master device (or any upstream slave devices).

According to one embodiment, a pass-through device may implement a timer that observes the timing of upstream and downstream communications. According to one embodiment, the timer may reset when data is received in either direction. For instance, when a timer exceeds a maximum period of time (e.g., 1.5 seconds, 3 NAK times, etc.), communications may be resent. A timeout may result in a pass-through device eliminating or closing communication to a downstream slave device that does not respond within the timeout period. Also, if a communication from the master device is expected, communications with the master can be reset. According to yet another embodiment, there may be a pause mode where pass-through and other devices may pause for a longer time period without having to restart the authentication process.

Figure 2B:
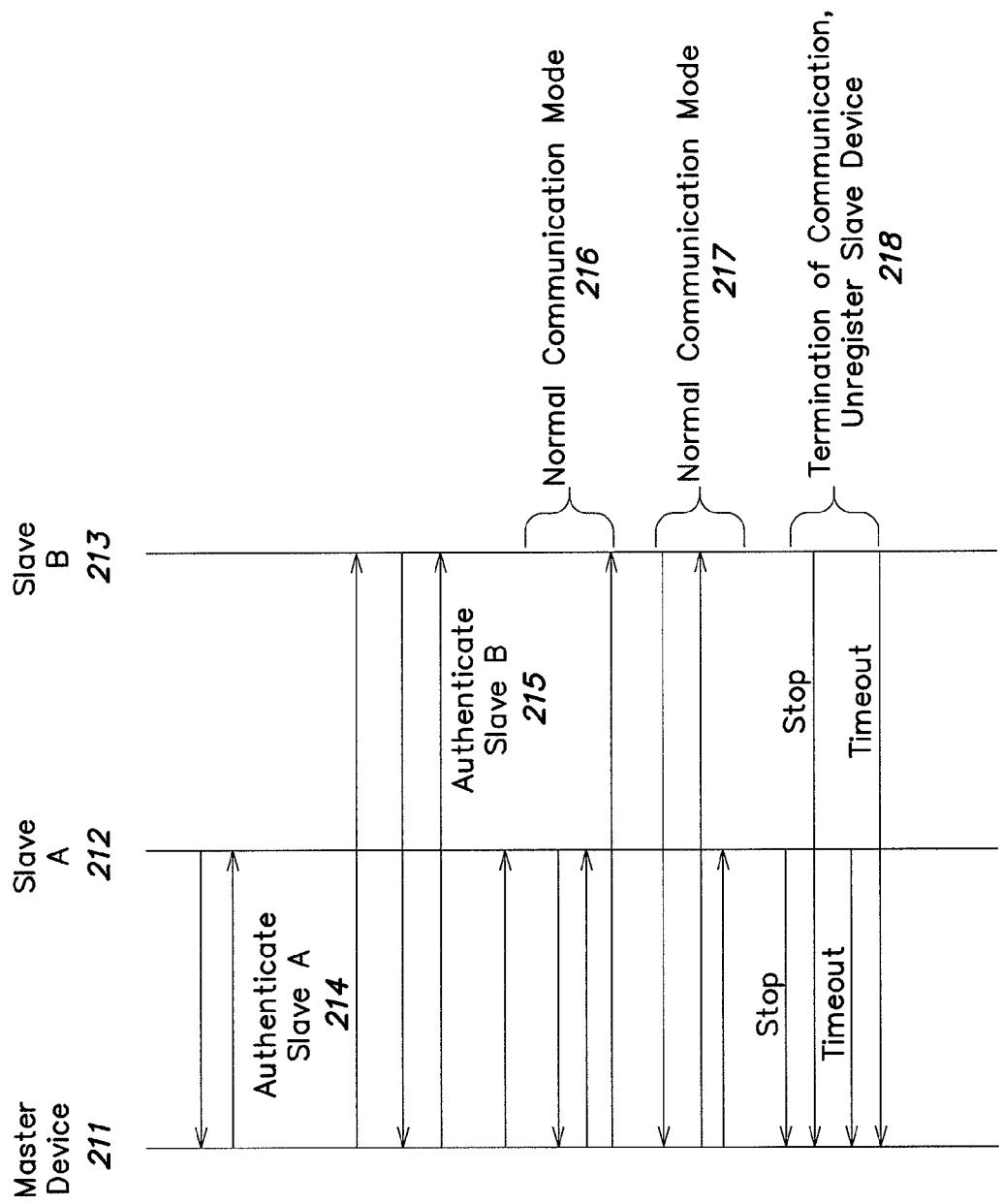

FIG. 2B shows another example of a communication process according to one embodiment of the present invention. For instance, as shown in FIG. 2B, a master device (e.g., master device 211) may communicate to one or more slave devices (e.g., slave device A 212, slave device B 213). Such a process may occur, for example, using a star configuration as shown in FIG. 1B. In one embodiment, communication may begin with one or more of the slave devices requesting to communicate with the master.

The slave device is permitted to authenticate with the master device (e.g., at 214, 215), and once authenticated, the slave may be permitted to communicate with the master device. According to one embodiment, as there may be more than one slave device connected to the master device (e.g., through different serial links), the master may authenticate each slave one-by-one, until a normal communications mode is achieved. For instance, if communications are interrupted, each slave with reauthenticate with the master. According to one embodiment, as a slave device authenticates with the mater device, authentication information is not repeated to other devices that are currently authenticated with the master device. That is, in a normal operation mode, information is generally repeated to all authenticated slaves, but for security purposes, authentication information is not repeated. In one embodiment, information is transferred to other slaves that indicate authentication is being performed with other slave devices, but the actual information used to authenticate the slave devices (e.g., challenge/response information) is not repeated. In one embodiment, the authentication may involve a bidirectional authentication between a slave and a master device as discussed further below.

Once authenticated, the slave devices (e.g., slave device A 212, slave device B 213, etc.) may communicate with a master device (e.g., master device 211) in a normal communication mode (e.g., mode 216, mode 217). Normal communication may involve, for example, the slave device requesting data from the master (e.g., a request to read a portion of a memory map, register, or other data), transmit commands to be executed on the master, and/or to control the use of the protocol (e.g., stop communications). In one embodiment, when data is communicated from a slave, the master device generally responds to the data (e.g., by verifying that a command has been executed, returning a memory map portion of the data, etc.) and that response is then repeated to all other authenticated slave devices (e.g., repeated on all other serially-connected interfaces in the star configuration). This permits, for example, the "view" of the current state of the master device to be consistent among multiple slave devices.

Further, according to other embodiments, the normal communication mode in the star configuration may be interrupted, such as in the case where a device is removed from an interface, a slave device halts communication or otherwise fails. According to one embodiment, when a change in configuration occurs, each device in the star configuration may be required to re-authenticate with the master device. Termination of communication (e.g., element 218) may occur when any slave device issues a command that halts the protocol (e.g., a "STOP" command) or the communication exceeds a timeout or otherwise fails. In one embodiment, the failed device(s) are unregistered from the master device, and need to reauthenticated to resume normal communications.

In a mixed-mode configuration wherein both the star-base and serial-based communications are used (e.g., in FIG. 1C), information from the master device is repeated to all serial links having an authenticated slave device attached, including a serially-connected chain of slave devices. Information sent to a pass-through slave device on that chain is repeated serially down the chain to the other connected devices (e.g., ones that are authenticated to the master device). In the case that communication is interrupted or otherwise stopped to any authenticated slave, according to one embodiment, all slaves will reauthenticated to the master in a port-by-port, device-by-device manner along each port and down each chain. Thereafter, information from the master device may be shared consistently with each authenticated device.

Figure 2C:
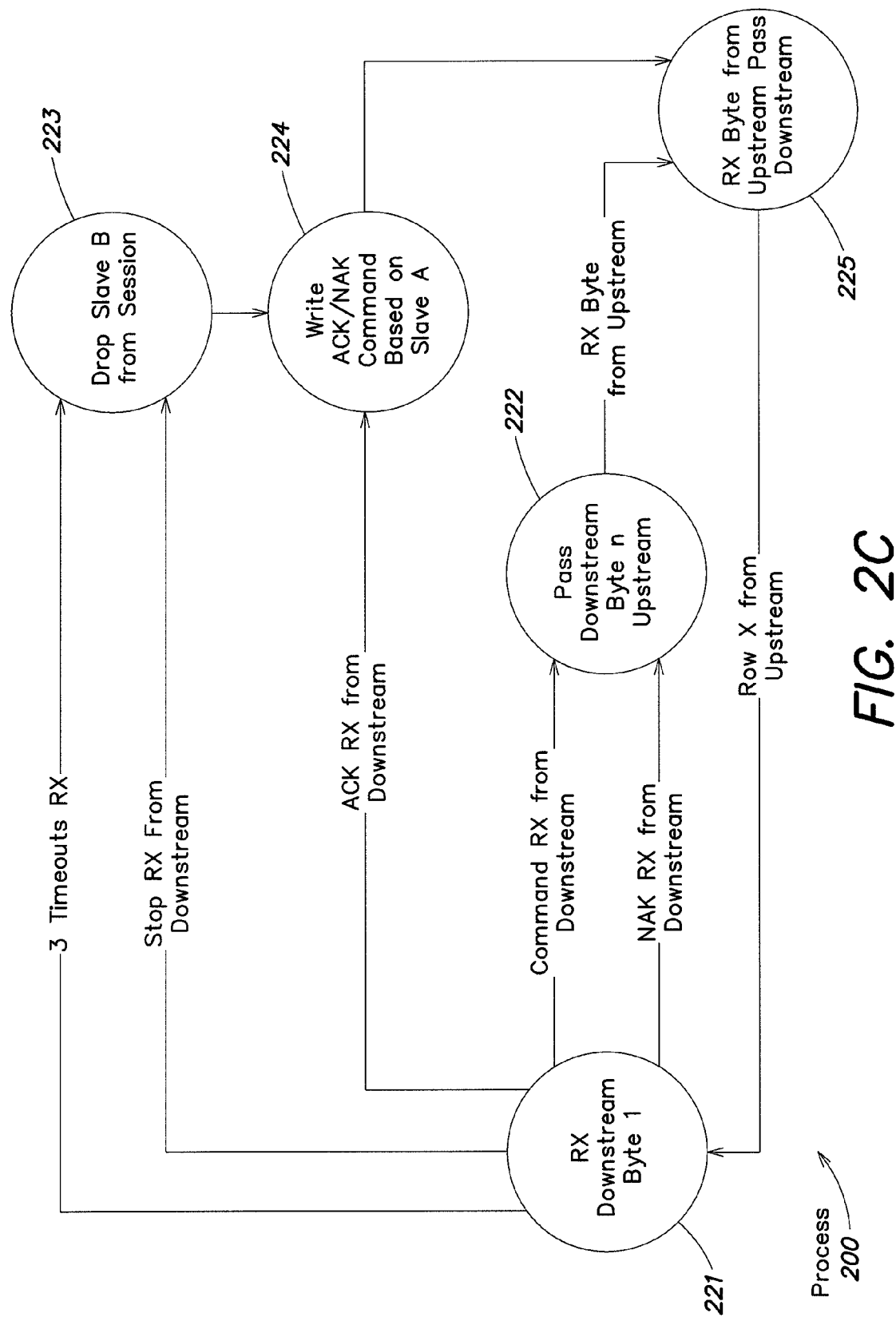

FIG. 2C shows a process 200 for conducting communications according to one embodiment of the present invention. For instance, a serial chain configuration of slave devices such as that shown in FIG. 1A may be capable of performing process 200. According to one embodiment of the invention, a pass-through slave device (slave A) may be passing data from one downstream slave device (slave B) towards the master device. As shown in FIG. 2C, a slave device may receive a row X from an upstream slave device. More particularly, a slave device may be capable of writing to one or more memory rows within a memory map of a master device. To this end, a slave device may transfer a row of memory in a communication from a slave device to the master device. At block 221, when a row X is transmitted by an upstream slave device, a pass-through device (slave B) receives the data and processes it.

The received data could include one of a number of types of communications, such as, for instance, a stop command, an acknowledgement (ACK), a negative acknowledgement (NAK), a command, or other communication type. Also, a timeout could be experienced which may cause communications to be terminated. For instance, if, after three timeouts occur, a slave (e.g., slave B) may be dropped from the session at block 223. Further, if a slave B sends a stop command to the pass through device, the pass-through device (slave A) will drop the slave B device from the session.

In another embodiment, if an ACK message is received from a downstream slave device (e.g., slave B), the ACK command based on slave A is executed (e.g., at block 224). That is, the intermediate slave replaces the status message with their own status message, as it would be beneficial for all devices along the chain to have received the message. However, if a NAK message is received from a downstream node, then it is indicated that the downstream node has not received the message and thus does not have a consistent view of the master device. In such a case, the received NAK message is passed upstream towards the master by the pass-through device (e.g., at block 222).

Thus, in summary, data received from downstream slave devices are passed upstream and repeated by each intermediate slave device. Commands executed by downstream slave devices are passed upstream and executed on the master. The results of these commands are generally in the form of a memory row which is transferred back towards the slave device along with the serial chain configuration. In this way, each of the slave devices along the serial chain is capable of observing the change in memory map data that occurs on the master device. However, in the upstream direction, intermediate slave devices perform little to no processing on messages sent by other downstream slaves, allowing for minimal delay in data being communicated to the master device. According to one embodiment, commands sent upstream are in a multibyte form, and slaves do not parse the received multibyte message received from downstream slave devices. The intermediate slave devices merely repeat downstream communications upstream and observe the data sent back from the master device.

According to one embodiment, intermediate slave devices perform packet validation, but the intermediate slave devices do not attempt to understand data residing within the packet. Not only is this beneficial from a timing perspective, but according to one embodiment, this feature also "future-proofs" the protocol so that an intermediate device need not understand all of the commands and/or data that could be generated by downstream slave devices. In this way, different slave devices having different functionality can coexist on the same serial chain without disruption of the protocol.

The change in the master device is observed when the master receives the command and transmits the response to all slaves. As described in the example above, if there is a chain of devices 1-10, and if device 3 generates a command, devices 1 and 2 will see the command going towards the master. However, devices 4-10 have no knowledge of the command. To account for this scenario according to one embodiment, the master is adapted to send the response to the command to all slave devices. In this way, every device "sees" the command. In another case where device 10 sends command 1 and device 4 sends command 2, device 4 determines which command goes through to the master device. Because device 4 only permits one command to pass, the master will process only one command (the command from device 4). Therefore, device 10's command will never be acted upon, and device 10 will rely on the response from the master to determine that its' command was not received and that device 10 should retry transmission of the command. For these reasons, slaves only respond to data from the master, and "ignore" the commands traveling upstream and wait for the master to process them and give the response.

Figure 3A:
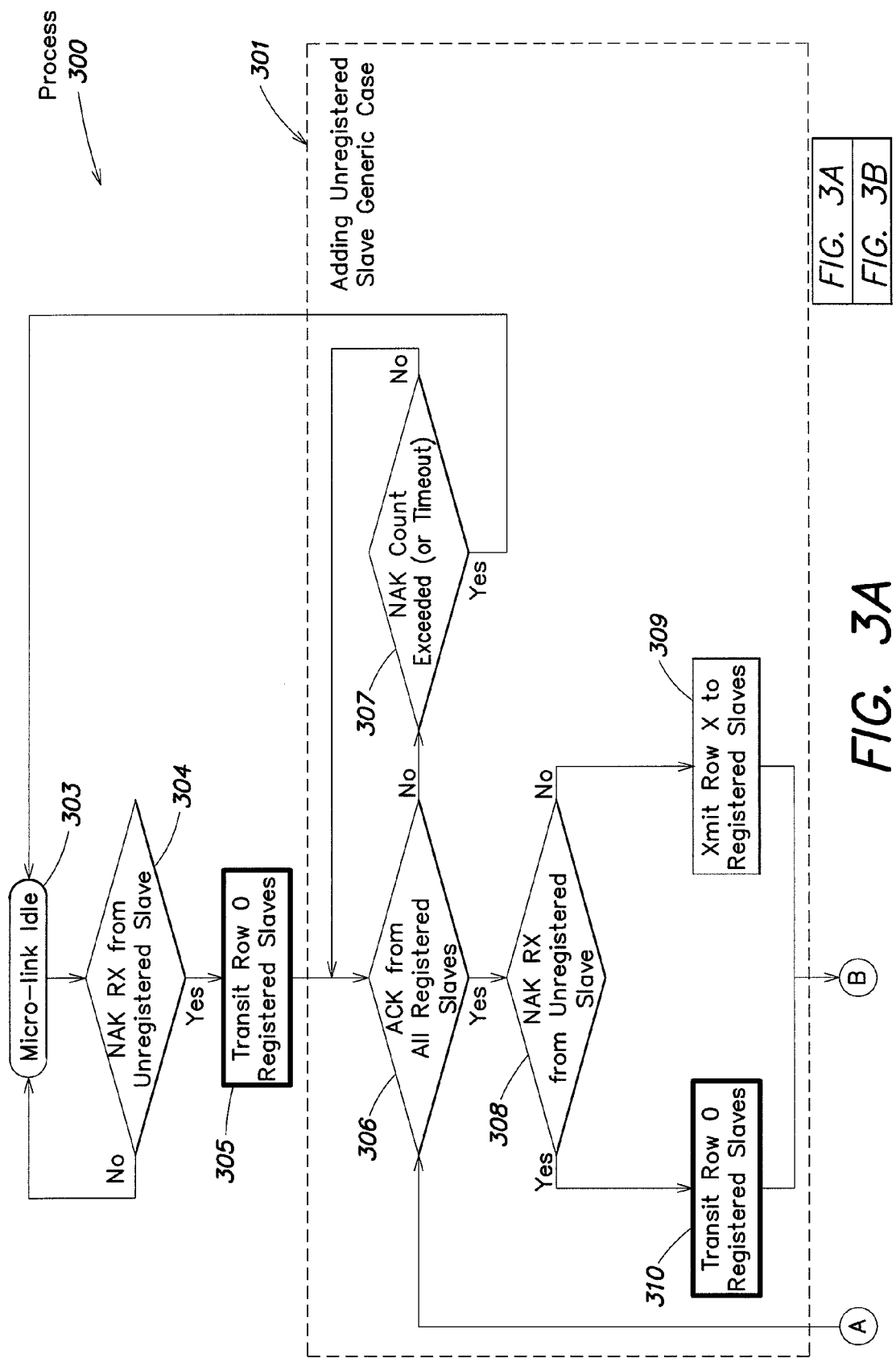
FIGS. 3A-3B show processes for adding and removing slave devices according to various embodiments of the present invention.
Figure 3B:
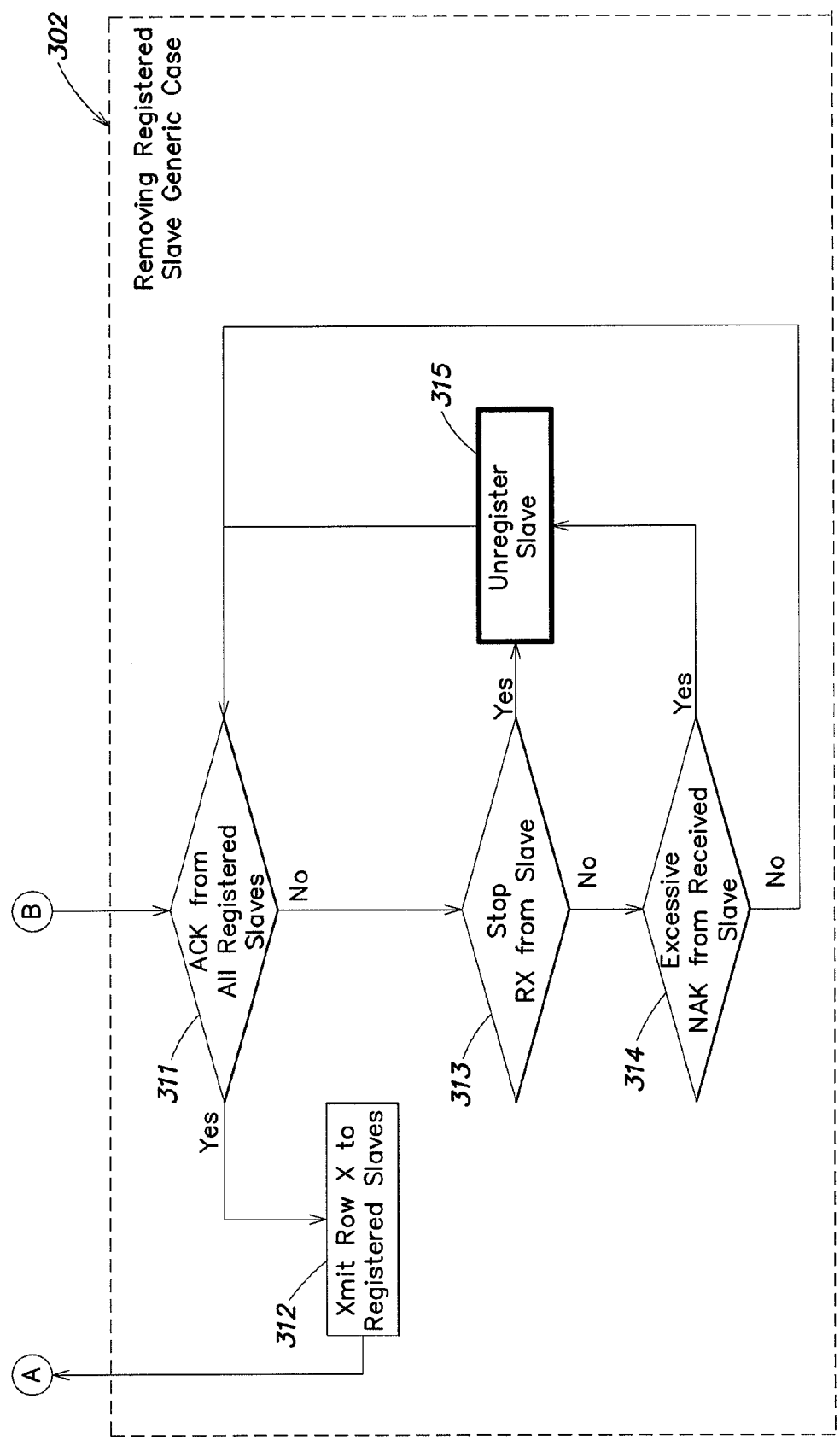

FIGS. 3A-3B shows a process 300 for registering slave devices with the master according to one embodiment of the present invention. For instance, process 300 shown in FIG. 3A may be applied to slave devices in a star topology as discussed above with reference to FIG. 1B. Process 300 includes a block 301 shows a process for adding an unregistered slave to the list of slaves communicating with the master device. Block 302 shows a process for removing registered slaves from communication with the master device.

A majority of the time, it is appreciated that the configuration of the slave devices will be in a normal operating mode where data is being passed from master devices to slave devices. Occasionally, slave devices will be added or subtracted from the communication as necessary in order to manage the master device. As shown in FIG. 3A, at block 303, the protocol operates in an idle state until a NAK is received from an unregistered slave device (e.g., as determined at block 304). That is, a NAK message from an unregistered slave is recognized by the master device as a request to be added to the communication with the master device. At block 305, the unregistered slave transmits a row is zero to register slave devices.

At block 306 if an ACK is received from all registered slaves and if a NAK is received from an unregistered slave at block 308, then the master transmits row 0 of the memory map to the registered slaves at block 310 at block 309, the master transmit through acts to the registered slaves. At block 307, if an NAK count is exceeded (or a timeout is experience), then the process starts over from an idle mode. Otherwise, the protocol operates in the normal mode where information is passed to and from the master device from registered slave devices. At block 311 if an ACK is received from all registered slave devices, the master transmits a row X of the memory map to all registered slaves at block 312. If an NAK is received from an unregistered slave, then that NAK is interpreted to be a request for addition to the serial by the unregistered slave device. If, for example, an ACK is not received from all registered slave devices, and if at block 313, data is not received from a slave device, then that slave is unregistered at block 315. However, if the slave device still continues to communicate but yet excessive NAK messages are received from the slave device, that slave device will become unregistered.

Figure 3C:
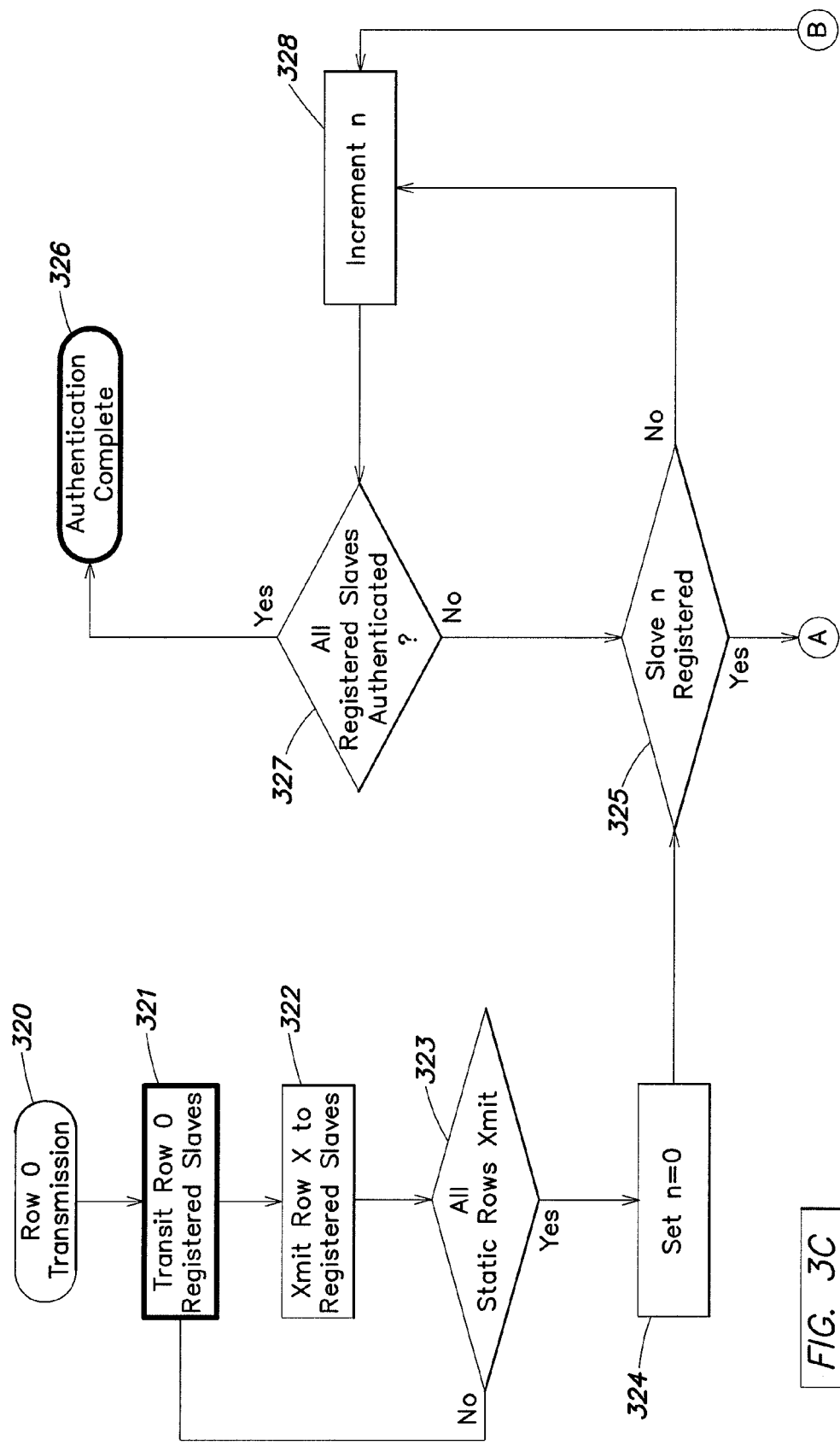
FIGS. 3C-3E shows an authentication method according to one embodiment of the present invention.
Figure 3D:
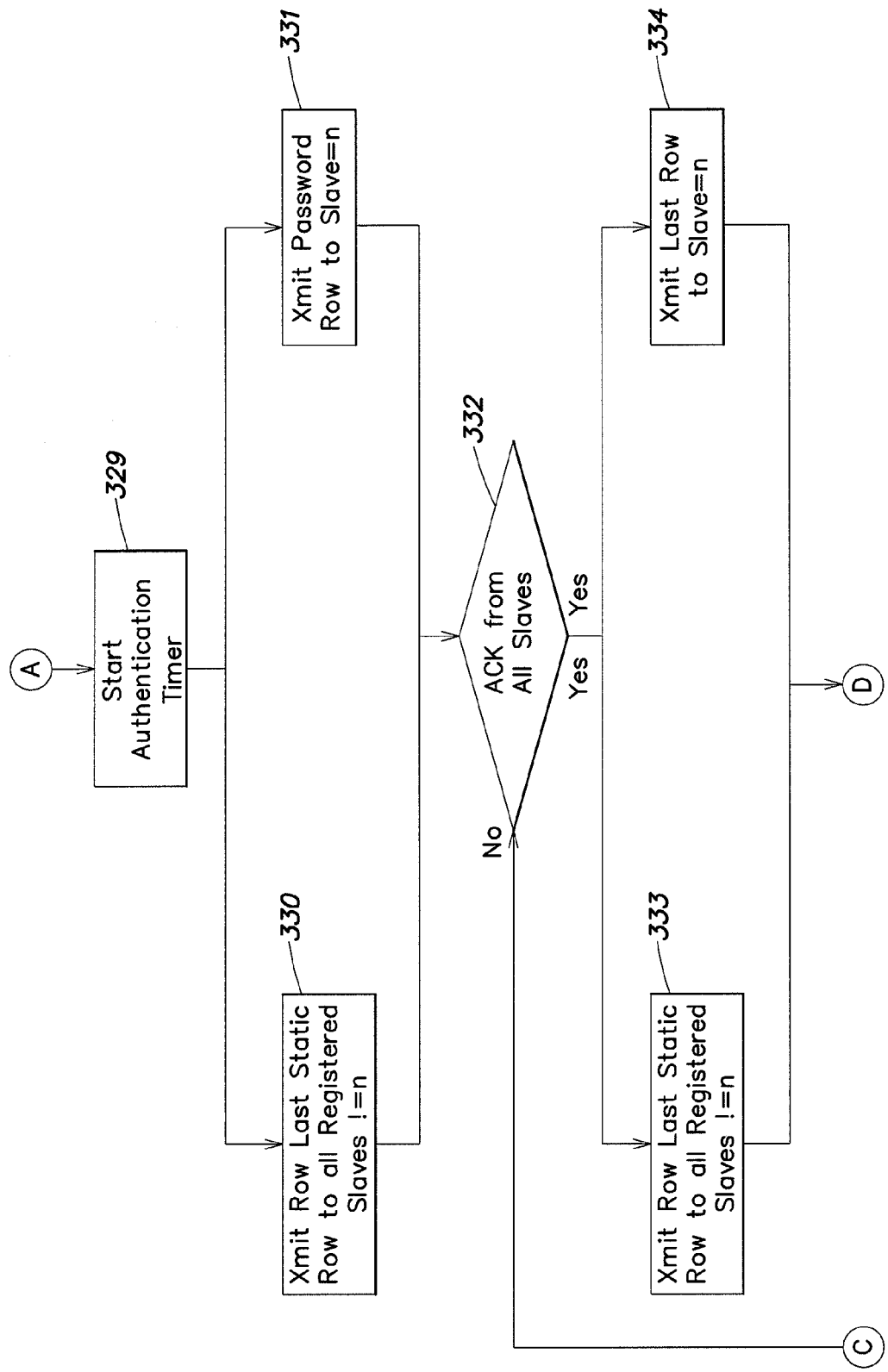
Figure 3E:
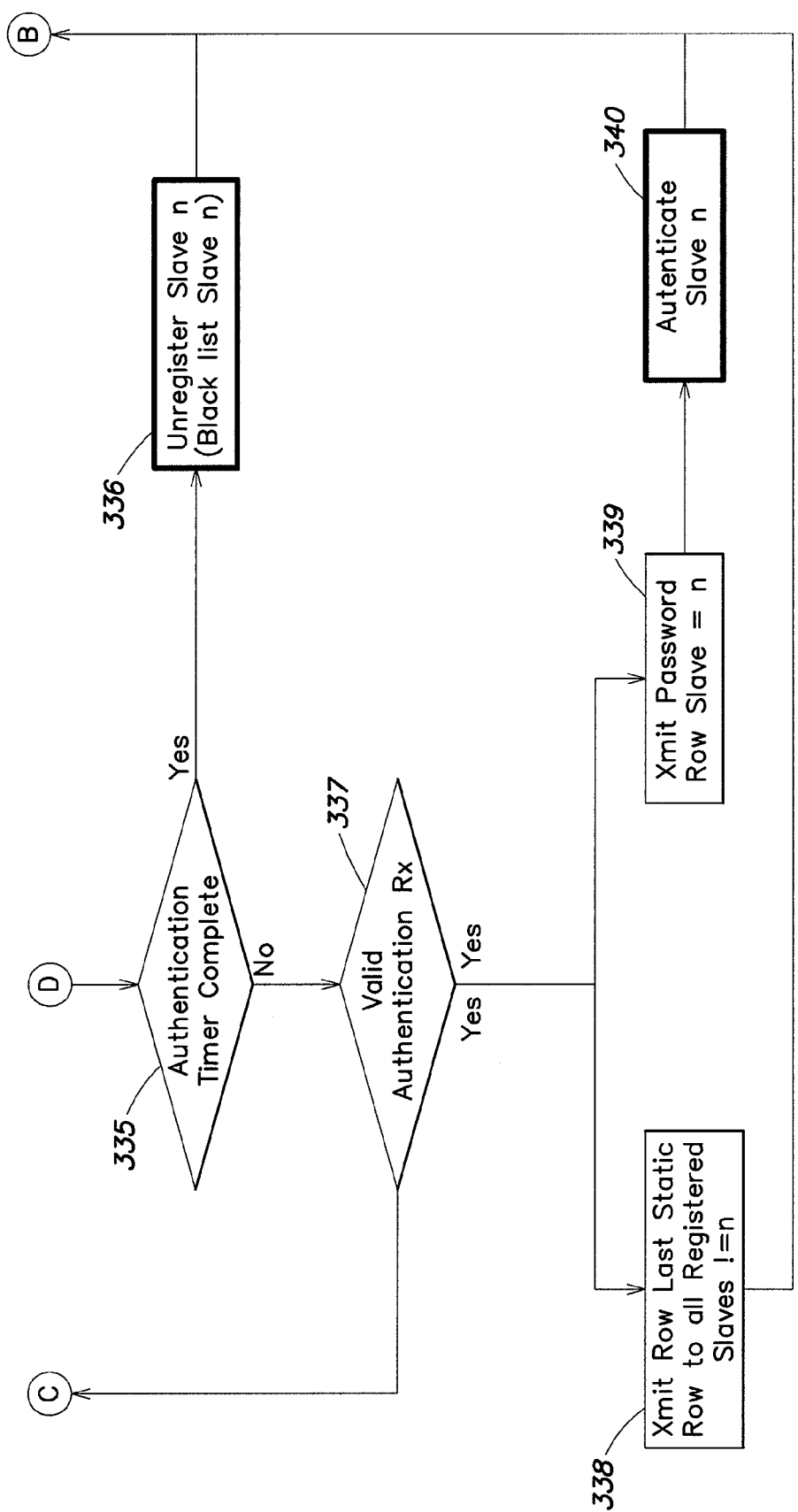

FIG. 3C-3E shows a process for authenticating slave devices according to one embodiment of the present invention. At block 320, the master device transmits row 0 of the memory map to all registered slave devices. In one instance, the information in row 0 may be static data discussed below that may be communicated by the master device without the need for authentication as further discussed below.

According to one embodiment, the master device may store a record of registered slave devices (e.g., ones that the master has previously communicated) in a memory (e.g., a register, memory map, etc.) of the master device. The master may proceed to transmit all of the rows of static data (e.g., in blocks 321, 322) to all registered slave devices. If, at block 323, it is determined that all static rows have been transmitted from the master, then n (the number of registered slave devices) is set to 0 at block 324.

At block 325, it is determined for a location n whether there is a slave device registered. If not (e.g., there is not a registered slave device at location n), then n is incremented at block 328. At block 327, it is determined whether all registered slave devices are authenticated. If so, authentication is complete at block 326, and normal communication mode occurs. If not, it is determined whether there remain any unauthenticated slaves, and these an attempt is made to authenticate them.

At block 329, an authentication timer is started, and according to one embodiment, there may be a fixed amount of time permitted for slave devices to authenticate to the master device. At block 330, the last static row is transmitted to all registered slaves. In parallel, a password row is transmitted to the slave device being authenticated (slave device n) at block 331. If, at block 332, it is determined that an acknowledgement message is received from all slave devices (e.g., the slave device being authenticated acknowledging the receipt of the password row, and the remaining slave devices acknowledging the last row of static information). If so, the last static row is transmitted again to all registered slave devices at block 333. At block 334, a last row is transmitted to the slave device being authenticated.

At block 335, it is determined whether the authentication time has expired. If so, the slave device being authenticated (slave device n) is unregistered from the master device at block 336, as the authentication has timed out. If the authentication has not timed out, and a valid authentication is received at block 337, then the last static row is again sent to all slave devices (at block 338), and the last password row is sent to slave device n. At block 340, slave device n is placed in an authenticated state. The integer n is incremented at block 328, and it is determined whether there are any additional devices to authenticate at block 327. If so, the same authentication process may occur with a different registered but unauthenticated device (e.g., slave device n+1). This process may continue until all registered slave devices are authenticated.

In a serial chain configuration, slave devices may register themselves with a master device in a similar way as discussed above with respect to the star configuration. However, the authentication process may include authenticating each slave device one-by-one, beginning with the slave device closest to the master device, working away from the master device downstream along the serial chain. In such a configuration, each slave device authenticates one by one along the chain, with any intermediate slave devices operating in a pass-through mode. That is, the intermediate slave devices, once authenticated, repeat authentication information either upstream or downstream, as appropriate, when received from the opposite direction. The authentication process ends when the last slave device farthest from the master device is authenticated.

Example Serial Link Protocol

FIGS. 4-22 (discussed further below) show an example serial link protocol that may be used to communicate information according to various aspects of the present invention, either alone or in various combination with the aspects for communicating information between master and slave devices as discussed above with reference to FIGS. 1A-3B.

Figure 4:
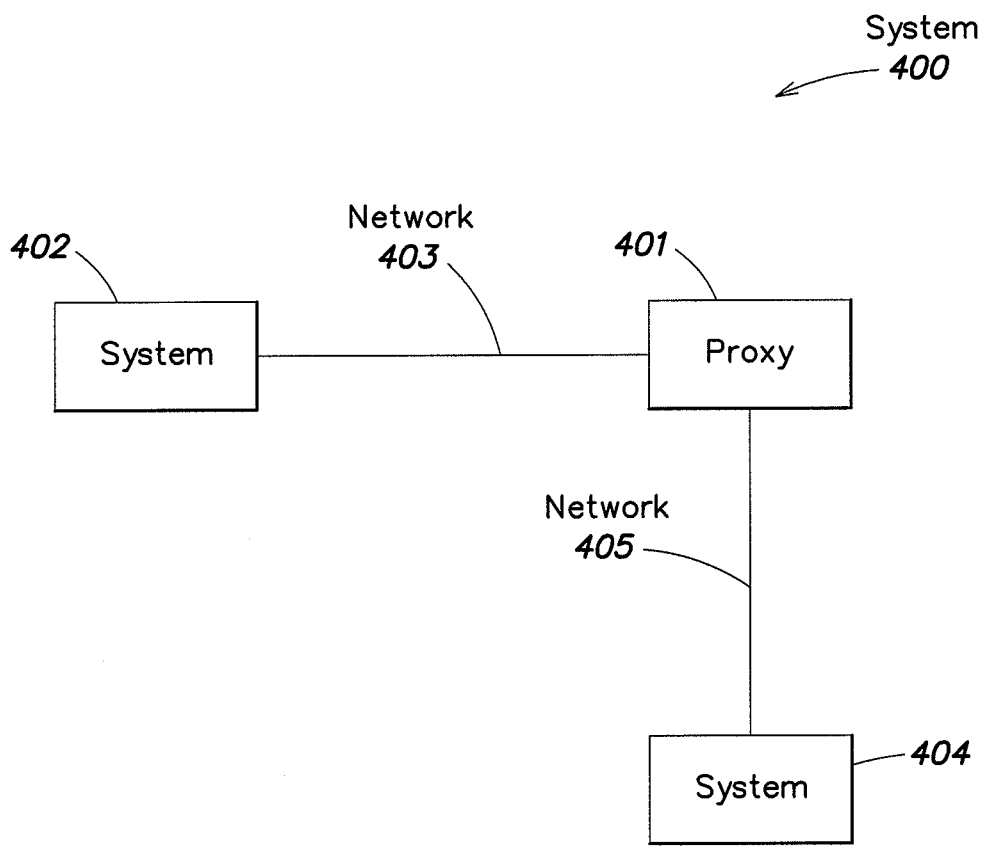
FIG. 4 is a block diagram of an example network system in which various aspects of the present invention may be practiced.

FIG. 4 is a block diagram of an example network system in which various aspects of the present invention may be practiced. In particular, system 400 includes one or more systems connected by one or more networks. In the example shown, system 402 is coupled to a proxy system 401 over network 403. According to one aspect of the present invention, proxy system 401 has a capability for communicating to system 402 using a communication protocol. Communication with system 402 may be useful, for example, for monitoring or managing system 402 by system 404. In an alternative configuration (not shown), system 402 may be coupled directly to another system (e.g., system 404), and various aspects of the communication protocol described herein may be used to communicate between them. A proxy system may be used, for example, to communicate with other types of systems that do not function as native slave devices.

Further, according to another aspect of the present invention, a proxy system 401 is provided that translates requests from one or more systems (e.g., system 404) to requests that may be recognized by system 402. These requests may be, for example, messages generated by an application program executing on system 404. One example application program that may generate such requests is a management program that is provided for managing one or more systems (e.g., system 402). These requests may include control data used to control and configure system 402, requests for performance and/or status information from system 402, among others. To this end, proxy 401 may be capable of translating received management requests to messages that are capable of being processed by system 402. Although proxy 401 may be capable of communicating management data, it should be appreciated that proxy 401 may be capable of translating any type of request having any type of data.

It should be appreciated that proxy system 401 is capable of being coupled to more than one system. In one example, proxy system 401 is coupled to two or more networks (e.g., network 403 and network 405). To this end, proxy 401 may have more than one network interface. Proxy 401 may also be capable of communicating using one or more communication protocols. According to one aspect of the present invention, a proxy may be capable of learning new protocols from a system to which the proxy system is coupled. A specific example of a proxy and its capabilities are discussed below with reference to FIG. 21.

System 400 is merely an illustrative embodiment of a communication system that may implement one or more aspects of a communication protocol according to various embodiments of the invention. Such an illustrative embodiment is not intended to limit the scope of the invention, as any of numerous other implementations of the system (e.g., variations of 400 having more or less systems) are possible and are intended to fall within the scope of the invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. In one specific embodiment, various aspects of a communication protocol are provided that may be used by computer systems such as controllers. Such controllers may be embedded in one or more systems, such as, for example, an Uninterruptible Power Supply (UPS) or one of its components. However, it should be appreciated that one or more of any type computer system may be used to communicate according to various embodiments of the invention. It should also be appreciated that different types of systems (e.g., a PC, a controller, etc.) may communicate with each other using various aspects of the present invention.

A general-purpose computer system according to one embodiment of the invention is configured to perform any of the described communication functions including but not limited to communicating between computer systems and/or relaying data to other systems (e.g., to system 506). It should be appreciated that the system may perform other functions, and the invention is not limited to having any particular function or set of functions. Various entities such as, for example, systems 402, 404 and proxy 401 may be general-purpose computer systems that implement various communication functions according to various embodiments of the present invention.

Figure 5:
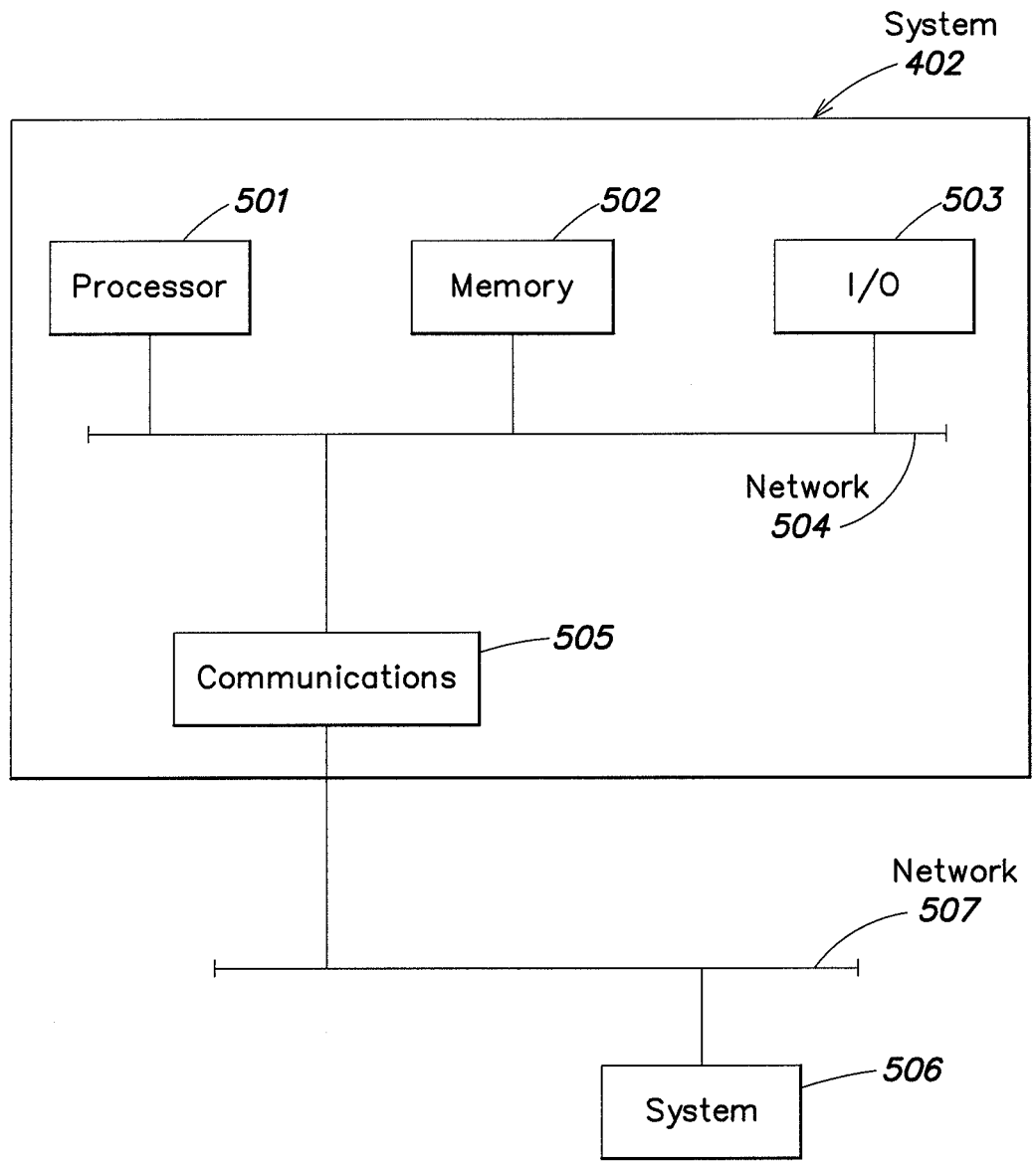
FIG. 5 is a block diagram of a communication system according to one embodiment of the present invention.

For example, various aspects of the invention may be implemented as specialized software executing in a general-purpose computer system such as that shown in FIG. 5. The computer system 402 may include a processor 501 connected to one or more memory devices 502, such as a disk drive, memory, or other device for storing data. Memory 502 is typically used for storing programs and data during operation of the computer system 402. Components of computer system 402 may be coupled by an interconnection mechanism (e.g., network 504), which may include one or more busses (e.g., between components that are integrated within a same machine) and/or a network (e.g., between components that reside on separate discrete machines).

The interconnection mechanism 504 enables communications (e.g., data, instructions) to be exchanged between system components of system 402. System 402 also includes one or more I/O devices 503 (e.g., ports, devices, systems, etc.) for inputting and outputting data. In addition, system 402 may contain one or more interfaces 505 that connect computer system 402 to a communication network 507. System 402 may be capable of learning one or more protocols used to communicate by one or more systems (e.g., system 506).

According to one embodiment of the invention, interface 505 may be a serial-type interface that is used to communicate to an attached device. The interface may be capable of communicating using various aspects of the present invention. Such an interface 505 may use one or more serial-type transport layer protocols including, but not limited to, TTL serial, RS-232, RS-422, RS-485, I2C, CAN, or any other transport layer capable of moving packets between systems.

System 402 typically includes a storage mechanism as a part of memory 502 or other storage that includes computer readable and writeable nonvolatile recording medium in which signals are stored that define a program to be executed by the processor or information stored on or in the medium to be processed by the program. The medium may, for example, be a disk, flash memory, EEPROM, RAM, or the like. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). This memory may be located in a storage system, or in memory system 502.

The processor 501 generally manipulates the data within the memory and then copies the data to the medium after processing is completed. A variety of mechanisms are known for managing data movement between the medium and the memory elements, and the invention is not limited thereto. It should be appreciated that the invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 402 is shown by way of example as one type of computer system upon which various aspects of the invention may be practiced, it should be appreciated that aspects of the invention are not limited to being implemented on the computer system as shown in FIG. 5. Various aspects of the invention may be practiced on one or more computers having a different architecture or components that that shown in FIG. 5.

System 402 may be a general-purpose computer system that is programmable using a high-level computer programming language. System 402 may be also implemented using specially programmed, special purpose hardware. In computer system 402, processor 501 is typically a commercially available processor such as the well-known Pentium class processor available from the Intel Corporation. Many other processors are available. Such a processor usually executes an operating system which may be, for example, the Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented as programmed or non-programmed elements, or any combination thereof.

Figure 6:
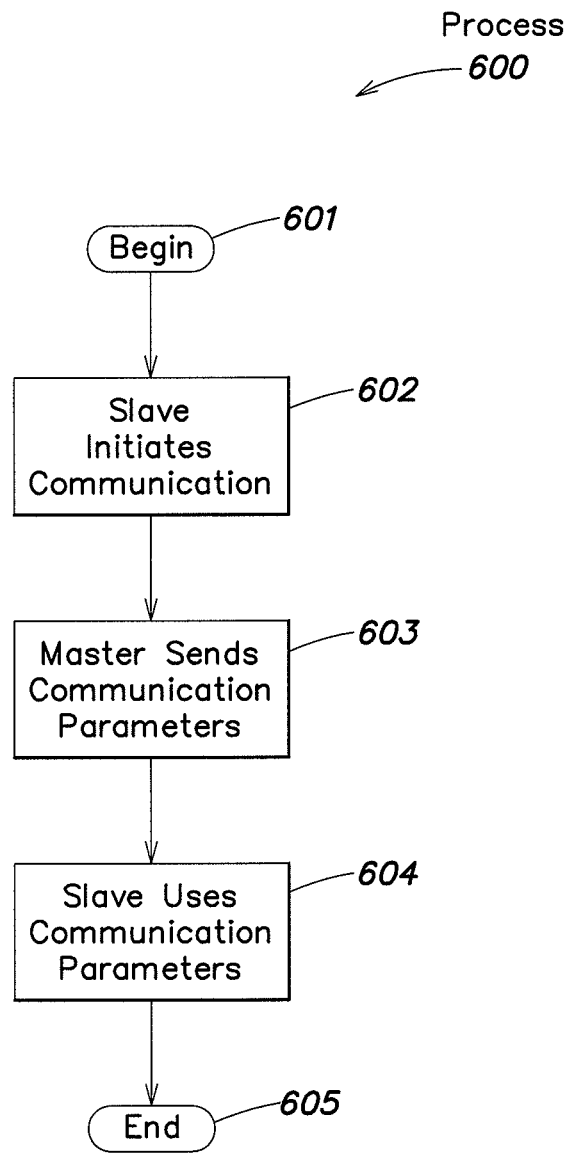
FIG. 6 shows a process for establishing communication between two entities according to one embodiment of the present invention.

FIG. 6 shows a process for establishing a communication according to one embodiment of the present invention. At block 601, process 600 begins. At block 602, a slave system initiates communication with a master system. In one embodiment, the slave system is a management system that is adapted to manage one or more master systems. In one aspect of the present invention, the slave system determines the protocol by which the slave, and optionally, other entities through the slave system, communicate with the master system.

Also, as discussed above, the slave system may initiate communication between the master and slave systems, for instance, by sending a sequence of messages that, when received by the master system, cause the master system to send communication parameters to the slave (e.g., at block 603). At block 604, the slave uses the communication parameters to communicate with the master system. Such communication parameters may, for instance, indicate the version of the protocol used, the length of messages used to communicate, a memory and/or data structure layout, or other communication information.

Figure 7:
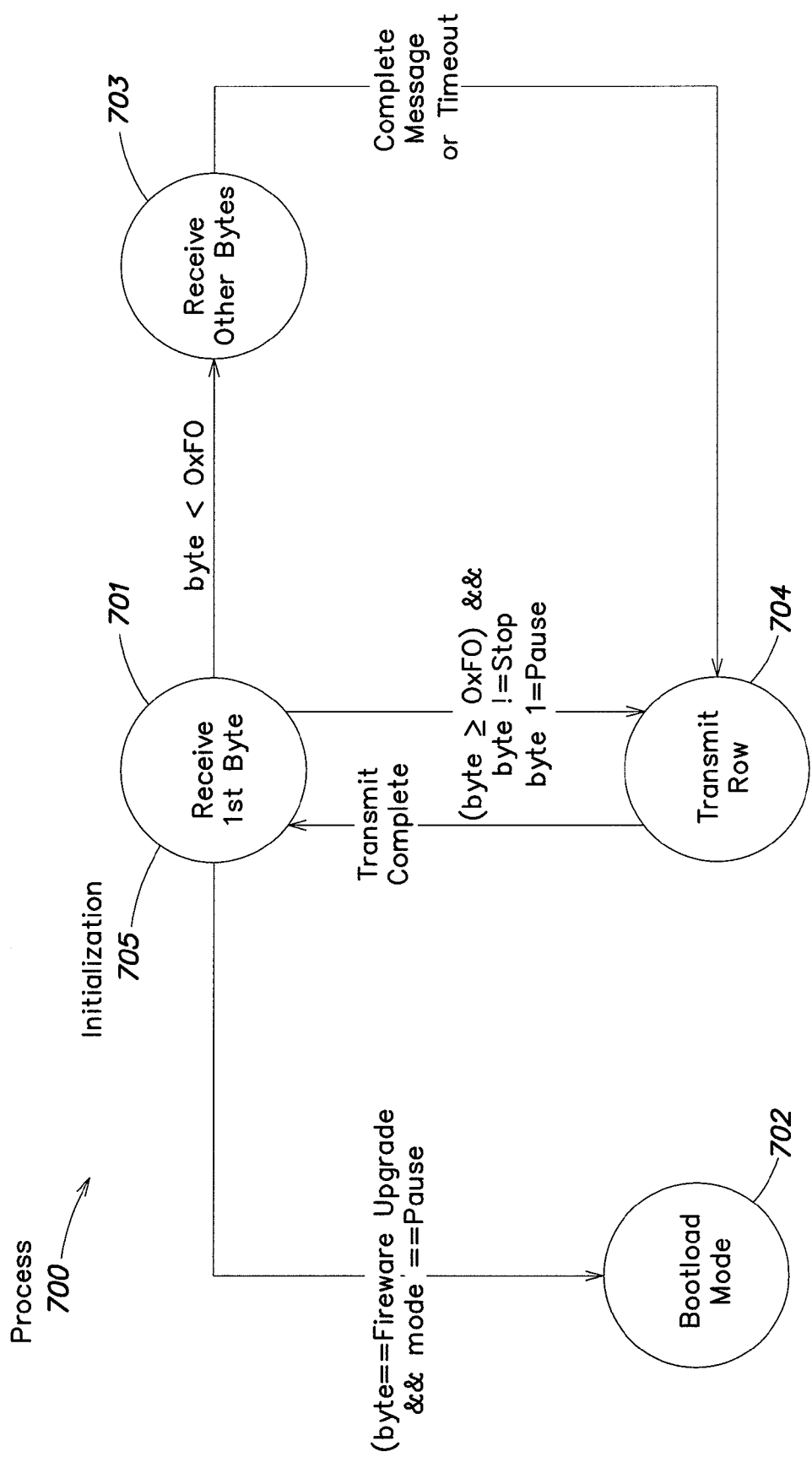
FIG. 7 is a state diagram of a master communication according to one embodiment of the present invention.

FIG. 7 shows a process 700 performed by a master system according to one embodiment of the present invention. Specifically, FIG. 7 shows a state diagram of a communication process performed by a master system. In one example, the master includes an engine that runs a communication protocol having four states. This state diagram may be, for example, performed by a processor of a UPS or a UPS component as discussed above. In a specific example, the state diagram shown in FIG. 7 is implemented in a UPS device, and is programmed in a programming language in firmware to execute a communication protocol according to one embodiment of the invention.

The communication protocol includes four basic states (states 701-704) and one flag that indicates that communications are active (e.g., a COM_VALID flag). Upon initialization 705 of the master, the master initializes the communications active flag. The four basic states include a first state 701 which includes waiting to receive a first character (e.g., a first byte) of a message from the slave. If the first character is a single-byte message, then the master processes the single byte message by transmitting the appropriate row to the salve. In a second state 703, the master receives the remainder of a message from the slave (e.g., receives other bytes associated with the message). At state 704, the master transmits any row information to the slave in response to the information received from the slave.

As discussed, according to one embodiment, a communication protocol may be implemented that includes one or more timeout mechanisms. According to one embodiment, a dual timeout may be used between a master and a slave. In one embodiment, the timeout mechanism provides a method for detecting communication problems on a communicating network (e.g., a data bus) and defines a standard recovery process. In one example, a maximum time is set between bytes (e.g., a byte timeout) in a message. For example, this timeout may be approximately 25 milliseconds, but this timeout period may be adjusted to other values. In one example, once a message packet has started sending subsequent bytes in a message, the message must be transmitted at a rate greater than this timeout to ensure that the data is received. If bytes are not received in a message at this rate, the packet is discarded and a negative acknowledgement (NAK) is sent to the slave. Further, a recipient of a packet may have another timeout that measures the time by which a message response may be received. If a response to a message does not occur within a defined timeout period (e.g., 250 milliseconds) the device considers the transmission a failure and acts accordingly.

Figure 8:
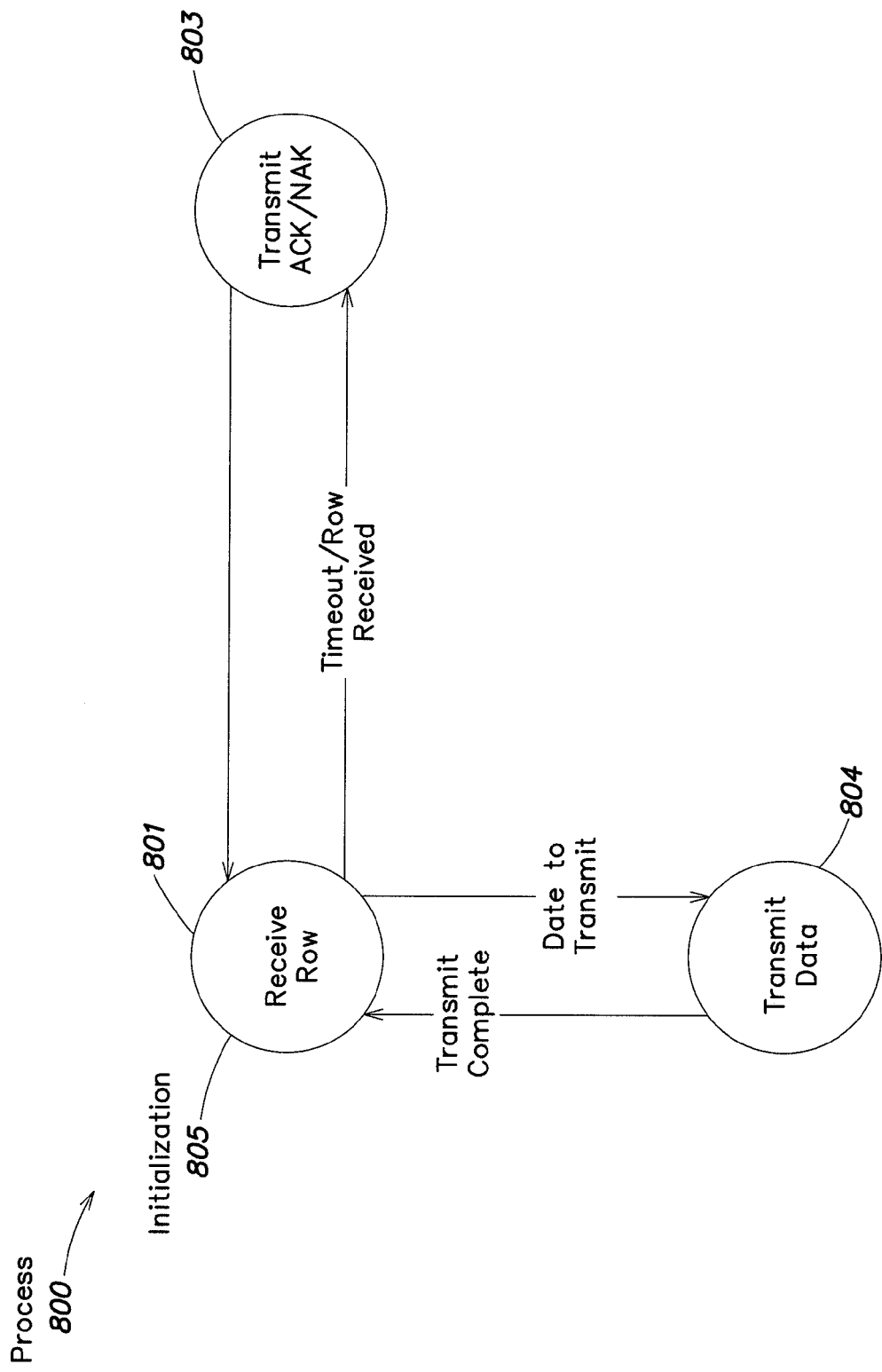
FIG. 8 is a state diagram of a slave communication according to one embodiment of the present invention.

FIG. 8 shows an example process 800 for performing communication by a slave system according to one embodiment of the present invention. In particular, FIG. 8 shows a state diagram that may be executed by a slave system in association with communicating with a master as discussed above with reference to FIG. 7. In particular, the state diagram may include four states (states 801-804) at which the slave system may be during any point in communication with the master. Such a state diagram may be performed, for example, in software, hardware, or both within a slave system.

Upon initialization 805, a slave enters a receive state where the slave is capable of receiving a row of data from a master device. The slave system may also be in an acknowledgement mode 803 wherein the slave system transmits acknowledgement (ACK) messages or negative acknowledgement (NAK) messages as appropriate depending on whether information was properly received from the master system. As discussed in the example above, if a particular message is not received within a predetermined timeout period, the slave may send a negative acknowledgement to the master system, prompting the master system to resend the message.

At state 804, the slave system may transmit any data as necessary to the master system. Such transmitted data may include, for example, write commands that perform the writing of information to memory locations of the master system, read requests for reading information from appropriate memory locations, or any other reading or writing operations.

Figure 9A:
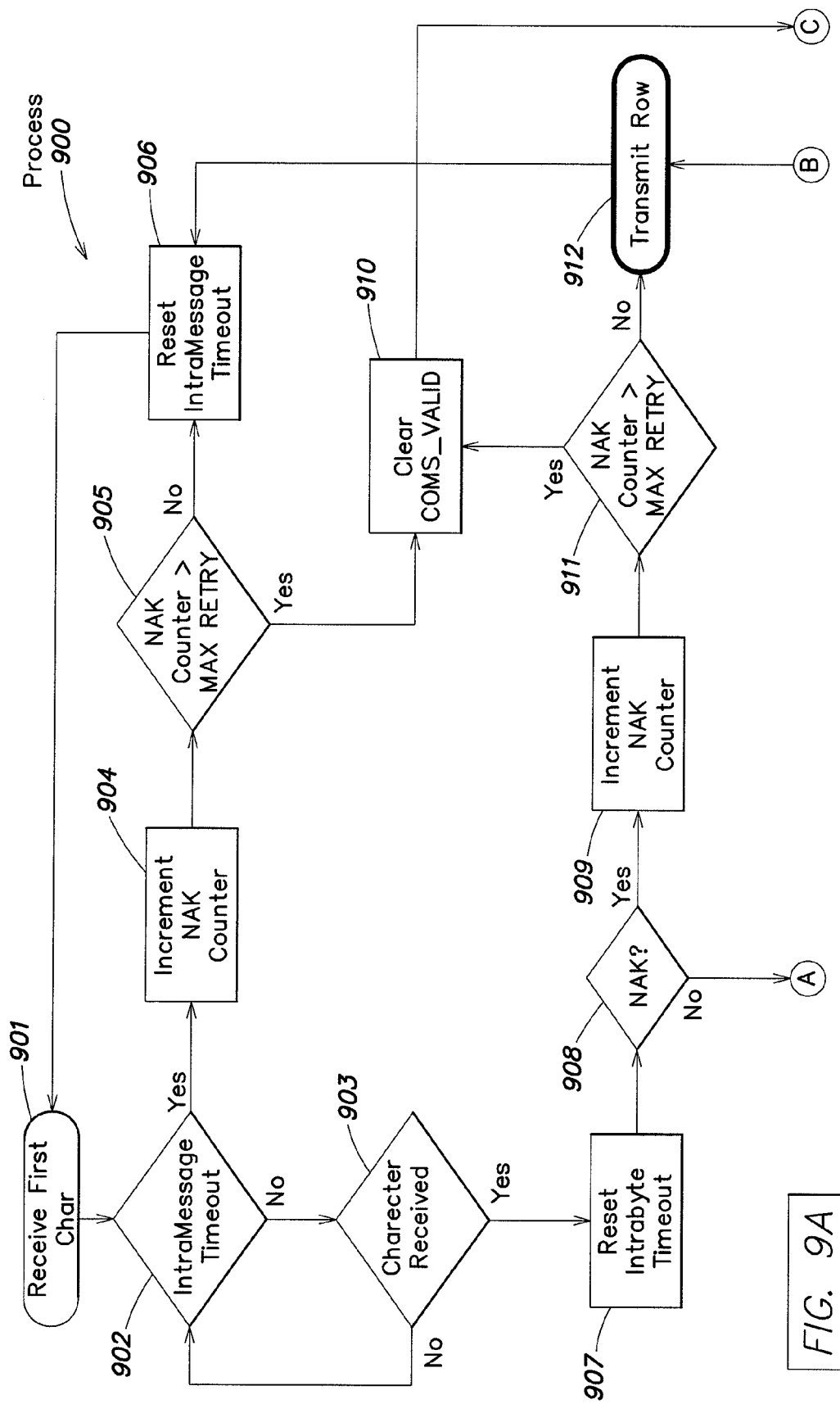
FIGS. 9A-9B show a flow chart of a communication process according to one embodiment of the present invention.
Figure 9B:
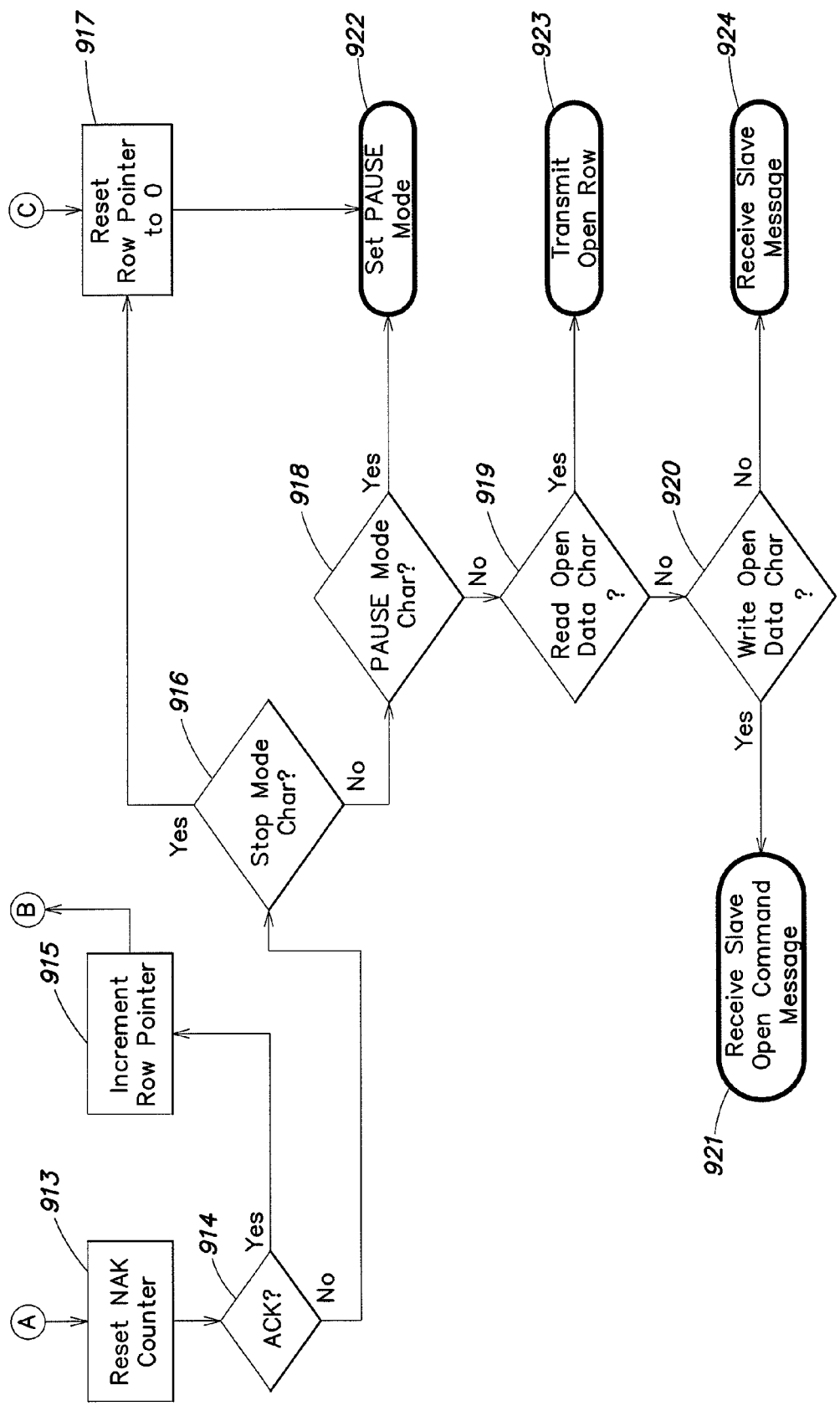

FIGS. 9A-9B show an example flow chart of a process 900 that occurs during the received first character state 701 as described above with reference to FIG. 7. At block 901, the master receives a first character from a slave system. At block 902, an intramessage timeout timer is started to track the time over which the message may be sent. If the message is not sent within an intramessage timeout value, a negative acknowledgement is sent at block 904, and a NAK counter is incremented. If, at block 905 it is determined that the value of the NAK counter exceeds the maximum number of retries permitted to send a message, a communication valid (communication active) flag is cleared at block 910. If the NAK counter is not exceeded, the message was received and the intramessage timeout is reset at block 906, and the master is ready to receive the first character of another message.

As discussed, there may be two levels of timeouts that may be used, one for messages and one for receiving consecutive bytes within a message. At block 903, if a character is received, an intrabyte timeout is reset at block 907. If, at block 908, a negative acknowledgement (NAK) is received, a negative acknowledgement counter is incremented at block 909. If, at block 911, the NAK counter exceeds a maximum number of retries for sending a consecutive byte, then an active communication flag is reset at block 910. If not, the byte has been successfully transmitted and the timers are reset for receipt of another byte and/or message.

If, at block 908, a NAK is not received, the NAK counter is reset at block 913. At block 914, it is determined whether an acknowledgement is received from the slave system. If yes, the master prepares to send an additional row, and a row pointer is incremented at block 915. At block 912, the master transmits a row to the slave. If an acknowledgement is not received at block 914, it is determined whether the master has received a stop character at block 916. If so, the master resets the row pointer to zero at block 917 and enters the pause mode at block 922.

If a stop mode character is not received at block 916, it is determined whether a pause mode character has been received by the master at block 918. If so, the master enters the pause mode at block 922. If not, the master determines whether a read open data character has been received at block 919. If so, the master transmits an open row to the slave at block 923. If not, the master determines whether a write open data character has been received from the slave at block 920. Is so, the master receives a slave open command message at block 921. If not, the master receives a slave message at block 924.

Figure 10A:
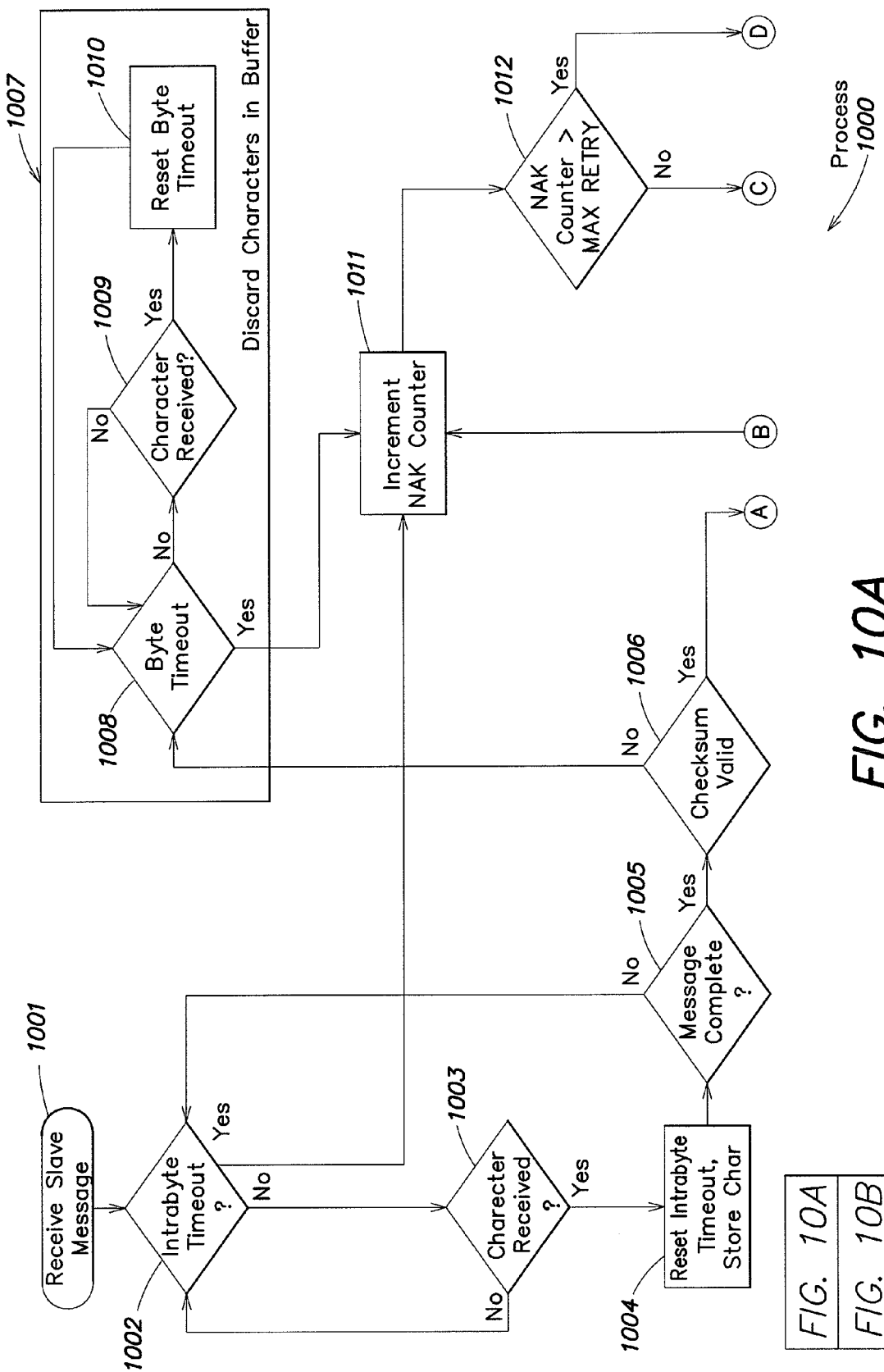
FIGS. 10A-10B show a flow chart of a communication process according to one embodiment of the present invention.
Figure 10B:
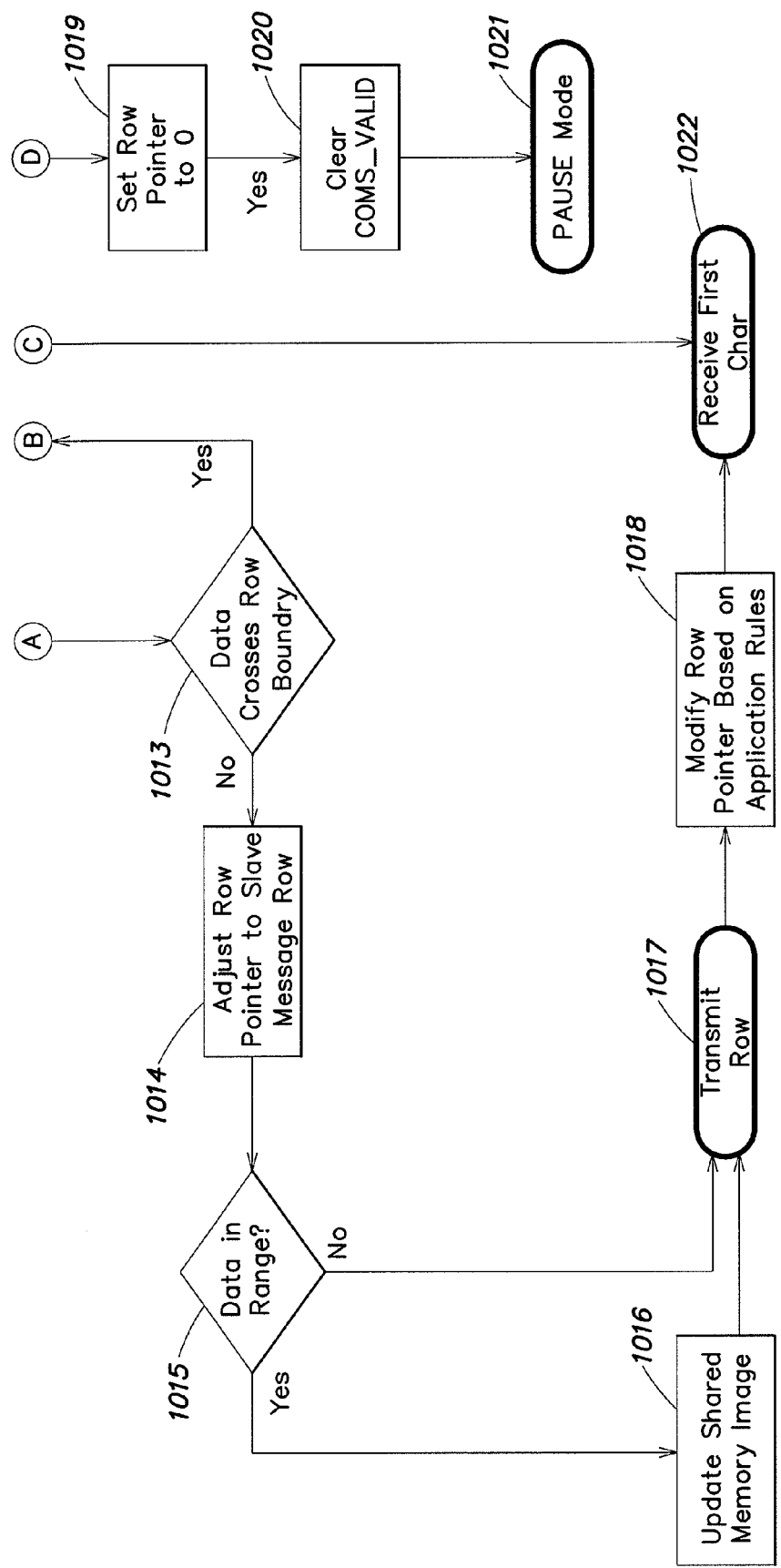

FIGS. 10A-10B show a process 1000 that may be performed by a master while in a receive message state. At block 1001, a master system receives a slave message. At block 1002, it is determined whether an intrabyte timeout has been exceeded. If so, a NAK counter is incremented at block 1011. If, at block 1012, it is determined that the NAK counter exceeds a maximum number of retries for sending the message, then the row pointer is set to zero at block 1019. Further, an active communication flag is cleared at block 1020, and the master enters the pause mode at block 1021. If, at block 1012 it is determined that the number of NAKs does not exceed the maximum number of retires, the message has been received correctly and the master transitions to a received first character state at block 1022.

If a character is received at block 1003, then the intrabyte timeout is reset at block 1004 and the character is stored in a memory of the master. At block 1005, it is determined whether the message is complete. If so, it is determined whether the message received is valid based on a checksum received in the transmitted message at block 1006. If not, it is determined whether to discard characters in the receive buffer at block 1007. More particularly, at block 1008, it is determined whether a byte timeout has been exceeded. If not, it is determined whether a character is received at block 1009. If so, the byte timeout is reset at block 1010. If a character has not been received, it is determined whether the byte timeout has been exceeded. If so, the NAK counter is incremented at block 1011 as discussed above.

If the checksum is determined valid at block 1006, it is determined whether data crosses a row boundary at block 1013. If so, the received message is invalid and the NAK counter is incremented at block 1011 as discussed above. If data does not cross a row boundary, a row pointer is adjusted to the slave message row at block 1014. At block 1015 it is determined whether the data message received is within the range of memory of the master at block 1015. If so, shared memory image of the master is updated with the appropriate data at block 1016. If not, the master transmits row information 1017 to the slave. Further, the row pointer is modified based on an application rule for sending information to the slave at block 1018. The master then transitions to the receive first character state at block 1022.

It is noted that the transmit row flow operates to output the characters of a row guaranteeing that characters are transmitted faster than the interbyte timeout between successive characters.

Figure 11A:
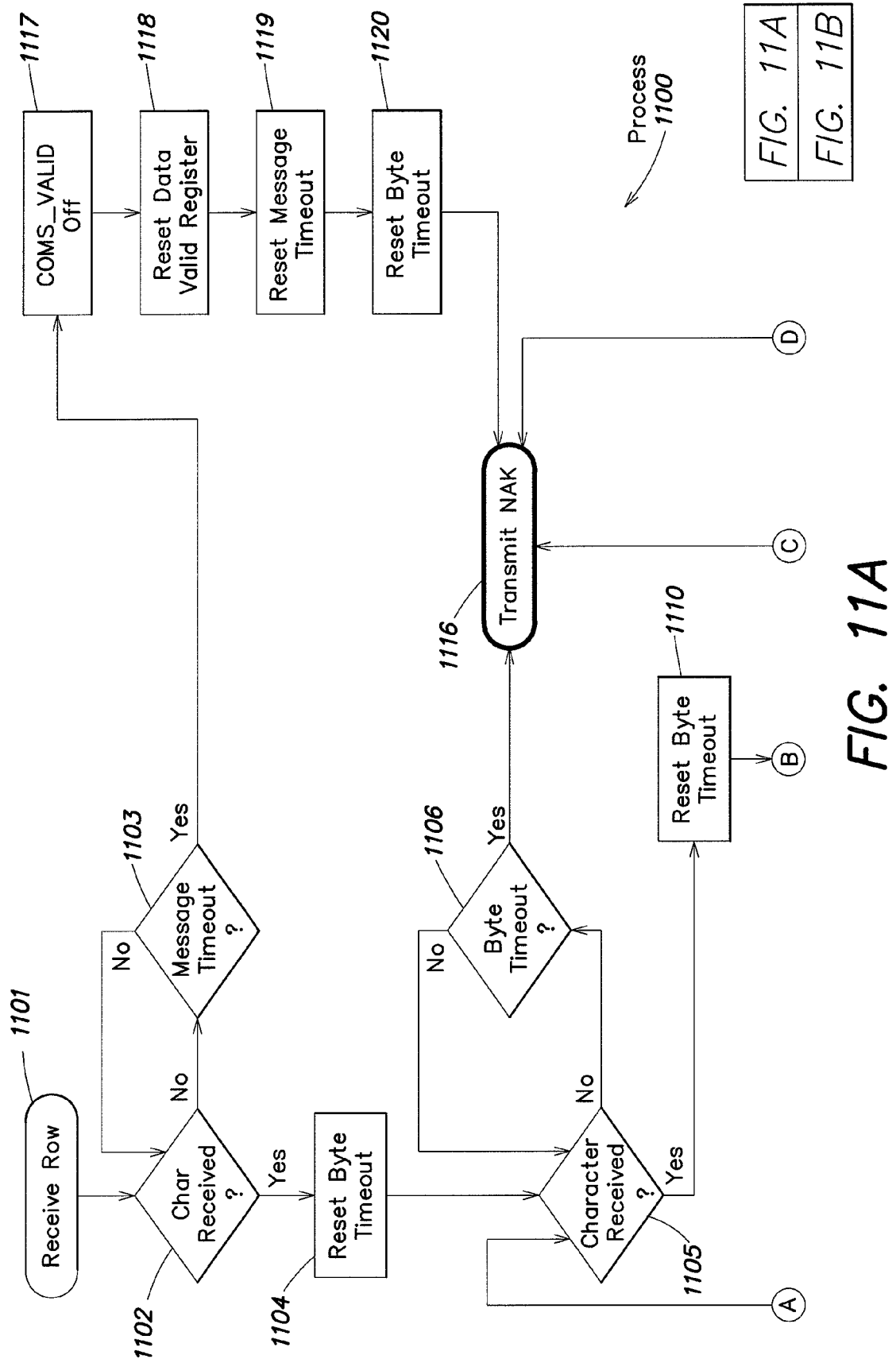
FIGS. 11A-11B show a flow chart of a communication process according to one embodiment of the present invention.
Figure 11B:
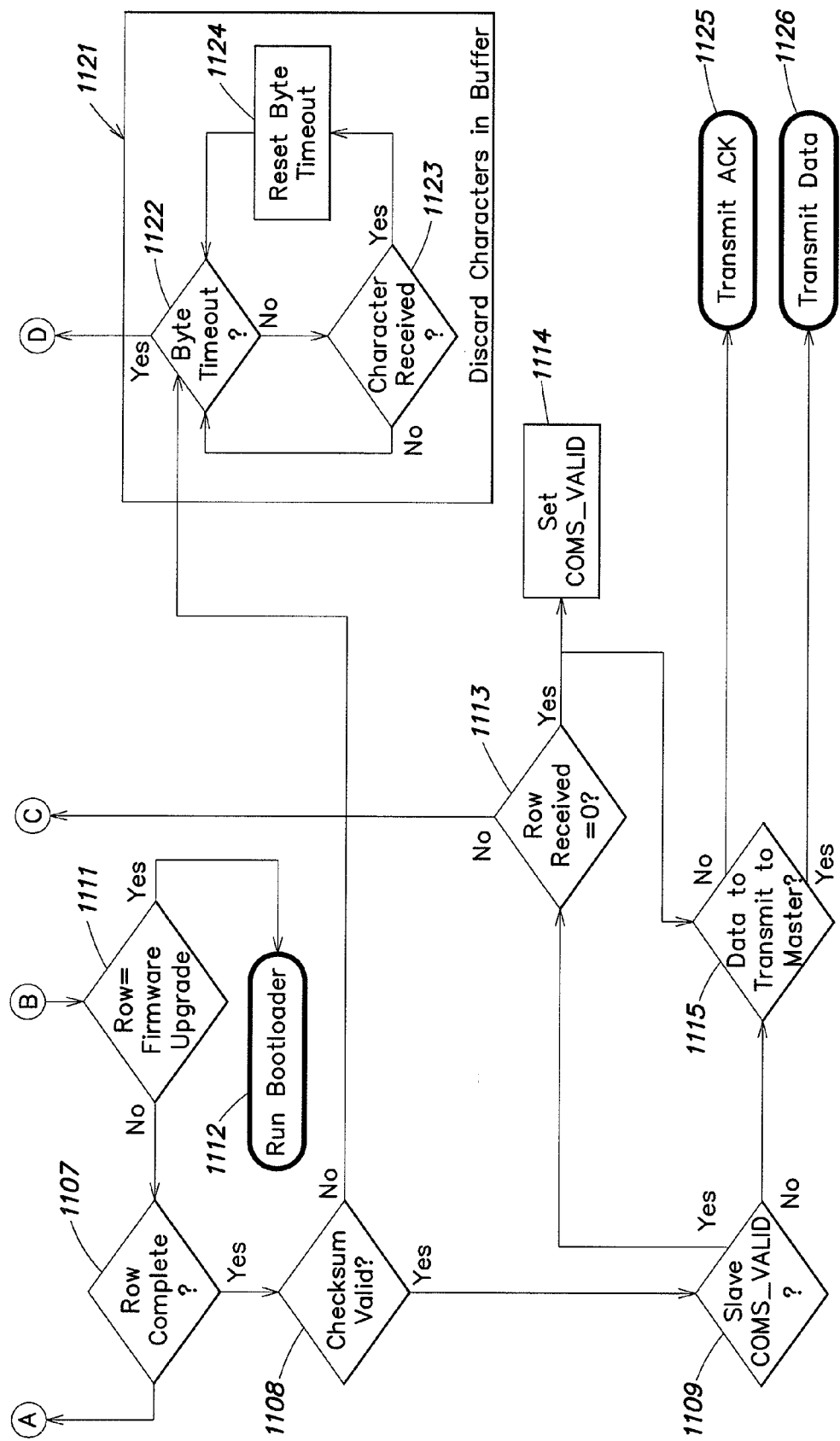

FIGS. 11A-11B show an example process 1100 that may be implemented in a slave system during the receive row state 801 as discussed above with reference to FIG. 8. At block 1101, the slave system enters the receive row state. At block 1102 it is determined whether a character is received at the slave. If not, it is determined at block 1103 whether a message timeout has been exceeded. If not, the slave monitors for characters received from the master. If the character is received, a byte timeout is reset at block 1104. At block 1105 it is determined whether a character has been received. If not, it is determined whether the byte timeout has been exceeded at block 1106. If not, the slave continues to monitor for additional characters received from the master.

If the byte timeout has been exceeded at block 1106, the slave transmits a NAK to the master at block 1116. If a character is received at block 1105, the byte timeout is reset at block 1110, and it is determined at block 1111 whether the row information indicates that the firmware or other software of the master should be upgraded. If so, the slave enters a run boot loader state at block 1112. During this state, the slave may provide one or more files to the master to reprogram itself. If, at block 1111, it is determined that the master does not request to enter the boot load state, it is determined at block 1107 whether the transmitted row is complete. If not, additional characters may be received at block 1105. If the row is complete, it is determined whether the transmitted row is valid given a checksum included in the received message at block 1108. If so, it is determined whether a slave communication flag is set at block 1109. If so, it is determined whether the received row is row zero at block 1113. If so, a communication active flag is set at the slave of block 1114. If, for example, the row received is not row zero, the slave may transmit a negative acknowledgement (NAK) to the master at block 1116.

When the communication active flag is set at block 1114, it is determined whether there is data to transmit to the master at block 1115. If not, the slave merely transmits an acknowledgement to the master that row zero was received successfully at block 1125. If the slave does have data to transmit to the master, the slave does so at block 1126.

If, at block 1108, it is determined that the checksum is not valid, the slave enters a discard mode where characters are discarded in the buffer at block 1121. More specifically, it is determined at block 1122 whether a byte timeout has been exceeded. If not, it is determined whether a successive character has been received at block 1123. If so, a byte timeout is reset at block 1124. If not, the slave continues to wait for characters until the byte timeout is exceeded at block 1122.

If a message timeout is exceeded at block 1103, an active communication flag at the slave is set to off at block 1117. Further, a data valid register is reset at block 1118, and a message timeout and byte timeout are reset at blocks 1119 and 1120, respectively. Also, a negative acknowledgement is transmitted to the master at block 1116.

Figure 12A:
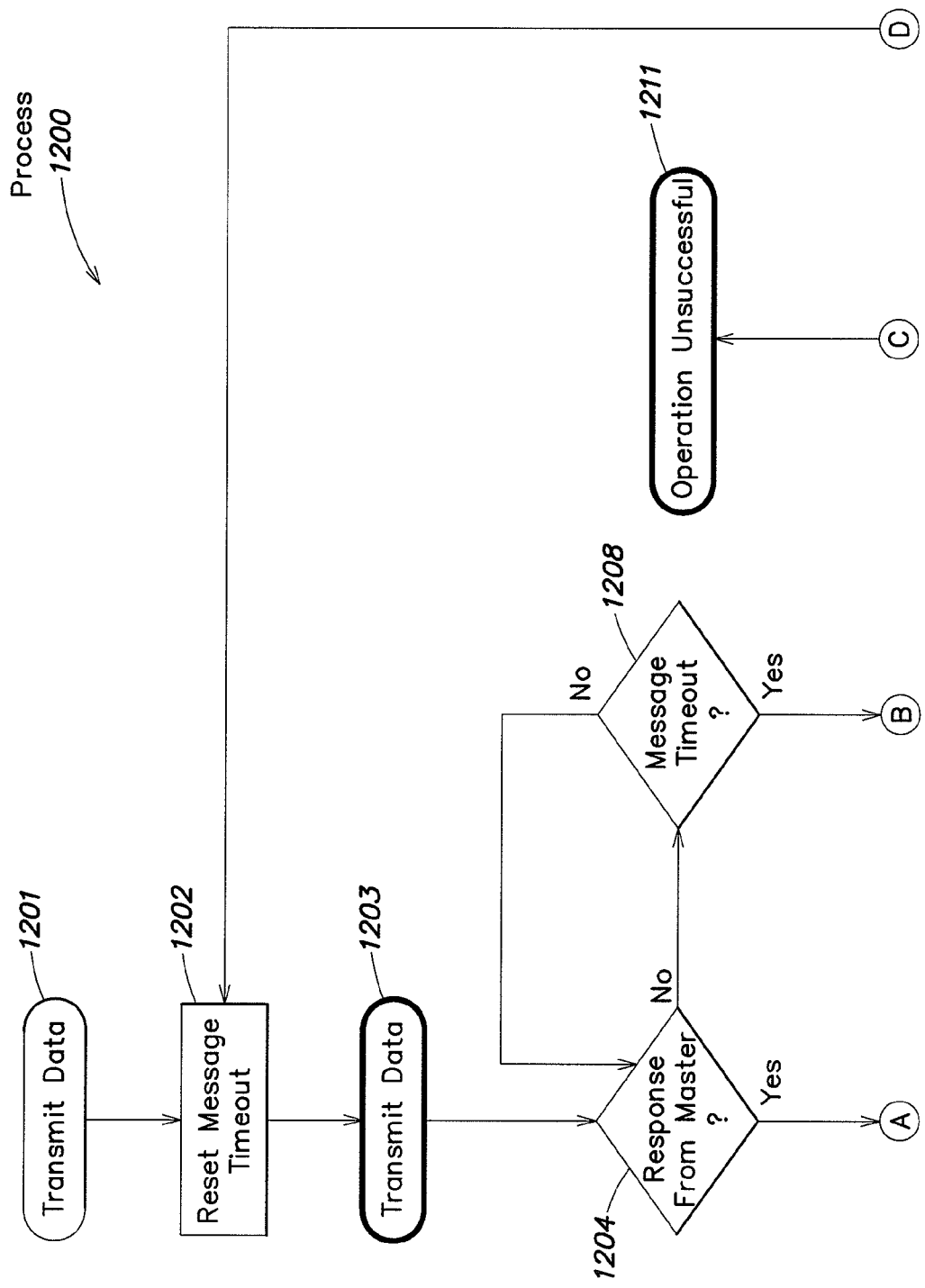
FIGS. 12A-12B show a flow chart of a communication process according to one embodiment of the present invention.
Figure 12B:
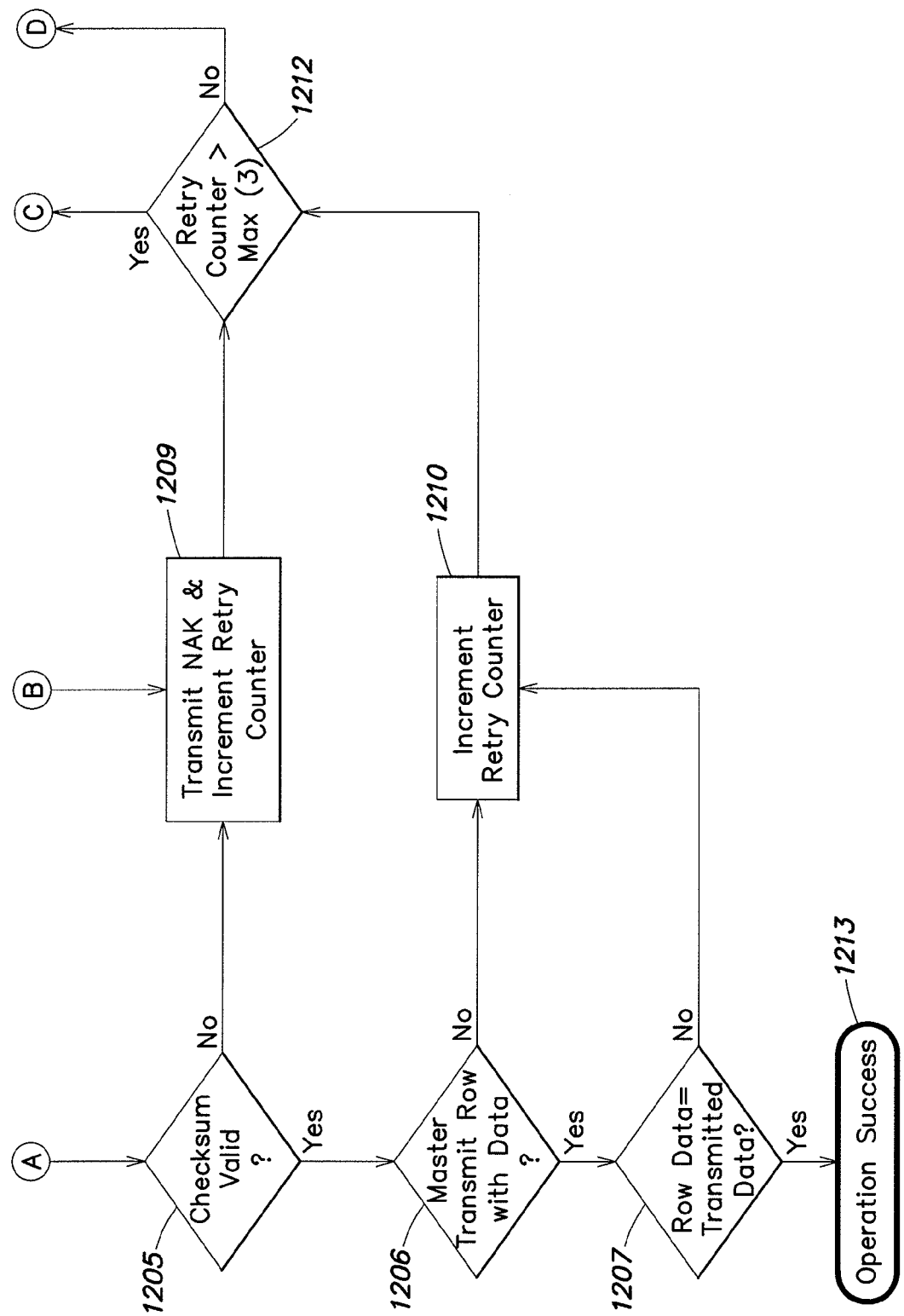

FIGS. 12A-12B show a process 1200 followed by the slave while in a transmit data state 503. At block 1201, the slave enters the transmit data state. At block 1202, a message timeout is reset at the slave. At block 1203, the slave enters the transmit data state and begins to transmit information to the master. At block 1204, it is determined whether a response is received from the master. If not, it is determined whether a message timeout is exceeded at block 1208. If the message timeout has not been exceeded, the slave waits for a response from the master.

If the slave receives a response from the master, it is determined whether the received information is valid. For example, a checksum may be included in the transmitted information and the slave may determine whether the information is valid based on the checksum at block 1205.

If the checksum is valid, it is determined whether the master transmitted a row having data at block 1206. If so, it is determined at block 1207 whether the row data is the same as the transmitted data. If so, the operation is indicated as a success at block 1213.

If the row data does not equal the transmitted data, a retry counter is incremented at block 1210. If, at block 1212, it is determined that the retry counter exceeds a maximum value (e.g., 3) the operation is indicated as being unsuccessful at block 1211. If not, the slave waits for the receipt of another message from the master at block 1202. If, there is a message timeout at block 1208 or the checksum is not valid at block 1205, the slave transmits a NAK to the master and increments its retry counter at block 1209. Again, if the retry counter exceeds a maximum value at 1212 at block 1212, the operation is indicated as being unsuccessful at block 1211.

Messaging

According to one aspect of the present invention, there are three possible messages that may be used to communicate between a slave and a master system. More particularly, there may be a master transmission which is a transmission from a master to a slave, a slave transmission which is a transmission from a slave to a master, and a slave single byte command that is executed at the master.

Figure 13:
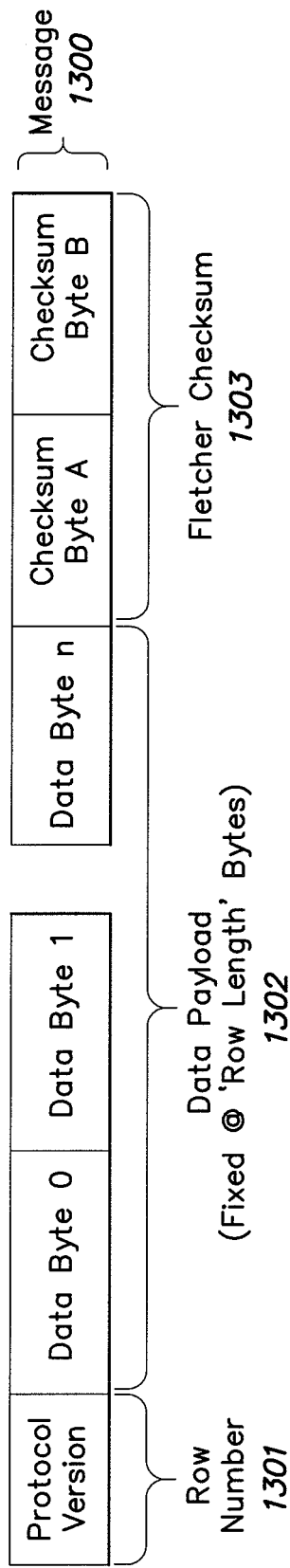
FIG. 13 is a block diagram of a master message format according to one embodiment of the present invention.

FIG. 13 shows one example master format according to one embodiment of the invention. In one example, a master system transmits messages having the same length and format. Message 1300 may include, for example, a row number 1301 that indicates the position of the data being transmitted by the master system. In row 0, the row 1301 may indicate the version of the communication protocol. Message 1300 may also include a data payload 1302 which includes one or more data bytes 0 through n. In one embodiment, the length of each message 1300 sent by the master may be a fixed length. In one example, this fixed length may vary between master implementations. This fixed length may be determined, for example, based on the protocol version 1301 which may be located, for example, in a row 0 data element or by a row length byte located in row 0.

Message 1300 may also include checksum information used to verify the contents of a particular message. In one embodiment, message 1300 includes a Fletcher checksum 1303. A Fletcher checksum is a well-known checksum used for detecting errors as more fully described below. However, it should be appreciated that any other type of checksum may be used to verify the transmitted information.

Figure 14:
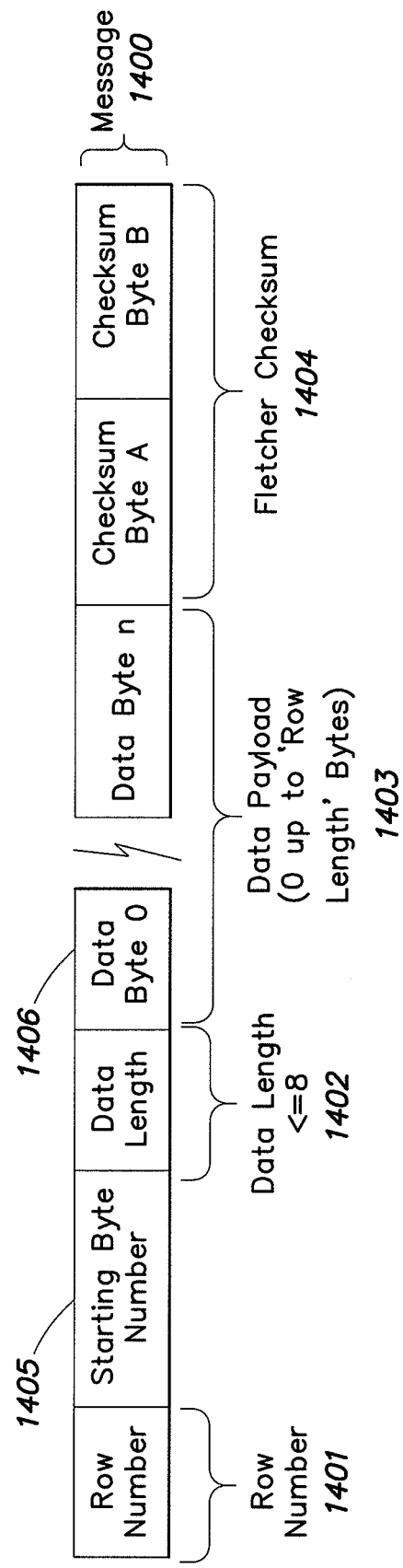
FIG. 14 is a block diagram of a slave message format according to one embodiment of the present invention.

A slave system may transmit in one of two different formats according to one embodiment of the invention. The first data format is a single byte message and the second is a multi byte communication message. FIG. 14 shows an example message format 1400 according to one embodiment of the invention. Message 1400 includes a row number 1401 that specifies the type of message being transmitted. According to one embodiment, there are three possible values of row number 1401. For example, a value of 0xFD indicates a negative acknowledgement (NAK) message.

According to one embodiment, NAK messages are used to initiate communications between a master and a slave. Other single byte commands that may be invoked by the slave include, but are not limited to, commands to stop communication, pause communication, acknowledge (e.g., ACK) a transmission or not acknowledge (e.g., NAK) a transmission. In one specific example, a message having a row number 1401 value greater than 0xF0 is a single byte command or a special command. According to one embodiment, special commands may be used to expand the functionality of the protocol. According to one embodiment, such a message may include the first byte of a multi-byte message.

As discussed, the last type of message that a slave may transmit to a master is a multi-byte message used to request to change data stored at the master. Such a message may take the same form as message 1400 shown in FIG. 14. Message 1400 includes starting byte number 1405 which indicates a row offset where data byte zero (item 1406) is to be written. Data length 1402 indicates the number of data bytes in data payload 1403. According to one embodiment, the data payload must be less than or equal to the length of the row transmitted by the master (e.g., 8 bytes). For example, to write through a third element of a memory location that is 2 bytes long, the starting position is indicated in message 1400 as 3, and the length is indicated as 2. Similar to message 1300, message 1400 may include checksum information. In one specific example, a Fletcher checksum 1404 may be used as discussed further below.

A message 1400 having a data length value of zero (0) in field 1402 may be interpreted by a particular master implementation as a request for the master to send a specified row.

Example Transactions

FIG. 15 shows one embodiment of a message transaction according to one embodiment of the present invention. In particular, a master system transmits a message 1501 to a slave, and after some response time 1502, a slave responds with an appropriate message 1503. In one embodiment, the response is an acknowledgement message 1507 indicated by a 0xFE value for the row value (first byte). Master message 1501 includes a row 1 byte 1504 and a data payload 1505. In one embodiment, the data payload ranges from 0 bytes to 239 bytes. Optionally, master message 1501 includes a Fletcher checksum 1506 as described above.

FIG. 16 shows another embodiment wherein a master sends a message 1601 similar to 1501 (e.g., one having a first byte 1604 followed by a data payload 1605, and optionally, a Fletcher checksum 1606). However, the slave, after some response time 1602, does not receive message 1601. This may occur, for example, if the master does not transmit the information quickly enough (e.g., there are more than the predetermined number of byte timeouts), there are transmission errors (e.g., a corrupted byte, dropped byte or other change in transmitted data), or other transmission or reception problems that cause the data not to be transferred properly. In such a case, the slave system issues a message 1603 indicating that message 1601 was not received. After which indication, the master may resend message 1601. Message 1603 may be, for example, a NAK message 1607 as described above, which may be indicated by a row value (first byte) of 0xFD.

In general, a master may receive one of four basic responses from a slave system. A slave may respond with a single-byte NAK, and in response, the master will retransmit the same data packet. A slave may send a single-byte ACK, and in response, the master will proceed to transmit the next block of data in the message. A slave may also send a multi-byte message with the first byte not indicated as an ACK or a NAK. In the absence of a checksum error, the master may be configured to update its local memory with data received from the slave. According to one embodiment, the master updates its memory only after validating that the received data is in the appropriate range. If validated, the master may respond with a message including the row containing the address in a response packet. If a checksum error occurs, the master system may respond with NAK message (i.e., requesting a retransmission of the last row), after which, the slave may resend the message.

Figure 17:
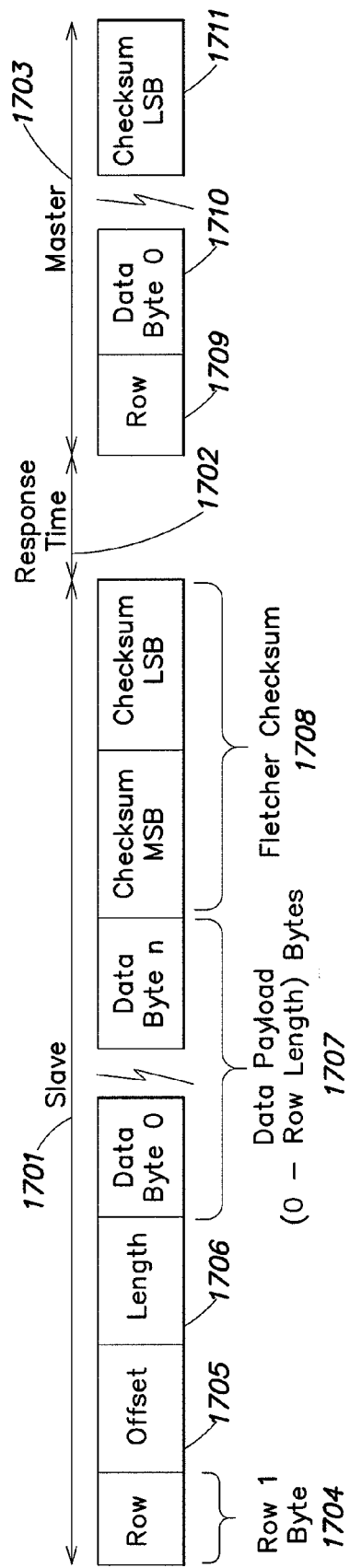
FIG. 17 is a block diagram of a slave message format according to another embodiment of the present invention.

Another transaction type includes a write operation from the slave system to the master. An example of such a message transaction is shown in FIG. 17. A slave system sends a message 1701 to a master system, and after some response time 1702, the master replies with a message 1703. Message 1701 may include row information 1704, offset information 1705, length information 1706, a data payload 1707 and a Fletcher checksum 1708. In the case of a write operation, the master may reply to the slave indicating the row address written by the write operation, indicating to the slave that the write operation was successful. To this end, the message 1703 from the master may include row information 1709, one or more data bytes 1710, and any checksum information 1711.

In summary, the slave sends messages (e.g., ACK messages) to retrieve row information stored in a memory of the master. The master determines which row of data to transmit next, and the master eventually transmits the entire set of data. As described below, such information may be stored in the master according to a memory map described below.

Memory Map

According to one aspect of the present invention, the master may include a memory map in which configuration and performance data are stored. For instance, data may be stored in one or more rows of a memory map as shown in FIG. 18. As is shown, the memory may be a linear array of memory organized in rows. In one embodiment, the master defines a shared memory format. As shown in FIG. 18, the memory may be referenced in a linear array as indicated by the offset shown in the cells. For example, row 0 contains data at offset 0x0000-0x0007. A slave or other entity that reads the memory map may issue commands to the slave that "walks" through the memory map to provide all of the information stored in the memory map. Alternatively, the slave may selectively request particular information from the memory map if the location of the data is known.

According to one embodiment, the memory map may include data that defines the format of the memory map, and its contained data. In one example, the memory map includes header information that defined the data contained in the memory map. Such header information may be stored in reserved locations (or offsets) in the shared memory map, permitting a slave to discover communication parameters for communicating with the master. Further, the header may contain information describing the contents of the shared memory. In the example memory map shown in FIG. 18, the header may be defined as offsets 0x00-0x08.

Figure 19:
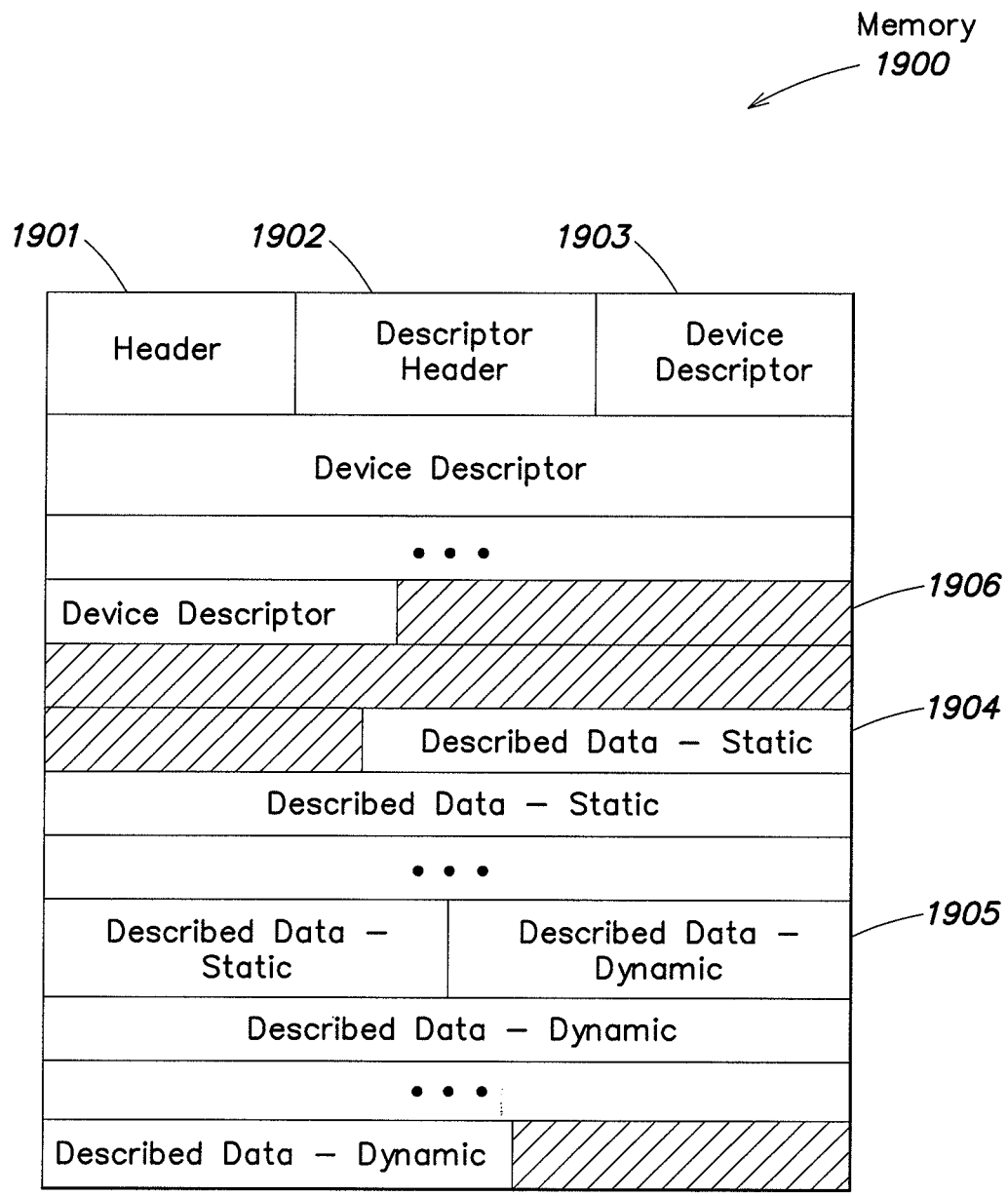
FIG. 19 is a table showing an example memory map according to another embodiment of the present invention.

The memory of a master device may contain several regions. For example, FIG. 19 shows an example master memory having different regions that may be accessed by a slave device. According to one aspect of the invention, the memory (e.g., memory 1900) includes a header 1901 that includes information for establishing communication and accessing other portions of the master memory. In one example, header 1901 has a standard format that slaves and other entities can identify communication parameters contained therein and therefore may communicate with the master device. An example header format is shown by way of example in FIG. 20 and discussed further below. The header 1901 may be a publicly-accessible area that may be accessed by devices to determine communication parameters. In one specific implementation, header 1901 is 8 bytes long.

In one embodiment, the header is a required data region, from which other communication parameters are determined. Specifically, header 1901 may indicate, for instance, a version of a communication protocol to be used to access the master. Header 1901 may also specify the organization of data in the memory map, the regions that are contained within the map, and aspects of their organization. In one specific example, the header includes a unique identifier that identifies a data structure of the memory from a group of known configurations. Further, the header may include information identifying the number and size of data packets used in communication.

Following header 1901, memory 1900 may include a descriptor header 1902 that indicates, for example, an indicator (e.g., a pointer) that identifies where data may be found within memory 1900. For example, the descriptor header 1902 may include a pointer that indicates a beginning of described data. Descriptor header 1902 may include other information, such as an indication of parsing rules to be used to parse a device descriptor 1903 that follows the descriptor header 1902.

Device descriptor 1903 may provide a number of functions, including identifying which rules for parsing the descriptor may be used by slaves that access the master. Device descriptor 1903 is, in one embodiment, a series of bytes that describe the format of the described data. According to one embodiment, device descriptor 1903 is encoded and decoded using a set of rules. One purpose of the device descriptor, according to one embodiment, includes informing slaves as to which usages of the data (e.g., a data element) are implemented, where a particular usage exists in the memory map, any parameters for particular usage, and where a particular usage exists in the device hierarchy.

Memory 1900 may be divided into sections of described data that are either static (e.g., static data 1904) and dynamic data (e.g., dynamic data 1905). According to one embodiment, if no distinction is made, the described data may be considered dynamic. According to one embodiment, a split is made between data types to aid the slave in determining how to most efficiently store data received from the master. Such described data may include meaningful data for the master entity including, for example, operating parameters, debug information, performance information, etc. The described data may be located in any portion of memory 1900, and is not limited to following immediately after the device descriptor 1903. For example, memory 1900 may include one or more portions of undescribed data (e.g., data 1906) that is included for padding purposes or other use.

Static data is data that changes infrequently, for example, information describing the master configuration. The described data may also include data which changes frequently, such as performance information.

FIG. 20 shows an example header format according to one embodiment of the present invention. The header may include protocol version information that identifies a version of the protocol being used. The header may also include row length information that identified the length of a row contained in the memory map. The row length may also define a packet size for communicating to the master from a slave or proxy entity. The header may include an identifier that indicates the number of rows of memory in the memory map.

The header may include information identifying the master entity. This information may be, for example, a unique identifier for a particular model of a master device. Such information may be useful to a slave for identifying what capabilities a particular master may have. In one instance, the slave may be a personal computer (PC) that manages a master device, such as a UPS, and thus the model number of the UPS being managed may be useful for determining the commands that may be performed, information that may be monitored, etc.

The header may also include an identifier that indicates a particular data table configuration format. This identifier may permit, for example, a slave to identify a particular configuration of the memory map. This identifier may also allow a slave device to determine whether the slave supports a particular memory map configuration. That is, the slave may store different memory map configurations, and the slave may use a particular configuration in response to the identifier. Further, the header may identify what protocols and/or features are supported by the master, allowing a slave to adequately determine the master's capabilities. The header may also include a human-readable description of the device for use, by an administrator or other user, or any other information describing the device and/or method for accessing the device.

According to one embodiment, the device descriptor is a sequence of bytes, which describes the format of the described data. The device descriptor is encoded and decoded by following a set of rules as discussed further below.

According to one embodiment, the purpose of the device descriptor is to let slave devices know:

Which data usages are implemented by a master.

Where a particular usage exists in the memory map of the master.

Any parameters for a particular usage.

Where a particular usage exists in the master device hierarchy.

Thus, a usage as defined in a publicly-accessible location may permit a slave system to access certain information stored in memory of a master. In a similar manner, the slave device may access such information as part of a proxy system that may provide access from other devices or systems.

Proxy System

According to one embodiment, a slave may act as a relay for the purpose of relaying information to one or more other entities. To this end, the slave may be a part of a proxy system that is configured to communicate with other entities, such as a computer system. Such a computer system may be coupled to the proxy through one or more communication networks. In a system using more than one slave device in a serial chain configuration, a proxy may be used as the last slave device in the chain.

According to one aspect of the present invention, the proxy is adapted to communicate on behalf of multiple devices to a single master. In one embodiment, the protocol used between the master and slave is transported using a network protocol. Conventionally, master devices such as UPSs usually communicate to a management entity using a directly-connected link (e.g., a serial communication cable) or are provided what is referred herein as a network management card (NMC), interface card, or other devices that communicate to the device using the native language of the device, and this device translates data to one or more other systems or devices using network protocols such as HTTP (e.g., over one or more networks).

Currently, products such as UPSs and other devices communicate to other devices over an Ethernet-based network through either of two methods. First, an interface card (e.g., an NMC, communicates to the UPS or other device in the native language of the UPS or other device, translates this data to client-friendly terminology and vocabulary, and communicates over the Ethernet-based network to one or more other devices (e.g., a client) using one of many protocols such as HTTP, Telnet, SNMP and others. A client interpreting the translated data can be a human using a network browser or an application programmed to implement processes in response to the UPS or other devices' state of condition.

The disadvantage of this approach is that the interface needs to understand the UPS or device to which the interface is communicating so that the interface can translate its language to the client-friendly interface in a meaningful way. Using this approach, the interface card needs to store in its memory not only the many different languages of the different UPSs and devices the interface card expects to translate, but the languages of the different clients that the card can be configured to transmit that translated data. Because of the need for multiple-language support requirements of both the device and the client, physical memory requirements of the interface card are increased. Also, because this translation occurs in real-time, the processor performing the translation needs to be fast enough to reduce lag time to an acceptable amount. Both of these requirements add to the cost and complexity of the interface card hardware.

Another way by which a connection is formed includes a software application installed in a computer that connects to the UPS or other device through a serial connection, translates the UPS or other device data to client-friendly terms and makes that data available to other devices through an Ethernet-based network connection. One disadvantage of this approach is that the approach requires a PC or other computer connected to the UPS or other device via a serial connection. The computer is obviously an expensive, voluminous, and power hungry piece to this solution if it were not intended to be used for other purposes such as file-serving, print management, and other network activities. This approach also requires that a serial port is to be available to communicate to the UPS or other device, which is not always possible or practical. Further, conventional discovery of devices requires polling of all network (e.g., IP) addresses to "find" nodes that contain network devices. Such discoveries are time intensive due to the number of possible IP addresses, and resource intensive due to the network bandwidth required to perform such operations.

According to one embodiment, a system is provided that does not need to translate data from the UPS or other device before providing it in client-friendly formats over the network. Because data is not translated, but is provided in its native form, the complexity of the code and the hardware is reduced. A side benefit of passing data through the interface in its native form is that the system works with a broad array of products without the system needing to store multiple protocols or otherwise having to know anything about individual capabilities and features of different master devices. Another advantage over conventional interface cards is that the system, according to one embodiment, is designed to work with only main network protocol. In contrast to a conventional network card which has to store the protocols of several network communication methods in memory, the system according to one embodiment of the present invention uses only one. Support for a single protocol reduces cost and complexity and simplifies set-up time during product installations. According to another embodiment, a lightweight protocol is provided that allows a software client to perform a simple network broadcast and receive a response from all devices on the network that comply with this protocol.

According to one aspect of the present invention, a universal translation system is provided. In particular, a single device is provided that for all master devices compliant with the serial and network protocol regardless of the data that is specific to the master devices. Further, a capability is provided for discovering devices on the network that are compliant with the protocol. This may be accomplished, for example, via a lightweight communication method. In one particular example, existing communication protocols are utilized as a transport layer for a proprietary serial protocol. The data received at the software client is the same format as the data that would have been received through a direct serial communication with the master.

As discussed, a network version of a serial link protocol may be provided. According to one embodiment, the protocol allows access to the same memory map that is accessed over the serial port of the master. In one embodiment, the protocol is a lightweight network protocol that functions as a serial cable replacement. The added advantage of the network protocol is that multiple devices may connect to the same network master, with only one connection to the master.

Figure 21:
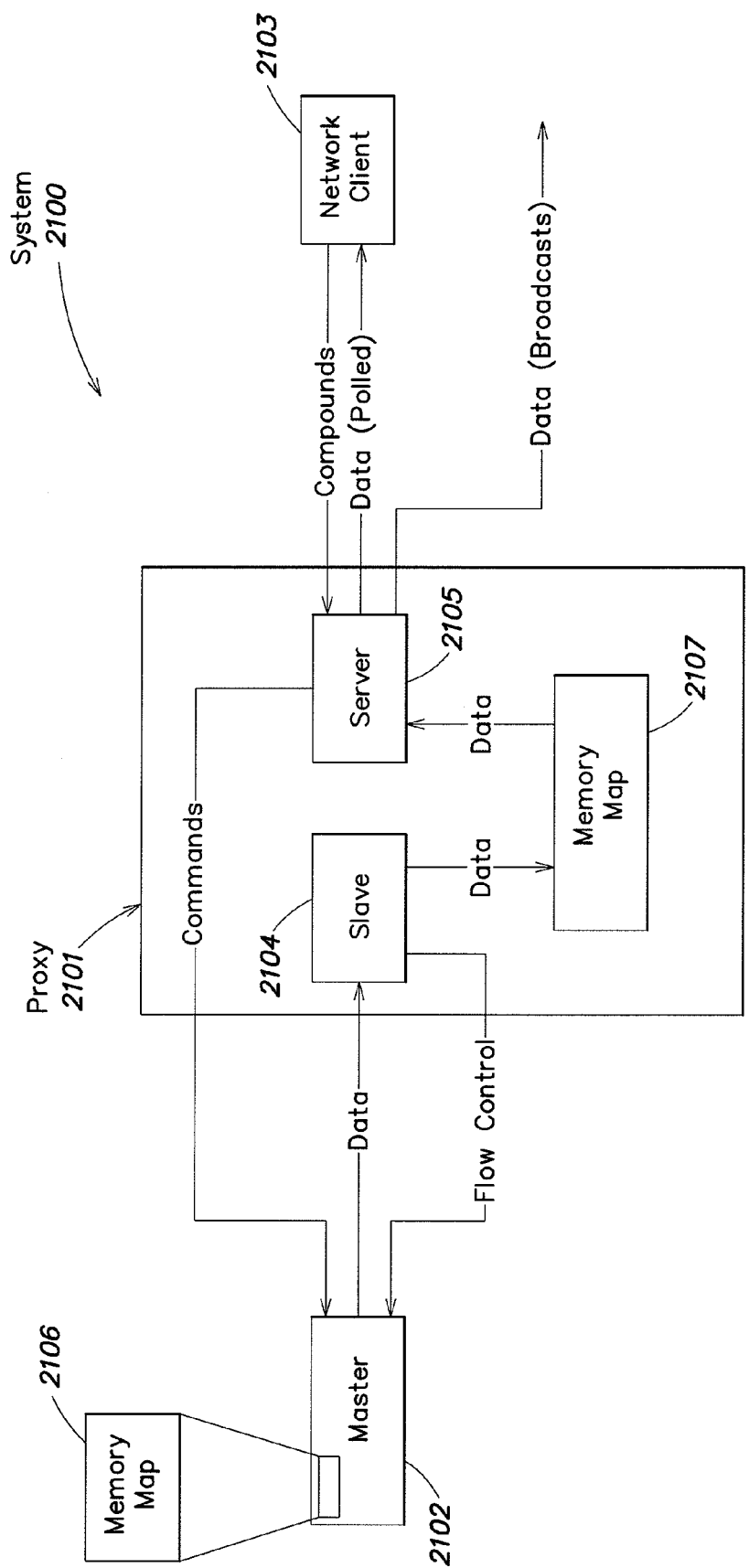
FIG. 21 is a blocking diagram of a proxy system according to one embodiment of the present invention.

FIG. 21 shows one example system used for communicating with a master device according to one embodiment of the present invention. Communication system 2100 includes a master system 2102 having information to be relayed to other entities. More particularly, master 2102 may include one or more memory areas to be accessed by one or more external devices. Master 2102 may include a memory map 2106 that includes the data to be accessed. According to one embodiment, memory map 2106 may include data that describes the format of other data contained within the memory map. A slave, proxy or other system may use such information in the memory map to determine communication parameters for communicating with the master 2102.

According to one embodiment, a proxy 2101 is provided that is capable of reading the memory map 2106 of the master 2102 and providing the information to one or more clients (e.g., network client 2103). To this end, a proxy 2101 includes a slave 2104 that is capable of communicating with master 2102. As discussed, slave 2104 may communicate commands and other data to master 2102 over a serial communication link. Such information may be, for example, messages as discussed above with reference to FIGS. 13-14. Such information may include commands, data received from a master, and any flow control information.

Data retrieved from the master may be stored in a copy of the memory map of the master stored in the memory of proxy 2101. More particularly, memory map 2107 may be a local copy of memory map 2106 of master 2102. Slave 2104 may periodically read the memory map of master 2102 and update its local copy. Thereafter, other systems may be capable of accessing information stored in the local copy of the memory map 2107. Such access may be provided, for example, by a server 2105 which is capable of communicating over one or more communication networks to other systems, including network client 2103. According to one embodiment, server 2105 may permit clients to communicate with the master 2102 using one or more conventional network communication protocols.

As discussed above, network client 2103 may include one or more systems that are capable of communicating commands and data to a master (e.g., master 2102). Client 2103 may be, for example, a management system capable of monitoring one or more devices (e.g., a UPS). In one example, network client 2103 may be the well-known ISX manager product available from the American Power Conversion Corporation. Some clients may be capable or reading and/or writing to memory locations within memory map 2106 of master 2102. As discussed above, one or more portions of memory of master 2102 may be accessed, including static data and dynamic data. In one example, static data does not change and may be transmitted to proxy 2101 upon communication with the master 2102. Dynamic data may be communicated periodically or as requested by proxy 2101.

Major features of a serial protocol may be duplicated in a networked version of the serial communication protocol system. That is, a network protocol may be used as a transport to conduct the serial communication protocol over a network. According to one embodiment, the "networked" version of the serial protocol may be substantially similar to the serial communication protocol used between a slave and a master. This feature may be beneficial, as client software that is capable of communicating with a master devices as a slave (e.g., using a serial link) may be nearly identical to that of software that communicates through a proxy and associated network transport protocol. The following describes differences between a serial version and the networked version of a serial protocol according to one embodiment of the present invention.

The slave in the proxy device unlocks the serial protocol so that a correct version of the memory map resides in the proxy server. To recreate the "authentication protocol", the proxy device may implement two tables of clients, a monitor client list (e.g., a "read only" list), and a shutdown client list (e.g., clients having both read and write access).

A "shutdown client" is, in the case of a UPS master device, a software client executing on a PC or server to which the UPS is being controlled. For instance, it may be desired to shut down a UPS from a server to which the UPS provides output power. To this end, the network may issue one or more commands that affect the operation of the UPS. Thus, it may be necessary to provide write access in addition to read access to portions of the master memory. According to one embodiment, addition of a client to either table requires registration using the authentication protocol. Any client on the network may communicate with the proxy server, but certain pieces of information are "restricted", and are not reported to the client unless the client is registered in one of the two registration tables.

Each table may contain a fixed number of entries; each entry referred to herein as a slot contains the IP address, MAC address and a timeout value in seconds. The timeout is reset, for example, with each SNMP communication packet from the client to the proxy. Communications with the proxy is allowed as long as the timeout has not expired and the client is defined in one of the registration tables. The timeout may be set to, for example, 600 seconds for shutdown clients and 3600 seconds for monitor clients. When the timeout expires, the device is removed from active registration, but its IP and MAC addresses may be stored in a memory of the proxy. If the device re-establishes communication, the proxy server may provide the same slot or entry previously provided.

A slot is occupied if the slot has defined IP and MAC address. One way to completely remove a client from the list is to actively register for the particular slot, or to be registered on a different slot and clear a slot. Addition of a client to a registration table is accomplished, for example, by writing the serial authentication with a slot number to the appropriate OID (e.g., registration list OIDs). The format of the data to be written may be a hex string <Serial Slave Password Challenge><Serial Master Password Response><16-bit Slot Number>. A slot number having a value of 0 requests the proxy to pick an available slot, or to reassign a slot previously registered to the same client. If the table is full, an error may be returned. In the case of a full table, the client must decide to refuse connection, or bump another client by registering for a particular slot.

The first table, the shutdown client table, is intended for management entities and shutdown clients to register. Devices in this table receive periodic updates of the dynamic memory and are allowed to read and write to the serial memory. Once listed in the broadcast table the proxy device sends SNMP traps to the network client on a specified interval, and upon receipt of a valid write command. Registered clients may, according to one embodiment, receive exactly the same memory map images. The network client is responsible for renewing the registration periodically to prevent the registration from timing out. Renewal of the registration may be performed, for example, by any valid SNMP communication to the proxy device. In another embodiment, a polled read of the registration table may be performed to renew the registration with the least impact to the proxy server.

The second table, the polled table, may be provided for entities that periodically poll the proxy (e.g., a management server or other monitoring software that communicate on a polled basis to the proxy). These devices may be permitted to register in a separate table with a similar registration method described above.

As discussed above, data in the master is organized into two basic regions, a static region followed by a dynamic region. The static region contains data that changes infrequently and can be communicated without any authentication. The proxy server may store data in this region in memory (e.g., in ROM). If placed in ROM, care should be taken not to place data that changes frequently, as the ROM in most devices have 10 K write limitations. The dynamic region may include all data within the memory map that is not static. Dynamic data may optionally be masked to a network client by replacement with a constant piece of data when the network client is not a registered client. According to one embodiment, data needed by the network client to generate the registration may not be masked.

If a device is not registered, the device may be provided "garbage" dynamic data. Data from the proxy device will be valid with the exception of the dynamic data. According to one embodiment, the only data in the dynamic data that will be valid is the data necessary to properly generate the registration packet.

As discussed, the proxy device may provide a "universal translator" to multiple device types. According to one embodiment, the proxy functions as a transparent protocol translator. This function is achieved by placing restrictions on the master devices that are supported by the proxy. According to one embodiment, requirements may be imposed on master devices that allow them to work with the proxy server. For example, all devices that are designed to work with the proxy device may be required to implement the device descriptor. If registration is to be used, the authentication protocol must also be used. A device that fails to implement all the required usages may be declared to be incompatible by the proxy device.

Authentication Protocol

According to one embodiment of the present invention, it may be beneficial to prevent unauthorized vendors from making products that communicate with a particular master device (e.g., a UPS), and prevent other device manufacturers from making a master device that communicates with a particular slave device. For instance, in the case of a UPS master device that communicates with a particular slave system, it may be beneficial to prohibit "knock-off" master and slaves from entering the marketplace. To this end, a protocol is provided to prohibit either an unauthorized master or slave (or its network clients) from communicating with an "approved" master or slave entity.

Prior communication methods assume that the master entity is an approved one. That is, security measures are taken to prohibit unauthorized slaves from controlling a particular master. However, such security measures do not ensure that the masters or slaves are themselves compliant, and therefore, such master and client devices may be easily reproduced.

According to one embodiment, additional methods are provided for verifying that the master is an authorized master. For instance, an additional verification method may be provided to allow a slave, proxy, or client to determine whether a particular master is "authorized." Further, a method may be provided to determine whether a master is in a locked or unlocked state.

Also, because the information contained in the device (e.g., status, control, and configuration information) can be viewed, modified and controlled via a serial communication link that is accessible to external devices, it is possible that someone or some company, may write software that uses the communication protocol to communicate with a master device. It is also possible that someone, or some company, could reverse-engineer the communication protocol and build a master device (e.g., a UPS) that duplicates the protocol and works with software tools. According to one embodiment of the present invention, a "lock" mechanism is provided that blocks meaningful data from being transmitted from the device unless an unlock sequence of data is sent to the device. The unlock sequence is based on an algorithm performed on data transmitted via the serial link.

According to one embodiment of the present invention, a method is provided that ensures that authorized slave devices communicate with a master and ensures that only authorized master devices communicate with a slave. Authentication is guaranteed, according to one embodiment, by implementing an unlocking algorithm at the master along with bidirectional authentication implemented by the slave and master. The authentication algorithm may be tracked with a version number so that changes can be made to the algorithm should the existing algorithm be compromised or otherwise be considered inadequate.

According to one embodiment, a master always send data in response to a slave request. However, the data is masked if the master is in a locked state. When data is masked, the data is ignored by the communicating software (e.g., a slave, or client accessing the master through a slave). According to one embodiment, an authentication protocol may include the following features:

Bi-directional locking key—The master (e.g., a UPS) only communicates with authorized slaves, and slaves can detect an authorized master. When the master is locked, the master only allows data to be written to a public memory section (e.g., of EEPROM or to public rows of RAM). Other data writes are not permitted. The slave is adapted to ignore communications from devices that are not verified as authentic master devices.

Method for detecting data status—The slave may be able to detect whether data is locked or unlocked to determine whether the data being returned from the master is valid.

A locking feature according to one embodiment utilizes the fact that there are two types of data that are transmitted, public and private. Data that is public is always available, and data that is private is only available after an unlocking sequence is sent to the master. In one example, the master, according to one embodiment, generates a "secret key" automatically on power up, and whenever the master exits factory mode. This secret key may be, for example, 16-bits long and calculated, for example, based on an 8-bit Fletcher checksum algorithm performed on specific elements of the master memory map.

According to one embodiment of the present invention, a Fletcher checksum may be used to verify the integrity of the transmitted data. For instance, an 8-bit Fletcher checksum may be used. One example of the Fletcher checksum algorithm is defined in the IETF document RFC 1146 for use with the TCP protocol.

The 8-bit Fletcher checksum is calculated over a sequence of data octets (call them D[1] through D[N]) by maintaining 2 unsigned 1's-complement 8-bit accumulators A and B whose contents are initially zero, and performing the following loop where i ranges from 1 to N:

$$A:=A+D[i]$$

$$B:=B+A$$

At the end of the loop, A contains the 8-bit 1's complement sum of all octets in the datagram, and that B contains (N)D[1]+(N−1)D[2]+ . . . +D[N]. At the end of the loop, the A is placed in the first byte of the checksum field and B is placed in the second byte. Note that, unlike the OSI version of the Fletcher checksum, the above version of the Fletcher checksum does not adjust the check bytes so that the receiver checksum is 0. It should be appreciated that there are a number of much faster algorithms for calculating the two octets of the 8-bit Fletcher checksum, and any method for calculating a Fletcher checksum may be used.

Naturally, any computation which computes the same number as would be calculated by the loop above may be used to calculate the checksum. One advantage of the Fletcher algorithms over the standard TCP checksum algorithm is the ability to detect the transposition of octets/words of any size within a datagram. Although the Fletcher checksum may be used, it should be appreciated that other methods for checking data may be used.

A "shared secret" may be combined with elements of the public memory map, and may be used to initialize an algorithm used to generate the "secret key." In one example, the algorithm may process a set of particular bytes from the master's memory map. These processed bytes may be referenced to particular elements in the memory map or may include the data located at a particular position of the memory map. The "shared secret" according to one embodiment of the invention includes the elements that are used to generate the "secret key."

According to one specific embodiment of the invention using a Fletcher checksum algorithm, the shared secret may be used to initialize both bytes of the Fletcher checksum prior to calculating the Fletcher checksum of the first X bytes of the master memory, followed by Y bytes of data starting with the serial number of the master, where X and Y are shared secrets. According to one embodiment, all data included in the calculation of the "secret key" is public and can be retrieved without knowledge of the "secret key". To generate the secret key, knowledge of the initializer for the Fletcher checksum and the number of bytes of data X and Y are required. The initializer and the number of bytes of data may, for example, be determined at compile time during the design of a specific product. According to another embodiment, the calculated "secret key" is not transmitted with the exception of one cycle after the correct key has been transmitted to the master device.

To prevent unauthorized duplication of the master, the slave may send the master a random number to which the master applies a secret algorithm to generate a response. The response is sent to the slave and allows the slave to determine whether the master is authentic.

In another example implementation, the master may generate a random number which is added to the bytes of the "secret key" to generate a simple checksum. This simple checksum with the random number may be transmitted periodically from the master so that the slave can verify that the device with which it is communicating is an authorized master.

To allow the slave to determine the status of the master (locked or unlocked) information (e.g., one or more bits) in a specific response indicates the master data status and may be transmitted periodically to the software. The slave may inspect this information to determine if the responses to queries are valid.

On microprocessor reboot, and on loss of communications, the master may change its data status to a locked state. When in locked state, locations having data that is private may be transmitted with random, fixed, or garbage data in lieu of transmitting the private data. The transmitted data may be ignored by the communicating slave. The master becomes unlocked, in one specific example, when a specific 16-bit sequence is written to the master registers. When the appropriate key is sent, the master acknowledges the data and then proceeds to transmit all private data as valid.

Whether the master data is locked or unlocked, the master may transmit a random number followed by a simple checksum of the random number, the MSB of the 16-bit secret, and the LSB of the 16-bit secret. A slave device can interrogate these two bytes to determine if the master is an "authorized" master. The slave may lock the data in the master at any time by sending an incorrect secret key to the master. This receipt causes the master to "lock" the data.

Authentication also permits access to private data (e.g., parameters) within the memory map of the master, so additional usages need not be defined for special access to the master.

PUBLIC DATA Master memory elements that are publicly available.

PRIVATE DATA Master memory elements that are "masked" when the memory is in a locked state.

LOCKED Master memory status prior to authentication. Private data is unavailable when in a locked state.

UNLOCKED Master memory status after authentication. Private data is available when in an unlocked state.

As discussed, FIG. 16 shows an example representation of a master memory 1600 identifying the data located in different regions. In the example described above with reference with respect to FIG. 16, described data that is static is public data and therefore is available to clients that are not authenticated. Described data that is dynamic is private data that is not available to clients that are not authenticated.

According to another aspect of the present invention, a challenge/response method may be used to perform a bidirectional authentication between a master and a slave. In particular, another example process for performing a bidirectional authentication between a slave and a master device may be performed as follows:

Upon initialization after hardware reset (or after stop command received from a slave, data is locked and the master transmits only public data. This public data includes a Master Password Challenge (MPC). In one example, the MPC is a random number. To increase security, the master should attempt to make this number as random as practical for its application. Also, to further increase security, the use of constant numbers and incrementing the previous random numbers should be avoided.

When the slave receives row 0, the slave assumes that the master is locked. The slave waits to receive the last row from the master, ensuring that the password and authentication status usages have been received. The received authentication status usage is then checked to verify locked status of the master.

When locked, the master transmits the last row repeatedly (assuming ACKs) until the slave writes a Slave Validation Response, or SVR. In another implementation of the master, the master may choose to repeatedly transmit all public data.

The slave writes the SVR in response to the MPC (which is stored by the slave in its memory map). As part of the same write, the slave writes a Slave Password Challenge or SPC which also may be a random number.

Upon a write to the SVR/SPC, the master checks the SVR for validity. If valid, the master responds to the write with a Master Validation Response or MVR. The Master then begins transmission of all the private data including the authentication status usage, which shows that the master is unlocked. After successful unlocking, the master ensures that all rows have been transmitted at least once before the master reports data valid in the authentication usage. If the SVR is invalid, the master ensures that the master is locked. Any write to the SVR/SPC, whether valid or invalid, causes the master to update the MPC to prevent easily defeating the authentication.

Upon transmission of the row in response to the write to the SVR/SPC, the slave then checks the MVR for validity. If valid, the slave continues normal operation receiving the rows transmitted by the master up to and including the last row which confirms that all the data in the master memory is now unlocked and valid. If the MVR is invalid, the slave stops communications and takes an appropriate action. The appropriate action may be application-specific (e.g., alert user through GUI, stop communication for a period of X minutes, etc.).

Figure 22A:
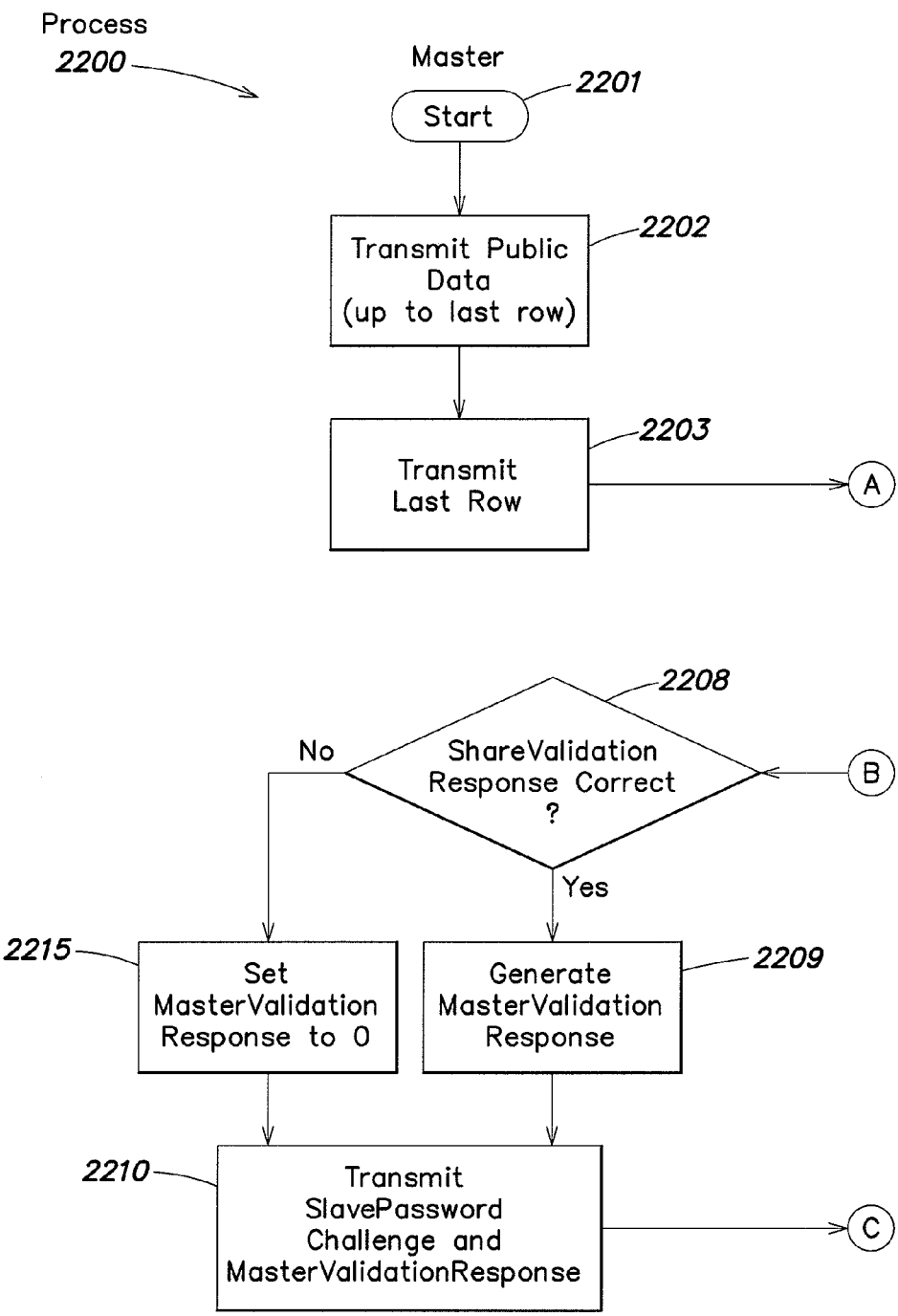
FIG. 22 is a flow chart of an authentication process according to one embodiment of the present invention.
Figure 22B:
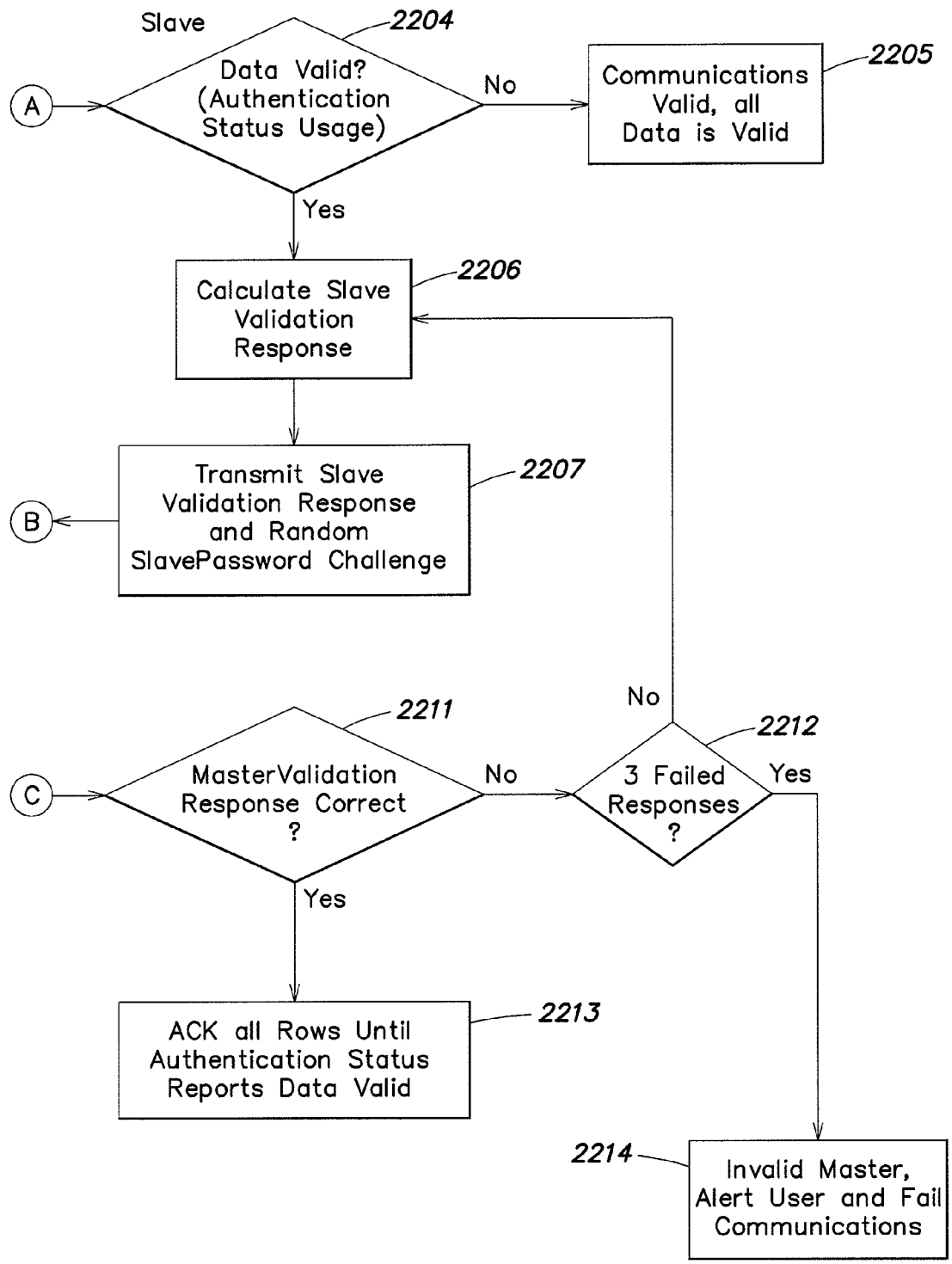

FIG. 22 shows an example authentication process according to one embodiment of the present invention. At block 2201, process 2200 begins. At block 2202, the master transmits public data within the memory map. In one embodiment, the master transmits public data up until the last row of public data in the memory map. Upon receipt of the transmitted last row of data from the master at block 2203, the slave determines whether the received data is valid at block 2204. If so, slave determines a Slave Validation Response (SVR) at block 2206. If not, the communications are determined valid and all data is valid at block 2205.

In one embodiment, the SVR is determined based on the Master Password Challenge stored within the memory map of the slave. However, it should be appreciated that the SVR may be determined by any other portion(s) of the memory map. At block 2207, the slave transmits the SVR and a Slave Password Challenge (SPC) which may also be a random number.

At block 2208, the master determines whether the slave validation response is correct. If so, the master generates a Master Validation Response (MVR) at block 2209. If not, the master sets the Master Validation Response to a value of zero. The master transmits the Slave Password Challenge and the determined Master Validation Response to the slave at block 2210. Also, the master may generate a new Master Password Challenge (MPC) when the Slave Validation Response is written or the master is initialized or reset.

At block 2211, the slave determines whether the Master Validation Response is correct. If so, the slave acknowledges all rows until the Authentication Status reports that all of the received data is valid at block 2213. If, at block 2211, it is determined that the Master Validation Response is not correct, it is determined at block 2212 whether a number of failed responses (e.g., a predetermined number such as 3) have been received. If so, the master is determined invalid, and communications with the master have failed. The slave may then alert the user (e.g., a client or proxy) and terminate communications at block 2214.

If, at block 2212, it is determined that a predetermined number of failures has not occurred, the slave may recalculate a new Slave Validation Response for transmission to the master. If the SVR is valid, the master will begin transmission of the private data. If not, the master remains locked.

It should be appreciated that the invention is not limited to each of embodiments listed above and described herein, but rather, various embodiments of the invention may be practiced alone or in combination with other embodiments.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for communicating between a plurality of devices comprising acts of:
receiving, by a master device through at least one serial communication link coupling the master device to a plurality of slave devices, a first message from a first slave device of the plurality of slave devices;
detecting, responsive to receiving the first message, that the first slave device is not registered;
communicating, responsive to detecting that the first slave device is not registered, a response to the first slave device;
receiving, by a master device through the at least one serial communication link, a second message from a second slave device of the plurality of slave devices, the second message including a command;
detecting, responsive to receiving the second message, that the second slave device is registered;
communicating, responsive to detecting that the second slave device is registered, an unaddressed message to all registered slave devices of the plurality of slave devices, the unaddressed message including the command; and
determining that all registered slave devices of the plurality of slave devices have received the unaddressed message.

2. The method according to claim 1, further comprising an act of authenticating, by the master device, the second slave device of the plurality of slave devices.

3. The method according to claim 2, wherein at least one authenticated slave device of the plurality of slave devices is coupled to the master device via a first serial communication link, and the at least one authenticated slave device is further coupled to at least one other registered slave device of the plurality of slave devices via a second serial communication link, and wherein the act of communicating the unaddressed message further comprises receiving the unaddressed message at the at least one authenticated slave device and transmitting the unaddressed message on the second serial communication link.

4. The method according to claim 3, wherein the at least one other registered slave device is adapted to operate in a pass-through mode.

5. The method according to claim 4, further comprising an act of prohibiting communications by the at least one other registered slave device if the at least one other registered slave device is not authenticated to the master device.

6. The method according to claim 3, further comprising acts of:
receiving a negative acknowledgement message sent by the at least one slave device to at least one other slave device coupling the at least one slave device to the master device; and interpreting the received negative acknowledgement message as a request to register the plurality of slave devices with the master device.

7. The method according to claim 2, further comprising an act of re-authenticating the plurality of slave devices with the master device if at least one authenticated slave device of the plurality of slave devices stops communicating with the master device.

8. The method according to claim 7, wherein the at least one authenticated slave device of the plurality of slave devices performs at least one act of the group comprising:
sending a command that stops communication with the master device;
failing to operate; and
experiencing a timeout in communicating information to the master device.

9. The method according to claim 1, further comprising acts of:
retrieving, responsive to receiving the second message, a row of memory from a memory of the master device; and
storing the row of memory in the unaddressed message.

10. The method according to claim 9, wherein the act of communicating the unaddressed message further comprises an act of communicating, from the master device to all registered slave devices of the plurality of slave devices, the unaddressed message containing the row of memory.

11. The method according to claim 1, wherein the act of determining that all registered slave devices of the plurality of slave devices have received the unaddressed message includes sending, by each registered slave device of the plurality of slave devices, an acknowledgement message along the at least one serial communication link toward the master device responsive to receiving the unaddressed message.

12. The method according to claim 1, wherein the act of determining that all registered slave devices of the plurality of slave devices have received the unaddressed message includes an act of determining that at least one registered slave device of the plurality of slave devices did not receive the unaddressed message within a pre-determined period of time.

13. The method according to claim 12, further comprising an act of resending the unaddressed message responsive to determining that at least one registered slave device of the plurality of slave devices did not receive the unaddressed message within the pre-determined period of time.

14. The method according to claim 13, further comprising an act of prohibiting an update of data stored by the master device by any of the plurality of slave devices until it is determined that all registered slave devices of the plurality of slave devices have received the unaddressed message.

15. The method according to claim 12, further comprising an act of determining that the at least one registered slave device of the plurality of slave devices did not received the unaddressed message based on receiving a negative acknowledgement message from any registered slave device of the plurality of slave devices.

16. The method according to claim 1, wherein each respective slave device of the plurality of slave devices is coupled to a respective serial port of the master device, and wherein the act of communicating the unaddressed message includes acts of communicating the unaddressed message to each registered slave device of the plurality of slave devices via the respective serial port coupled to the respective slave device.

17. The method according to claim 1, further comprising an act of registering the plurality of slave devices with the master device.

18. The method according to claim 17, further comprising an act of authenticating, by the master device, at least one registered slave device of the plurality of slave devices coupled to the master device.

19. The method according to claim 18, further comprising an act of re-authenticating at least one registered slave device of the plurality of slave devices with the master device if at least one authenticated slave device of the plurality of slave devices stops communicating with the master device.

20. The method according to claim 1, wherein the plurality of slave devices are adapted to perform monitoring and control operations on one or more other slave devices of the plurality of slave devices through at least one serial communication link.

21. The method according to claim 1, wherein the unaddressed message is an undirected message transmitted by the master device on the at least one serial communication link.

22. The method according to claim 1, further comprising communicating, by at least one slave device of the plurality of slave devices, to the master device, a message initiating communication between the at least one slave device of the plurality of slave devices and the master device;
communicating, by the master device, information stored in a public memory area of the master device, the public memory area identifying a data structure of a communication protocol used to communicate with the master device; and
communicating, by the at least one slave device, a message to the master device using the information identifying the data structure.

23. The method according to claim 22, wherein the information identifying the data structure includes version information relating to the communication protocol used to communicate with the master device, and wherein the master device identifies a communication protocol type used to communicate with the master device based on the version information.

24. The method according to claim 22, wherein the message initiating communication between the at least one slave device of the plurality of slave devices and the master device is an acknowledgement message, and the at least one slave device is adapted to send a plurality of acknowledgement messages to the master device.

25. The method according to claim 22, wherein the message initiating communication between the at least one slave device of the plurality of slave devices and the master device is a negative acknowledgement message sent by the at least one slave device of the plurality of slave devices.

26. The method according to claim 25, further comprising sending the negative acknowledgement message by the at least one slave device of the plurality of slave devices to at least one other slave device of the plurality of slave devices coupling the at least one slave device to the master device.

27. The method according to claim 26, further comprising sending, by the at least one slave device, one or more acknowledgement messages to the at least one other slave device to maintain a connection.

28. The method according to claim 1, wherein the master device is at least one of an Uninterruptible Power Supply (UPS) and a UPS component.

29. The method according to claim 28, wherein at least one slave device of the plurality of slave devices is a manager of the master device.

30. The method according to claim 1, wherein at least one slave device of the plurality of slave devices is a general purpose computer system.

31. A method for communicating between a plurality of devices comprising acts of:
receiving, through at least one serial communication link coupling a slave device to a master device, a first unaddressed message including data to be communicated to one or more downstream slave devices responsive to receiving the first unaddressed message;
detecting, in responsive to receiving the first unaddressed message, that the slave device is not registered;
communicating, from the slave device to the master device through the at least one serial communication link coupling the slave device to the master device, a negative acknowledgement message;
receiving, by the slave device through the at least one serial communication link coupling the slave device to one or more downstream slave devices, a message from at least one of the one or more slave devices;
communicating the message from the one or more downstream slave devices to the master device through the at least one serial communication link coupling the slave device to the master device;
receiving, through the at least one serial communication link coupling the slave device to the master device, a second unaddressed message including data to be communicated to the slave device and one or more downstream slave devices responsive to receiving the second unaddressed message;
detecting, responsive to receiving the second unaddressed message, that the slave device is registered; and
communicating, responsive to detecting that the slave device is registered, the second unaddressed message to the one or more downstream slave devices.

32. The method according to claim 31, further comprising an act of receiving an acknowledgement message from the one or more downstream slave devices, and replacing the received acknowledgement message with an acknowledgement message generated by the slave device.

33. The method according to claim 31, further comprising receiving a command from the one or more downstream slave devices, determining whether the slave device has a command to send to the master device, determining which one of either command should be sent to the master device, and sending the determined command to the master device.

34. The method according to claim 31, further comprising an act of communicating, in a normal transfer mode, data bytes received in a multibyte message from the one or more downstream slave devices to the master device through the at least one serial communication link coupling the slave device to the master device without preprocessing the data bytes received.

35. The method according to claim 31, further comprising an act of sending, prior to a normal communication mode, a request to authenticate the slave device to the master device, and, after the slave device is authenticated, communicating authentication information from the one or more downstream slave devices to the master device through the at least one serial communication link coupling the slave device to the master device.

36. A slave device comprising:
a processor;
a first serial interface adapted to couple the slave device to one or more downstream slave devices, wherein the first serial interface is adapted to receive message from at least one of the one or more downstream slave devices; and
a second serial interface adapted to couple the slave device to a master device, wherein the second serial interface is adapted to communicate the message to the master device, and is adapted to receive from the master device, an unaddressed message and is further adapted to send a negative acknowledgement through the second serial interface responsive to receiving the unaddressed message and determining that the slave device is unregistered, and wherein the slave device is adapted to communicate the unaddressed message to the one or more downstream slave devices through the first serial interface, responsive to determining that the slave is registered.

37. The slave device according to claim 36, wherein the first serial interface is adapted to receive an acknowledgement message from the one or more downstream slave devices, and wherein the processor replaces the received acknowledgement message with an acknowledgement message generated by the slave device, and wherein the second serial interface is adapted to communicate the acknowledgement message generated by the slave device to the master device.

38. The slave device according to claim 36, wherein the first serial interface is adapted to receive a command message from the one or more downstream slave devices, and wherein the processor is adapted to determine whether the slave device has a command to send to the master device and determine which one of either command should be sent to the master device, and wherein the second serial interface is adapted to send the determined command to the master device.

39. The slave device according to claim 36, wherein the first serial interface is adapted to receive data bytes in a multibyte message from the one or more downstream slave devices, wherein the first serial interface is adapted to transfer the multibyte message to the second serial interface without preprocessing the data bytes received, and wherein the second serial interface is adapted to communicate the multibyte message to the master device.

40. The slave device according to claim 36, wherein the second serial interface is adapted to send, prior to a normal communication mode, a request to authenticate the slave device to the master device, and wherein the first serial interface is adapted to receive, after the slave device is authenticated, an authentication request from the one or more downstream slave devices, and wherein the second serial interface is adapted to communicate the authentication request to the master device.

41. The slave device according to claim 36, wherein the first serial interface is adapted to receive an acknowledgement message from the one or more downstream slave devices, and wherein the second serial interface is adapted to send an acknowledgement message from the slave device instead of the received acknowledgement message to the master device.

* * * * *

UNITED STATES PATENT AND TRADEMARK OFFICE
CERTIFICATE OF CORRECTION

| | | |
|---|---|---|
| PATENT NO. | : 8,549,198 B2 | Page 1 of 1 |
| APPLICATION NO. | : 12/412827 | |
| DATED | : October 1, 2013 | |
| INVENTOR(S) | : Daniel C. Cohen et al. | |

It is certified that error appears in the above-identified patent and that said Letters Patent is hereby corrected as shown below:

In the Claims:

Claim 36, column 44, line 5, insert the word --a-- between the words "receive" and "message".

Signed and Sealed this
Twentieth Day of May, 2014

Michelle K. Lee
*Deputy Director of the United States Patent and Trademark Office*